(12) United States Patent
Igeta

(10) Patent No.: US 8,959,446 B2
(45) Date of Patent: Feb. 17, 2015

(54) INFORMATION PROCESSING APPARATUS AND METHOD OF CONTROLLING THE SAME

(75) Inventor: Satoshi Igeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 12/616,494

(22) Filed: Nov. 11, 2009

(65) Prior Publication Data

US 2010/0125806 A1 May 20, 2010

(30) Foreign Application Priority Data

| Nov. 20, 2008 | (JP) | ................................. 2008-297097 |
| Apr. 17, 2009 | (JP) | ................................. 2009-101376 |
| Sep. 7, 2009 | (JP) | ................................. 2009-206458 |

(51) Int. Cl.
 *G06F 3/00* (2006.01)
 *G06F 3/0486* (2013.01)
 *G06F 3/0481* (2013.01)

(52) U.S. Cl.
 CPC ............ *G06F 3/0486* (2013.01); *G06F 3/0481* (2013.01)
 USPC ........... 715/769; 715/821; 715/822; 715/790; 715/794

(58) Field of Classification Search
 CPC ............................... G06F 3/0486; G06F 3/048
 USPC ........................ 715/769, 821, 822, 790, 794
 See application file for complete search history.

(56) References Cited

U.S. PATENT DOCUMENTS

| 5,565,888 | A | * | 10/1996 | Selker | .......................... 715/823 |
| 5,712,995 | A | * | 1/1998 | Cohn | ............................ 715/792 |
| 5,745,112 | A | | 4/1998 | Hirose | |
| 6,008,809 | A | * | 12/1999 | Brooks | ......................... 715/792 |
| 6,915,490 | B1 | * | 7/2005 | Ewing | ........................... 715/794 |
| 7,386,808 | B2 | * | 6/2008 | Skistimas et al. | ............. 715/810 |
| 7,458,032 | B2 | * | 11/2008 | Terada | .......................... 715/769 |
| 7,681,143 | B2 | * | 3/2010 | Lindsay et al. | ............... 715/788 |
| 8,341,541 | B2 | * | 12/2012 | Holecek et al. | ............... 715/782 |
| 2004/0066414 | A1 | * | 4/2004 | Czerwinski et al. | .......... 345/781 |
| 2004/0261037 | A1 | * | 12/2004 | Ording et al. | ................. 715/788 |
| 2005/0210401 | A1 | * | 9/2005 | Ketola et al. | .................. 715/770 |
| 2005/0222971 | A1 | * | 10/2005 | Cary | ................................ 707/1 |
| 2007/0234226 | A1 | * | 10/2007 | Szeto | ............................ 715/769 |
| 2007/0250788 | A1 | * | 10/2007 | Rigolet | ......................... 715/788 |
| 2010/0083154 | A1 | * | 4/2010 | Takeshita | ...................... 715/769 |

FOREIGN PATENT DOCUMENTS

| JP | 02-310664 A | 12/1990 |
| JP | 05-012225 A | 1/1993 |
| JP | 07-261733 A | 10/1995 |
| JP | 08-185301 | 7/1996 |
| JP | 08-263248 A | 10/1996 |

(Continued)

*Primary Examiner* — Michael Roswell

(74) *Attorney, Agent, or Firm* — Cowan, Liebowitz & Latman, P.C.

(57) ABSTRACT

When a plurality of overlapping windows are displayed on a display screen, each window is displayed in a convenient state for a user operation, thereby reducing the load of the user operation. Upon detecting an object drag operation, an information processing apparatus displays the window of a predetermined application, which is displayed behind another window, as the topmost window. At this time, the window of the predetermined application reduces its size or changes the display position so as not to interfere with the other window displayed in front of it.

10 Claims, 37 Drawing Sheets

(56) References Cited

FOREIGN PATENT DOCUMENTS

| JP | 11-045164 A | 2/1999 |
| JP | 2003-108281 | 4/2003 |
| JP | 2004-046358 A | 2/2004 |
| JP | 2006-209321 A | 8/2006 |

* cited by examiner

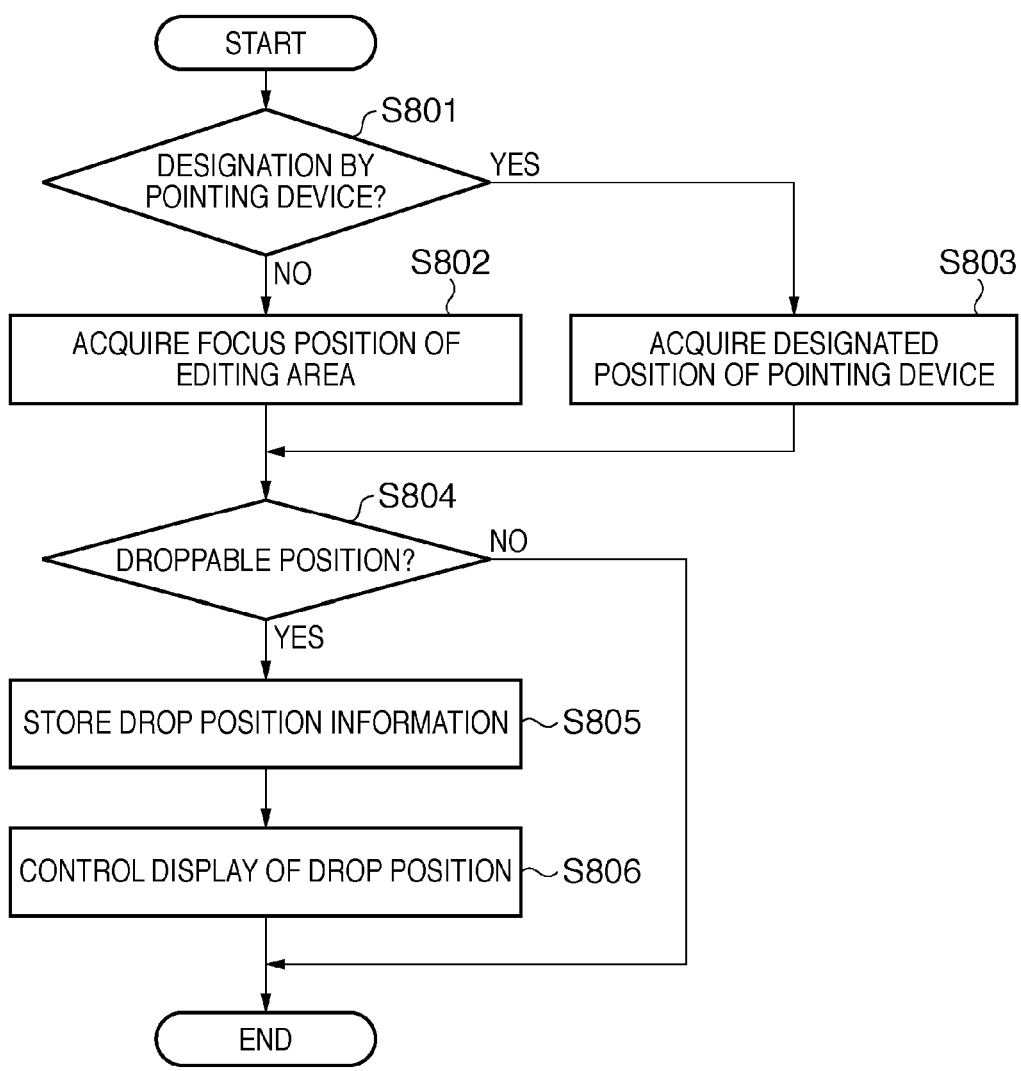

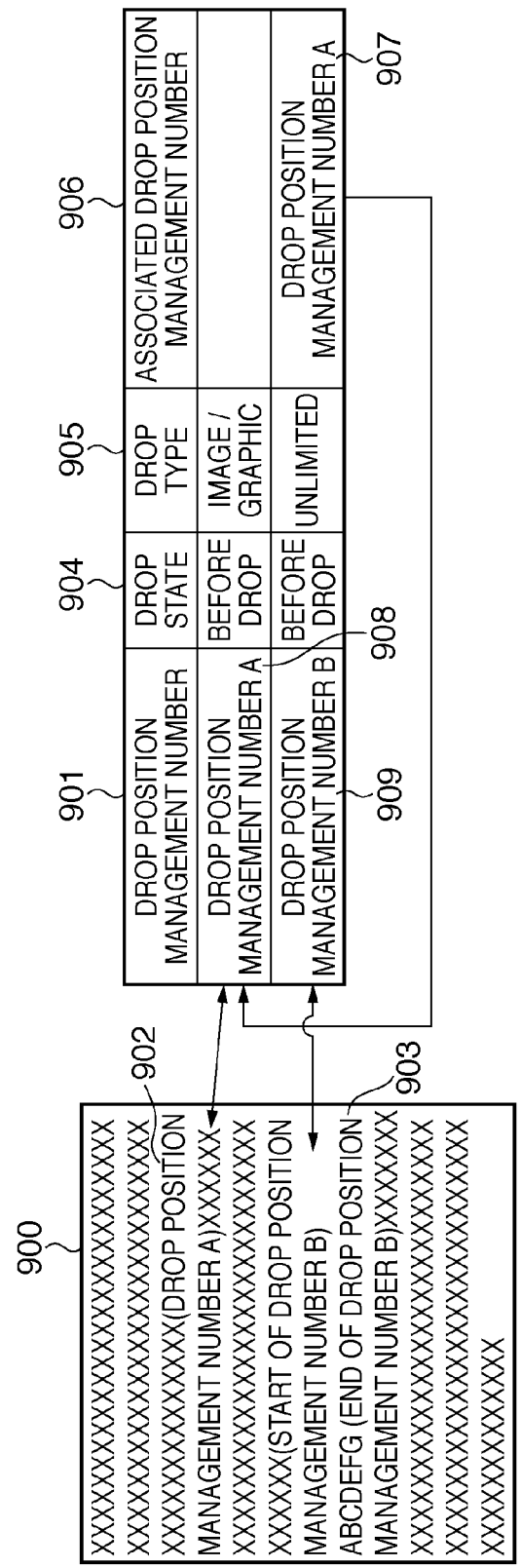

F I G. 12A
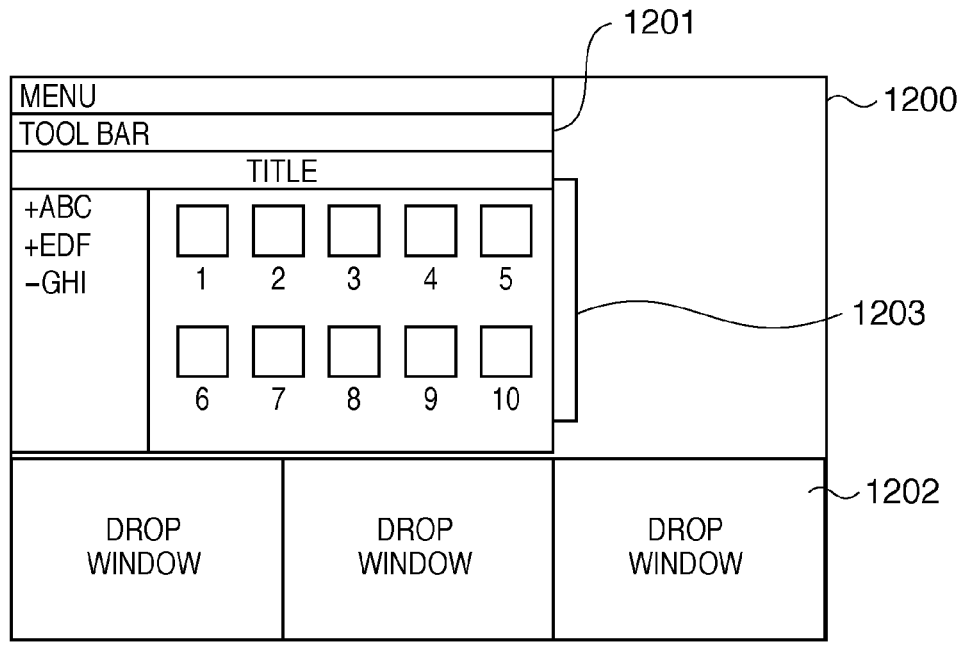
F I G. 12B
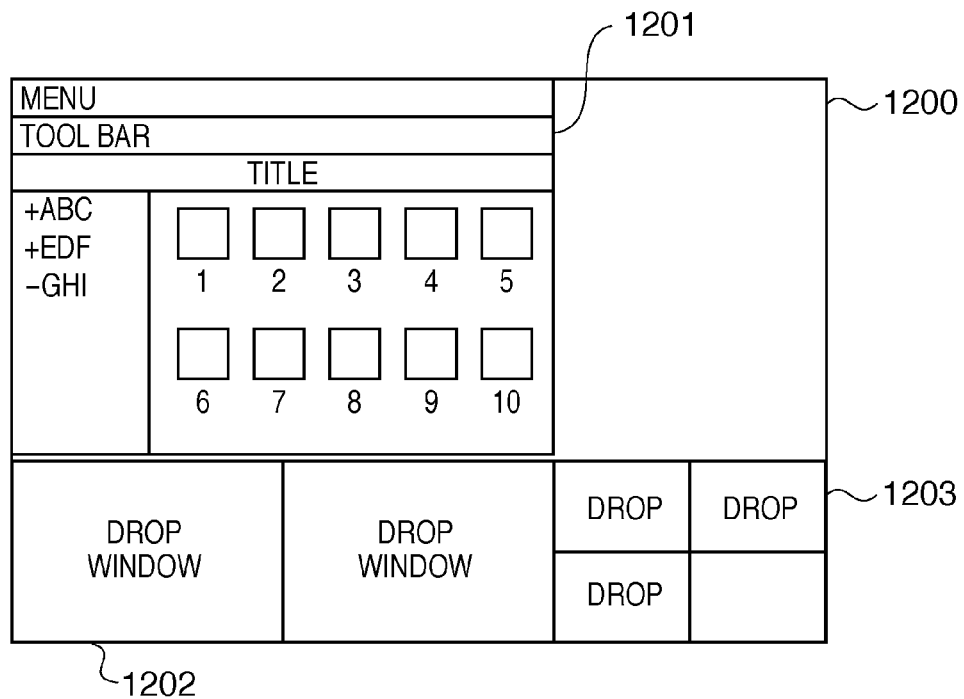

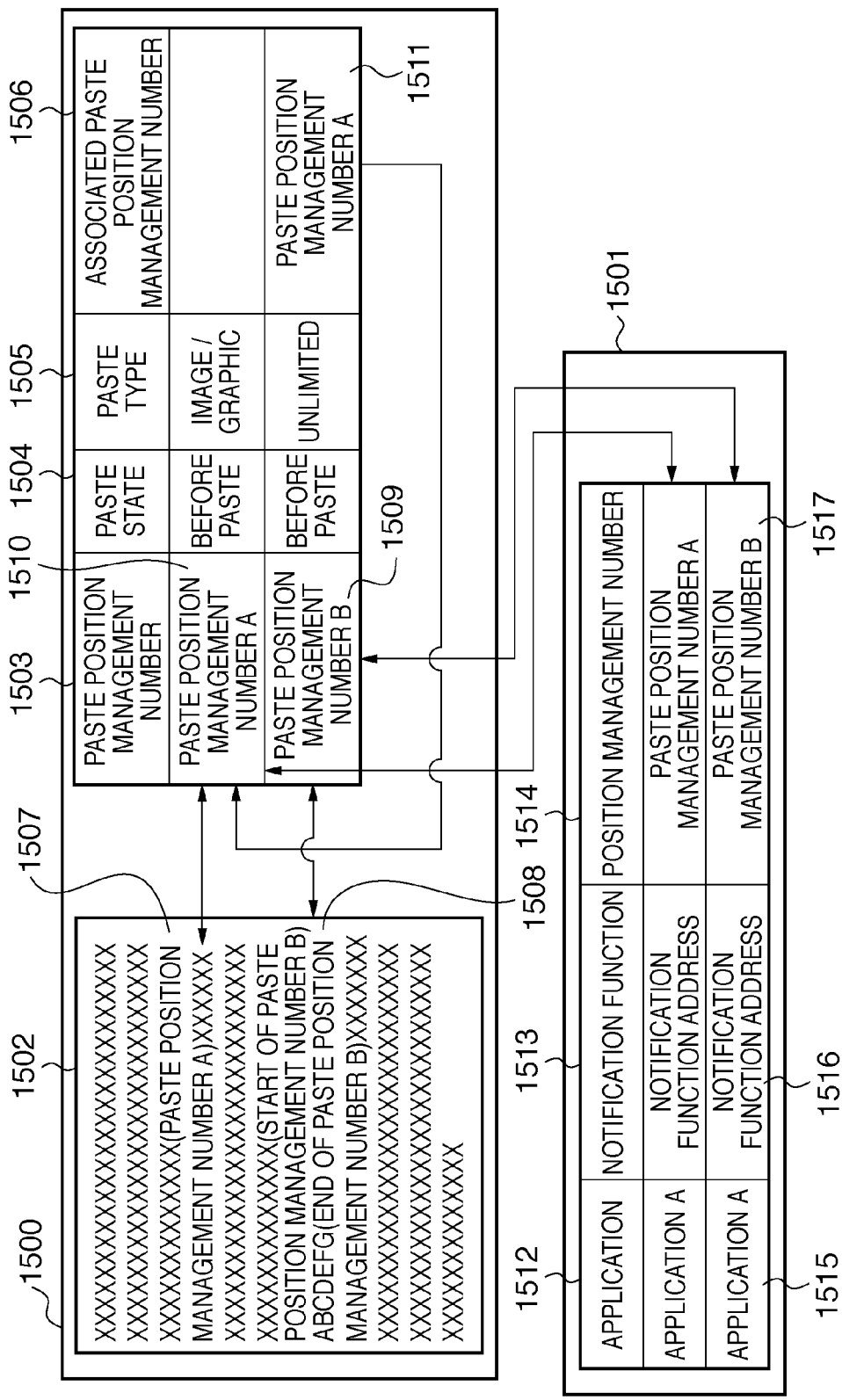

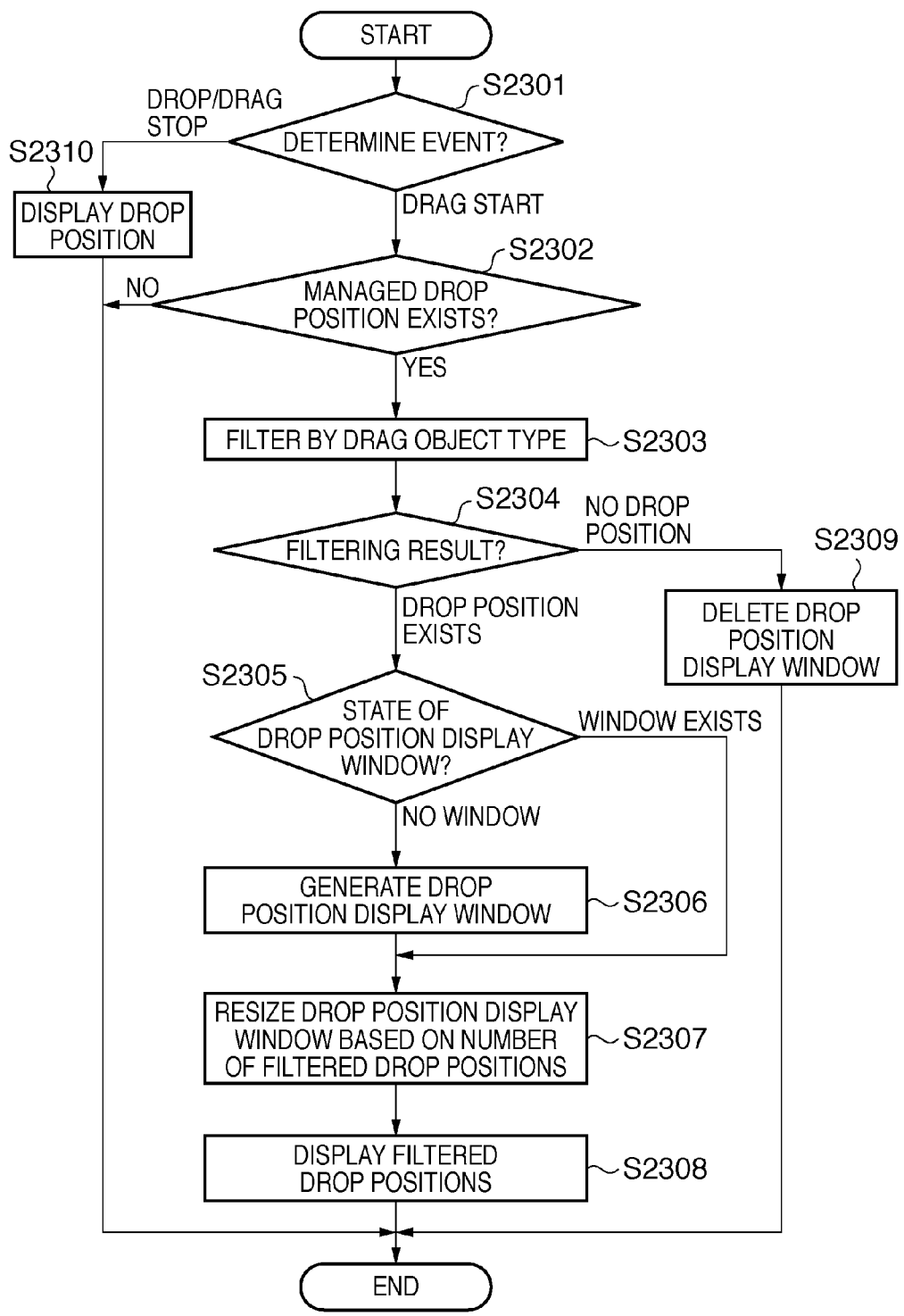

INFORMATION PROCESSING APPARATUS AND METHOD OF CONTROLLING THE SAME

BACKGROUND OF THE INVENTION

1. Field of the Invention

The present invention relates to an information processing apparatus and a method of controlling the same and, more particularly, to a technique of controlling display of each of a plurality of windows on a display screen.

2. Description of the Related Art

Operating systems (OSs) (e.g., Windows®) for implementing multiwindow systems on computers are now widespread. A multiwindow system can display a plurality of windows on one display screen. Examine a case in which an object (e.g., file) displayed in a first window is moved or copied, by drag-and-drop, to an application which manages a second window. In this case, if the second window is hidden behind the first window, it cannot accept drop of the object. To prevent this, the user needs to adjust the position of each window before drag-and-drop to display both the drag-and-drop target object in the first window and at least part of the drop area in the second window without overlap.

Additionally, to reduce the operation load of the user in drag-and-drop, it has been proposed to simply turn off or on the display of each window or to display a window directly as the topmost window when starting the drag operation of an icon displayed on the screen. See, for example, Japanese Patent Laid-Open Nos. 8-185301 and 2003-108281.

In the prior art, however, a window desired by a user is not necessarily displayed in a convenient state for operations as a result. In fact, the window is often displayed in an inconvenient state for the user.

SUMMARY OF THE INVENTION

The present invention has been made in consideration of the above-described situation, and has as its feature to, when a plurality of windows are displayed on a display screen in an overlapping state, display each window in a convenient state for a user to operate, thereby reducing the operation load of the user.

According to an aspect of the present invention, there is provided an information processing apparatus for displaying a plurality of windows on a display screen, comprising:

a drag detection unit that detects a drag operation of an object arranged in a first window;

a drop detection unit that detects a drop operation of the object in a second window;

a change unit that changes a display size of the second window when the drag detection unit has detected the drag operation; and a display control unit that executes control to display the second window having the changed display size as a topmost window of the display screen in response to the change.

According to another aspect of the present invention, there is provided an information processing apparatus for displaying a plurality of windows on a display screen, comprising:

a drag detection unit that detects a drag operation of an object arranged in a first window;

a change unit that changes a display size of a second window displayed behind the first window on the display screen when the drag detection unit has detected the drag operation; and a display control unit that executes control to display the second window having the changed display size in front of the first window in response to the change, wherein the display size of the second window is smaller when displayed in front of the first window than when displayed behind the first window.

According to another aspect of the present invention, there is provided an information processing apparatus for displaying a plurality of overlapping windows on a display screen, comprising:

a drag detection unit that detects a drag operation of an object arranged in a first window;

a drop detection unit that detects a drop operation of the object in a second window; and a display control unit that executes control, when the drag detection unit has detected the drag operation, to display the first window and the second window at positions where an overlap area between the first window and the second window becomes smaller than before the drag detection unit detects the drag operation.

According to another aspect of the present invention, there is provided an information processing apparatus for displaying a plurality of overlapping windows on a display screen, comprising:

a setting unit that sets a paste position in a file created in accordance with an application program executed by the information processing apparatus;

a detection unit that detects a drag operation of an object on the display screen;

a display control unit that executes control to display a list of the set paste positions on the display screen when the detection unit has detected the drag operation;

a selection unit that selects a paste position from the list; and a paste unit that pastes data corresponding to the object at the selected paste position.

According to another aspect of the present invention, there is provided a method of controlling an information processing apparatus for displaying a plurality of windows on a display screen, comprising:

a drag detection step of causing a drag detection unit to detect a drag operation of an object arranged in a first window;

a drop detection step of causing a drop detection unit to detect a drop operation of the object in a second window;

a change step of causing a change unit to change a display size of the second window when the drag detection unit has detected the drag operation; and a display control step of causing a display control unit to execute control to display the second window having the changed display size as a topmost window of the display screen in response to the change.

According to another aspect of the present invention, there is provided a method of controlling an information processing apparatus for displaying a plurality of windows on a display screen, comprising:

a drag detection step of causing a drag detection unit to detect a drag operation of an object arranged in a first window;

a change step of causing a change unit to change a display size of a second window displayed behind the first window on the display screen when the drag detection unit has detected the drag operation; and a display control step of causing a display control unit to execute control to display the second window having the changed display size in front of the first window in response to the change, wherein the display size of the second window is smaller when displayed in front of the first window than when displayed behind the first window.

According to another aspect of the present invention, there is provided a method of controlling an information processing apparatus for displaying a plurality of overlapping windows on a display screen, comprising:

a drag detection step of causing a drag detection unit to detect a drag operation of an object arranged in a first window;

a drop detection step of causing a drop detection unit to detect a drop operation of the object in a second window; and a display control step of causing a display control unit to execute control, when the drag detection unit has detected the drag operation, to display the first window and the second window at positions where an overlap area between the first window and the second window becomes smaller than before the drag detection unit detects the drag operation.

According to another aspect of the present invention, there is provided a method of controlling an information processing apparatus for displaying a plurality of overlapping windows on a display screen, comprising:

a setting step of causing a setting unit to set a paste position in a file created in accordance with an application program executed by the information processing apparatus;

a detection step of causing a detection unit to detect a drag operation of an object on the display screen;

a display control step of causing a display control unit to execute control to display a list of the set paste positions on the display screen when the detection unit has detected the drag operation;

a selection step of causing a selection unit to select a paste position from the list; and a paste step of causing a paste unit to paste data corresponding to the object at the selected paste position.

According to another aspect of the present invention, there is provided an information processing apparatus which operates in accordance with an operating system that runs on a computer having a memory and implements a multiwindow system having a display screen capable of displaying a plurality of windows, comprising:

a rendering unit that renders, on the display screen, a window of a first program that runs under control of the operating system;

a reception unit that receives, from the first program, drag information about an object dragged in the window of the first program;

an allocation unit that allocates, to the memory, a shared area accessible from a second program that runs under the control of the operating system; and a storage unit that stores the drag information in the shared area.

According to another aspect of the present invention, there is provided an information processing apparatus which operates in accordance with an operating system that runs on a computer having a memory and implements a multiwindow system having a display screen capable of displaying a plurality of windows, comprising:

a rendering unit that renders, on the display screen, a window of a first program that runs under control of the operating system;

a notification request reception unit that receives a notification request from a second program that runs under the control of the operating system when an object has been dragged in the window of the first program, the notification request requesting to notify the second program of drag information about the object;

a storage unit that stores the notification request in the memory;

a drag information reception unit that receives the drag information from the first program; and a notification unit that notifies, when the reception unit has received the drag information, the second program corresponding to the notification request stored in the memory of the drag information.

According to another aspect of the present invention, there is provided an information processing apparatus which operates in accordance with a program that runs under control of an operating system that runs on a computer and implements a multiwindow system having a display screen capable of displaying a plurality of windows, comprising:

a detection unit that detects drag of an object in a window of another program that runs under the control of the operating system, the window being rendered by the operating system; and an acquisition unit that acquires drag information about the object from the other program when the detection unit has detected drag of the object.

According to another aspect of the present invention, there is provided a control method executed by an information processing apparatus in accordance with an operating system that runs on a computer having a memory and implements a multiwindow system having a display screen capable of displaying a plurality of windows, comprising:

a rendering step of causing a rendering unit to render, on the display screen, a window of a first program that runs under control of the operating system;

a reception step of causing a reception unit to receive, from the first program, drag information about an object dragged in the window of the first program;

an allocation step of causing an allocation unit to allocate, to the memory, a shared area accessible from a second program that runs under the control of the operating system; and a storage step of causing a storage unit to store the drag information in the shared area.

According to another aspect of the present invention, there is provided a control method executed by an information processing apparatus in accordance with an operating system that runs on a computer having a memory and implements a multiwindow system having a display screen capable of displaying a plurality of windows, comprising:

a rendering step of causing a rendering unit to render, on the display screen, a window of a first program that runs under control of the operating system;

a notification request reception step of causing a notification request reception unit to receive a notification request from a second program that runs under the control of the operating system when an object has been dragged in the window of the first program, the notification request requesting to notify the second program of drag information about the object;

a storage step of causing a storage unit to store the notification request in the memory;

a drag information reception step of causing a drag information reception unit to receive the drag information from the first program; and a notification step of causing a notification unit to notify, when the drag information has been received in the reception step, the second program corresponding to the notification request stored in the memory of the drag information.

According to another aspect of the present invention, there is provided a control method executed by an information processing apparatus in accordance with a program that runs under control of an operating system that runs on a computer and implements a multiwindow system having a display screen capable of displaying a plurality of windows, comprising:

a detection step of causing a detection unit to detect drag of an object in a window of another program that runs under the control of the operating system, the window being rendered by the operating system; and an acquisition step of causing an acquisition unit to acquire drag information about the object from the other program when drag of the object has been detected in the detection step.

According to another aspect of the present invention, there is provided a computer-readable storage medium storing an operating system that runs on a computer having a memory and implements a multiwindow system having a display screen capable of displaying a plurality of windows, the operating system causing the computer to function as:

a rendering unit that renders, on the display screen, a window of a first program that runs under control of the operating system;

a reception unit that receives, from the first program, drag information about an object dragged in the window of the first program;

an allocation unit that allocates, to the memory, a shared area accessible from a second program that runs under the control of the operating system; and a storage unit that stores the drag information in the shared area.

According to another aspect of the present invention, there is provided a computer-readable storage medium storing an operating system that runs on a computer having a memory and implements a multiwindow system having a display screen capable of displaying a plurality of windows, the operating system causing the computer to function as:

a rendering unit that renders, on the display screen, a window of a first program that runs under control of the operating system;

a notification request reception unit that receives a notification request from a second program that runs under the control of the operating system when an object has been dragged in the window of the first program, the notification request requesting to notify the second program of drag information about the object;

a storage unit that stores the notification request in the memory;

a drag information reception unit that receives the drag information from the first program; and a notification unit that notifies, when the reception unit has received the drag information, the second program corresponding to the notification request stored in the memory of the drag information.

According to another aspect of the present invention, there is provided a computer-readable storage medium storing a program that runs under control of an operating system that runs on a computer and implements a multiwindow system having a display screen capable of displaying a plurality of windows, the program causing the computer to function as:

a detection unit that detects drag of an object in a window of another program that runs under the control of the operating system, the window being rendered by the operating system; and an acquisition unit that acquires drag information about the object from the other program when the detection unit has detected drag of the object.

According to the present invention, it is possible to, when a plurality of windows are displayed on a display screen in an overlapping state, display each window in a convenient state for a user to operate, thereby reducing the operation load of the user.

Further features of the present invention will become apparent from the following description of exemplary embodiments with reference to the attached drawings.

BRIEF DESCRIPTION OF THE DRAWINGS

FIG. 8 is a flowchart illustrating processing to be executed when a drop target position is designated in an information providing system according to the fourth embodiment;

FIG. 9 is a view showing an example of the management form of drop target positions in the information providing system according to the fourth embodiment;

FIGS. 12A and 12B are views showing examples of window display format switching states according to the second embodiment;

FIGS. 15A to 15C are views showing examples of paste position management information according to the third embodiment;

FIG. 23 is a flowchart illustrating processing of controlling the drop position display window and displaying drop positions in accordance with the type of a dragged object at the start of drag in the information providing system according to the fourth embodiment;

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

[First Embodiment]

In this embodiment, a case will be described in which the present invention is implemented by operating an information processing apparatus (PC) in accordance with an event detection application program (to be referred to as an "event detection application" hereinafter). According to this embodiment, a conventional operating system (OS) for implementing a multiwindow system on a computer can directly be used as the OS. The multiwindow system has a display screen capable of displaying a plurality of windows. This embodiment will be explained assuming that Windows® is used as the OS. However, any other OS may be used. In the multiwindow system, the PC commonly controls display (rendering) of the window of each application program in accordance with the OS. In, for example, Windows®, the PC invokes the API (Application Program Interface) of the OS in accordance with an application program and displays a window based on the OS.

Figure 1:
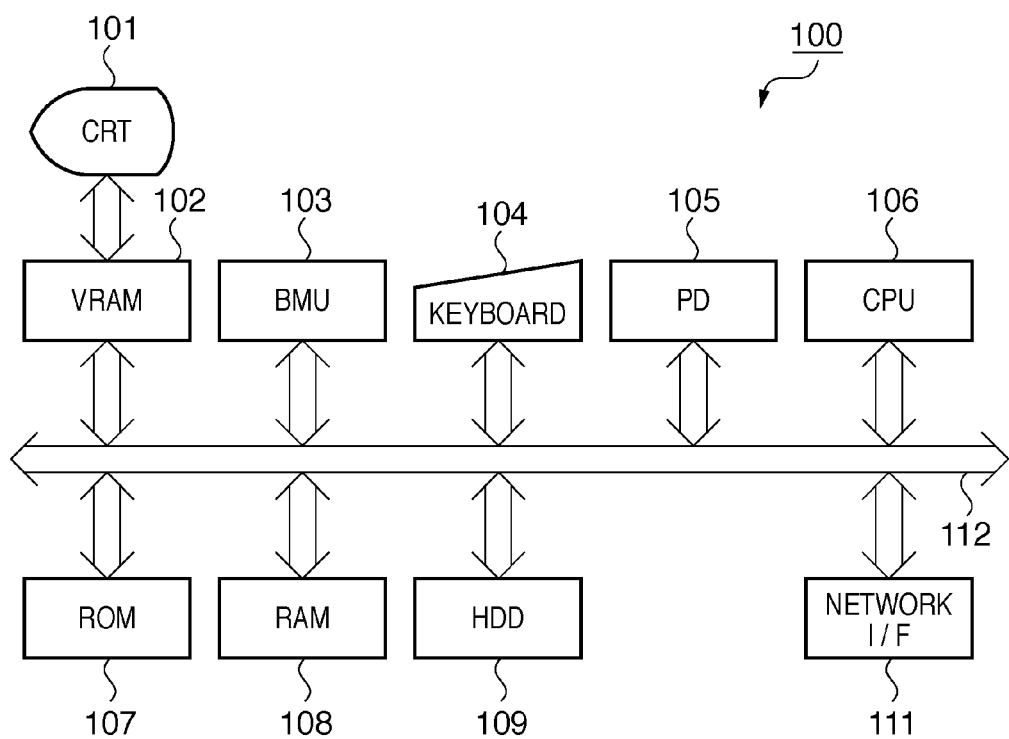
FIG. 1 is a block diagram showing the arrangement of an information processing apparatus (PC 100) according to each embodiment.

FIG. 1 is a block diagram showing the arrangement of an information processing apparatus (PC 100) which executes the OS and various kinds of applications. The PC 100 is implemented by a personal computer or the like. As shown in FIG. 1, the PC 100 includes a CRT 101, VRAM 102, BMU 103, keyboard 104, PD 105, CPU 106, ROM 107, RAM 108, HDD 109, and network I/F 111. The CRT (Cathode Ray Tube) 101 displays, for example, documents, graphics, and images under editing and other editing information, icons, messages, menus, and other information such as a user interface. An image to be displayed on the CRT 101 is rendered on the VRAM 102. The image data rendered on the VRAM 102 is transferred to the CRT 101 in accordance with a predetermined procedure so that an image is displayed on the CRT 101. The BMU (Beam Move Unit) 103 controls, for example, data transfer between memories (e.g., between the VRAM 102 and another memory) or data transfer between a memory and each I/O device (e.g., network I/F 111). The keyboard 104 has various kinds of keys to input a document and the like. The PD (Pointing Device) 105 is used to point, for example, an icon, menu, or another content displayed on the CRT 101. The CPU 106 controls devices based on control programs stored in the ROM 107 and the HDD 109. The ROM 107 stores various kinds of control programs and data. The RAM 108 has a work area for the CPU 106, a data save area for error processing, a control program load area, and the like. The HDD 109 stores contents and control programs to be executed in the PC 100. For example, the HDD 109 stores browser programs, OS, event detection application (program according to the present invention), image files, document files, music files, electronic album data, electronic album editing program, and the like. The network I/F 111 communicates with, for example, another PC or printer via a network. A CPU bus 112 includes an address bus, data bus, and control bus. The control programs can be provided to the CPU 106 from the ROM 107 or the HDD 109 or from another PC or the like via a network and the network I/F 111.

Figure 2:
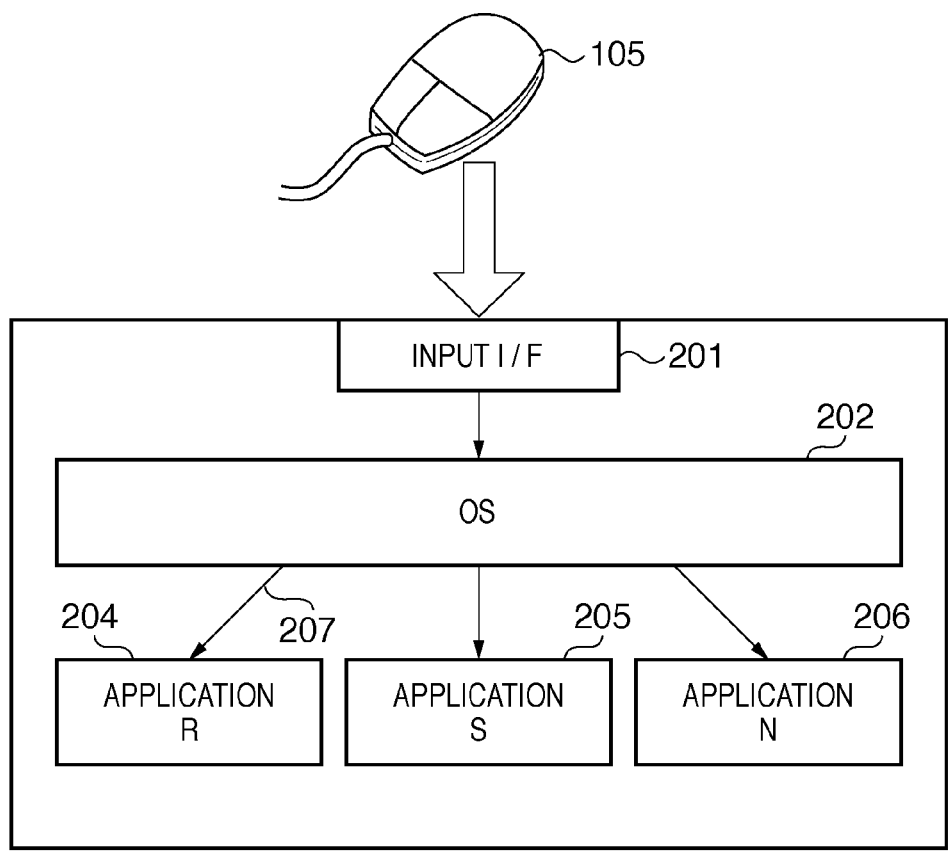
FIG. 2 is a schematic view showing the relationship between an OS and applications according to each embodiment.

FIG. 2 is a schematic view showing the relationship between an OS and each application program. As shown in FIG. 2, the PC 100 operates in accordance with an OS 202, thereby receiving, via an input I/F 201, all events resulting from operations on the keyboard 104, the PD 105 (e.g., mouse), and the like. The PC 100 then converts each received event into a format which is interpretation when operating in accordance with each application program. After that, the PC 100 operates in accordance with the OS 202 so as to select, as an application program to perform processing, one of application programs 204 to 206 which has an input focus or the like and distribute the events. When operating based on each application program, the PC 100 acquires and uses the distributed events. In this embodiment, the application program 204 runs as an event detection application. Hence, when operating based on the application program 204 (event detection application), the PC 100 acquires and uses the events distributed to the application programs 205 and 206 as well. Note that each of the application programs 205 and 206 may also run as an event detection application. Note that the event detection application is not an application specialized to event detection but an arbitrary application program including an event detection function to be explained below with reference to FIG. 3 and the like. For example, when the event detection function to be described below is added to a text editor, the text editor serves as an event detection application.

Figure 3:
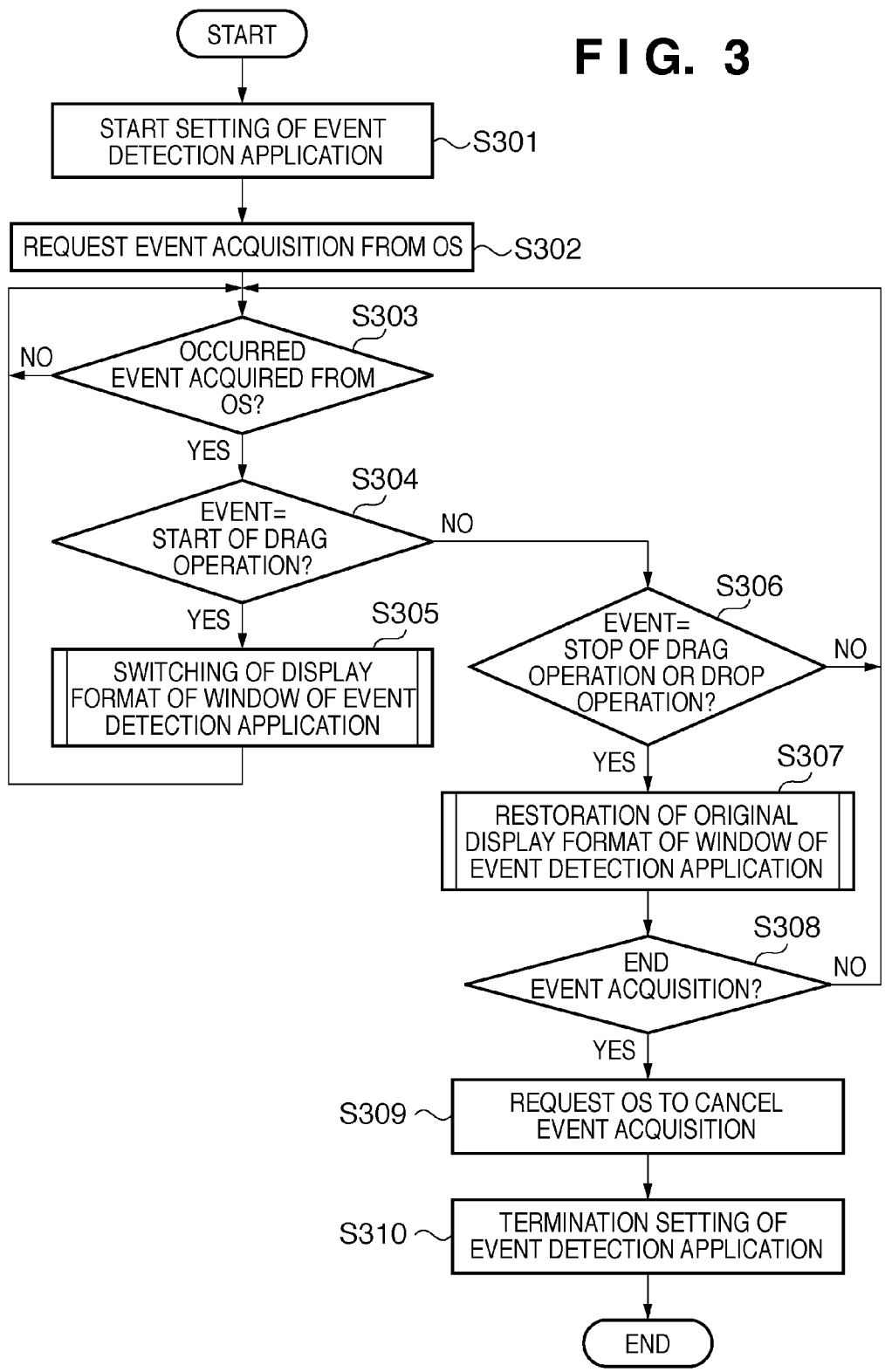
FIG. 3 is a flowchart illustrating the procedure of processing to be executed by a PC according to the first embodiment.

Processing will be explained below which causes the PC 100 that is displaying, on the display screen, a plurality of windows according to a plurality of application programs to switch the display format of the window of an event detection application program behind in response to a drag operation. FIG. 3 is a flowchart illustrating the procedure of this switching processing. The processes of the steps of the flowchart are implemented by causing the CPU 106 of the PC 100 to execute the OS 202 and the event detection application and operate based on them. This also applies to each flowchart to be described below.

In step S301, the CPU 106 starts up the event detection application in accordance with, for example, a user instruction and performs start processing necessary for execution. In step S302, the CPU 106 operates in accordance with the event detection application and does event acquisition start setting in the OS 202 so that the OS notifies the CPU of all events together with event identification information. The process in step S302 aims at making it possible to acquire and use events the OS 202 distributes to applications even when the CPU 106 operates based on an application other than the event detection application. More specifically, in, for example, Windows®, the event acquisition start setting is done using a SetWindowHookEx program function. This causes the CPU 106 to operate in accordance with the OS 202 and, before transferring an event to another application, transfer the event to the event detection application which has requested event acquisition.

When operating based on the OS 202 and detecting occurrence of an event, the CPU 106 operates in accordance with the event detection application and acquires event identification information representing the type of the event from the OS 202 in step S303. Then, the process advances to step S304. In step S304, the CPU 106 operates in accordance with the event detection application and determines whether the event identification information acquired in step S303 indicates a drag event (drag detection). If it is a drag event, the process advances to step S305. Otherwise, the process advances to step S306. In step S305, the CPU 106 operates in accordance with the event detection application and executes processing (display control) of switching the display format of the window of the event detection application. Details will be described later with reference to FIGS. 4A, 4B, and the like. For example, the window of the event detection application is moved to the topmost position of the display screen of the multiwindow system by the process in step S305. Then, the process returns to step S303 to wait for acquisition of the next event.

On the other hand, in step S306, the CPU 106 operates in accordance with the event detection application and determines whether the event acquired in step S303 is a drop event or a drag stop event (drop detection). If YES in step S306, the process advances to step S307. If NO, the process returns to step S303. In step S307, the CPU 106 operates in accordance with the event detection application and returns the display format of the window of the event detection application to the format before switching in step S305.

With this processing, the window display format returns to the original one when the drop operation has ended. This allows the user to continuously smoothly perform a new operation of, for example, moving another object, resulting in higher operability.

In step S308, the CPU 106 operates in accordance with the event detection application and determines whether an instruction to end the event acquisition processing or end the event detection application itself has been received. If YES in step S308, the process advances to step S309. If NO, the process returns to step S303. In step S309, the CPU 106 operates in accordance with the event detection application and cancels the event acquisition start setting in the OS 202. More specifically, in, for example, Windows®, the event acquisition setting is canceled using an UnhookWindowHookEx program function. In step S310, the CPU 106 performs termination processing necessary for ending the event detection application.

In this way, the CPU 106 operates based on the event detection application and sets whether to transfer information about an event to the event detection application before the OS 202 distributes the event to another application. This makes the CPU 106 execute interrupt processing of the OS 202 upon receiving an event from the input I/F 201. The CPU 106 invokes the set method of the event detection application and executes acquisition processing in accordance with the OS 202 and, after that, distributes the event to another application in accordance with the OS 202.

Note that the user may be able to set whether to permit execution of the event detection application display format switching processing. This allows the CPU 106 to switch the window display format in accordance with only an application desired by the user and therefore prevent any competition between a plurality of applications which perform the same display switching processing. More specifically, only the window of an application desired by the user is displayed as the topmost window so that the user can easily select it as a drop destination. This further improves the convenience.

In this embodiment, a case has been described in which the CPU 106 performs the event acquisition start setting in the OS 202 when starting up the event detection application. Instead, the CPU 106 may operate in accordance with the OS 202 and detect, by an event notification from the OS 202, whether the window of the event detection application is displayed behind the window of another application. Upon detecting that the window of the event detection application is displayed behind the window of another application, the CPU 106 may perform the event acquisition start setting in the OS 202. In this case, processing associated with the display format switching need be executed only when the window of the event detection application is hidden by the window of another application.

Figure 4A:
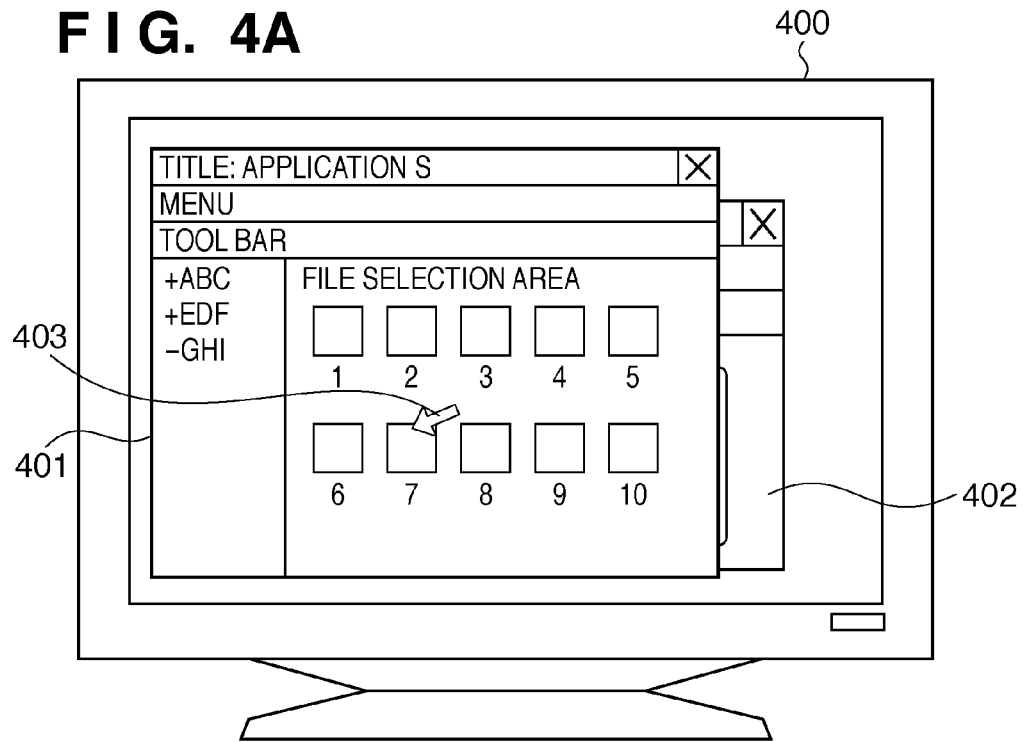
FIGS. 4A and 4B are views showing examples of window display format switching states according to the first embodiment.
Figure 4B:
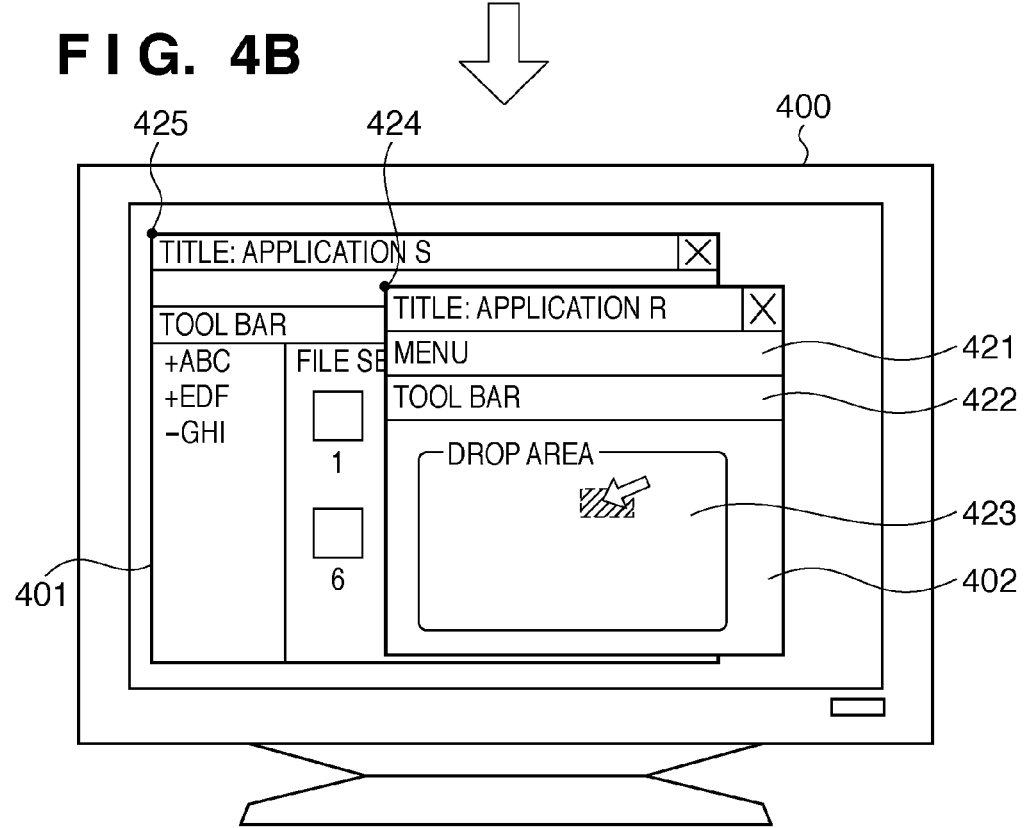

A window displayed on the display screen when the CPU 106 has executed, in step S305, the window display format switching processing in accordance with the event detection application will be explained next. FIGS. 4A and 4B are views showing examples of window display states. FIG. 4A illustrates a state before the CPU 106 executes the switching processing in step S305. FIG. 4B illustrates a state after the CPU 106 has executed the switching processing in step S305. Reference numeral 400 denotes a display screen of the PC 100 on which the user performs an operation; 401, a window (first window) 401 of another application (first application program) in which an object list is arranged; and 402, a window (second window) of the event detection application (second application program). Referring to FIG. 4A, an active mouse pointer 403 exists on the window 401. The window 402 is displayed at the rear of the window 401 and hidden. When the user drags an object in the window 401 (YES in step S304), the CPU 106 executes processing of switching the display layer of the window 402 from the back to the topmost position in step S305. Note that the two-dimensional position of the window 402 on the display screen does not change, and the position of an origin 424 of the window 402 remains unchanged even after the switching. The CPU 106 operates in accordance with the OS 202 and executes control to display the window 402 as the topmost window, as shown in FIG. 4B. This allows the user to easily recognize the window 402 that is the drop destination of the drag target object. At this time, the window can be prevented from impeding the operation, as described with reference to FIG. 3 and the like, resulting in higher user operability.

In step S305, the CPU 106 may also execute processing of removing, for example, a menu bar 421 and a tool bar 422 other than a drop area 423 in the window 402, that is, the areas of items unnecessary for the drop operation from the window 402 and turning off the display of them. This reduces the display size of the entire window 402 by the area of the menu bar 421 and the tool bar 422 and also reduces the area overlapping the window 401. It is therefore possible to solve the problem that it is difficult for the user to view the window 401 of the drag source, resulting in higher user operability.

In step S305, the CPU 106 may also execute processing of reducing the display size of the window 402. This reduces the display size of the entire window 402 and also reduces the area overlapping the window 401. It is therefore possible to solve the problem that it is difficult for the user to view the window 401 of the drag source, resulting in higher user operability. Note that the reduction ratio can be either a fixed value set in advance or a value calculated based on the display sizes of the windows 401 and 402. Conversely, the CPU 106 may increase the display size of the window 402 in step S305. This facilitates the user's drop operation. A scroll bar is added to the reduced window 402. The display position in the window 402 changes as the user moves the scroll bar. If an input pointer such as a caret or an input focus is displayed in the original window 402, the CPU 106 decides the position of the scroll bar such that the position of the input pointer is displayed in the drop area 423.

The CPU 106 may control to spuriously display the input pointer and then return the display state to that before execution of step S305. Spuriously displaying the input pointer enables to point out explicitly the user the reference of drop input in the window of the event detection application displayed as the topmost window even when the event detection application is inactive.

In step S305, the CPU 106 may also execute processing of changing the display magnification (enlargement ratio) of zoom display of the drop area 423 with respect to the entire window 402. This makes it possible to ensure a large drop area 423 even if the window 402 has a reduced display size. It is therefore unnecessary to decrease the amount of contents to be displayed in the drop area. The display magnification can be either predetermined or calculated based on the display size of the original window 402, the display magnification of the drop area 423, and the display size and display magnification of the window after the switching processing.

In step S305, the CPU 106 may also execute processing of turning off the display of the window 402 and switching to display of an icon dedicated to the drop processing. The icon dedicated to drop processing need only receive object drop and can be much smaller than the display size of the normal window 402. This reduces the overlap area between the icon dedicated to drop processing and the window 401 as compared to the window 402. It is therefore possible to solve the problem that it is difficult for the user to view the window 401, resulting in higher user operability. Note that the icon is desirably displayed together with a mark or message representing reception of object drop. The icon dedicated to the drop processing itself may be movable in response to the user's drop operation. This allows the user to display the icon dedicated to drop near the drag target object. Hence, the drag distance of the object up to the icon dedicated to drop can shorten, and the time and labor for the operation can also decrease. The CPU 106 may store the moving position of the icon dedicated to drop (the origin of the icon) and read it out as the initial position when switching to the icon dedicated to drop in step S305. In this case, the icon dedicated to drop is displayed at a user's desired position set previously, resulting in higher user operability. The user may be able to select the initial position from the stored moving position of the icon dedicated to drop and a predetermined position (the origin of the window 402).

Note that in step S305, the CPU 106 temporarily stores, in the RAM 108, display history information such as the display layers, two-dimensional positions (origins 424 and 425) on the display screen, display sizes (vertical and horizontal lengths), and display items of the windows 401 and 402 in the state shown in FIG. 4A before execution of the switching processing. After that, the CPU 106 executes the above-described switching processing. In step S307, the CPU 106 operates in accordance with the event detection application, reads out, from the RAM 108, the display history information temporarily stored in step S305, and accordingly returns the display formats of the windows 401 and 402 to the original forms. The CPU 106 operates in accordance with the OS 202 and displays, on the display screen, the windows 401 and 402 returned to the original display formats, as shown in FIG. 4A. Note that the display items also include highlight display of a predetermined character string and the display shape and display position of an input pointer such as an input caret. They are also displayed in the same manner as before execution of the above-described switching processing.

When detecting the drop operation in step S306 and executing the process in step S307, the CPU 106 executes the process in step S307 after detecting the completion of processing executed in response to the drop operation, for example, move or copy of a file corresponding to an object. This prevents the event detection application from becoming inactive before event distribution from the OS 202 to the event detection application as the CPU 106 has detected the event in step S306 and immediately after that executed the process in step S307. Additionally, the process or change of processing executed in response to the drop operation is displayed, and after that, the display switches. This enables the user to confirm execution of the processing.

Note that some kinds of OSs provide no API capable of acquiring event identification information directly indicating an event. In such a case, the CPU 106 operates in accordance with the OS 202 and detects an event representing the operation state of the PD 105. Then, when operating in accordance with the event detection application, the CPU 106 may determine a drag event, drop event, or drag stop event based on the event representing the operation state. For example, the CPU 106 operates in accordance with the event detection application. If the event detected in accordance with the OS is mouse down, the CPU 106 acquires a window where the mouse down position exists. The CPU 106 then acquires the area segments of the window based on the window and the mouse down position. In the processing of, for example, Windows®, the area segments can be acquired by a result of a WM_N-CHITTEST message. In this case, an object list display area, menu, horizontal scroll bar, vertical scroll bar, and the like are segmented. The segments used here also include a horizontal scroll bar, vertical scroll bar, and the like as the display style of the window itself. In this case, the scroll bars are determined as the object list display area based on only their positions. To prevent this, the parentage of the style and window is taken into consideration. If the type of the OS changes, the determination method also changes accordingly, as a matter of course. If an acquired area segment is the object list display area, a timer starts measurement, and the mouse down position is stored. If an event then detected in accordance with the OS is mouse move, the CPU 106 compares the mouse down position with the current mouse position. If the distance between them has a predetermined value or more, the CPU 106 determines that the operation is a drag operation. Alternatively, the CPU 106 may further acquire the area segment of the window where the current mouse position exists. If the area segment is the object list display area, the CPU 106 may determine the operation as a drag operation. If the event detected in accordance with the OS is mouse up, the CPU 106 determines that the operation is a drop operation and stops measurement of the timer. Otherwise, the CPU 106 may further acquire the area segment of the window where the mouse position exists. If the area segment is the drop area 423 of the event detection application, the CPU 106 may determine that the drop operation has been executed. If no event has been detected even after the timer measurement time has exceeded a predetermined time, the CPU 106 determines that the drag operation has been stopped. In the above-described way, the CPU 106 can detect a drag event, drop event, and drag operation stop event based on an event representing the operation state of the mouse.

The CPU 106 may also operate in accordance with the event detection application and execute the switching processing based on the type of the application of the drag source window. In this case, the CPU 106 operates in accordance with the event detection application and acquires information about a process having the window at the mouse down position together with the mouse down event. The information about the process includes, for example, the executable file name and operation time of the application. The CPU 106 operates in accordance with the event detection application and compares application information registered in advance as an execution target with the application information of the acquired mouse down position. If the two pieces of information coincide, the CPU 106 executes the switching processing. On the other hand, if these pieces of information do not coincide, the CPU 106 does not execute the switching processing. This prevents an object the event detection application cannot handle from being dropped on the window. Assume that the event detection application is an application which handles document files, and the application information of a predetermined file management application such as Explorer is registered in advance. At this time, if an event has been determined as drag from the window of the file management application, the window of the event detection application is displayed as the topmost window. On the other hand, if the event has been determined as drag from a text editing application which does not handle a file of notepad or the like as an object, the display of the window of the event detection application does not change at all and remains unchanged. This prevents unnecessary window display switching and also prevents the user from being led to a wrong drop operation.

The CPU 106 may operate in accordance with the event detection application, and upon determining based on the application information of the acquired mouse down position that the drag source application itself can receive the drop operation, prohibit immediate execution of the switching processing. Upon determining based on the application information of the acquired mouse down position that the drag source application itself can receive the drop operation, the CPU 106 causes the timer to start measurement. When the timer measurement time has exceeded a predetermined time, the CPU 106 executes the switching processing and displays the window of the event detection application as the topmost window. Note that the CPU 106 does not execute the switching processing upon detecting a drop event or a drag stop event before the time measurement time exceeds the predetermined time. This can prevent the window of the event detection application from impeding the user operation of dropping an object on the window of the drag source application.

The CPU 106 may obtain the moving direction based on the mouse positions at the start of drag and during the drag. If the window of the event detection application exists within a predetermined range from the moving direction, the CPU 106 may execute the switching processing. Otherwise, the CPU 106 may stop the switching processing. This makes it possible to suppress unnecessary switching processing and reduce the process load.

In the case described in this embodiment, the event detection application and the application of the window where the objects are arranged are different application programs. However, the applications may be identical. When one window detection application displays a plurality of windows, and the user starts dragging an object in one window, the embodiment is applicable to control display of another window.

As described above, according to this embodiment, when an object arranged in the topmost window is dragged, the window of an application behind it which has set an event detection request in the OS is displayed as the topmost window. The window of a user's desired application is displayed as the topmost window, and the window of an unnecessary application is displayed behind. This prevents the user operation from being impeded. According to this embodiment, when an object arranged in the topmost window is dragged, the window behind it is displayed as the topmost window after size reduction or iconization. Even when the back window is displayed as the topmost window, the area overlapping the drag source window becomes small. This prevents the user operation from being impeded.

[Second Embodiment]

This embodiment suppresses a decrease in the visibility of an object drag source window when a window for receiving drop of an object moves from the back to the topmost position. Note that in this embodiment, a description of the same components as in the above-described first embodiment will not be repeated. Components unique to the second embodiment will be explained in detail.

Figure 5:
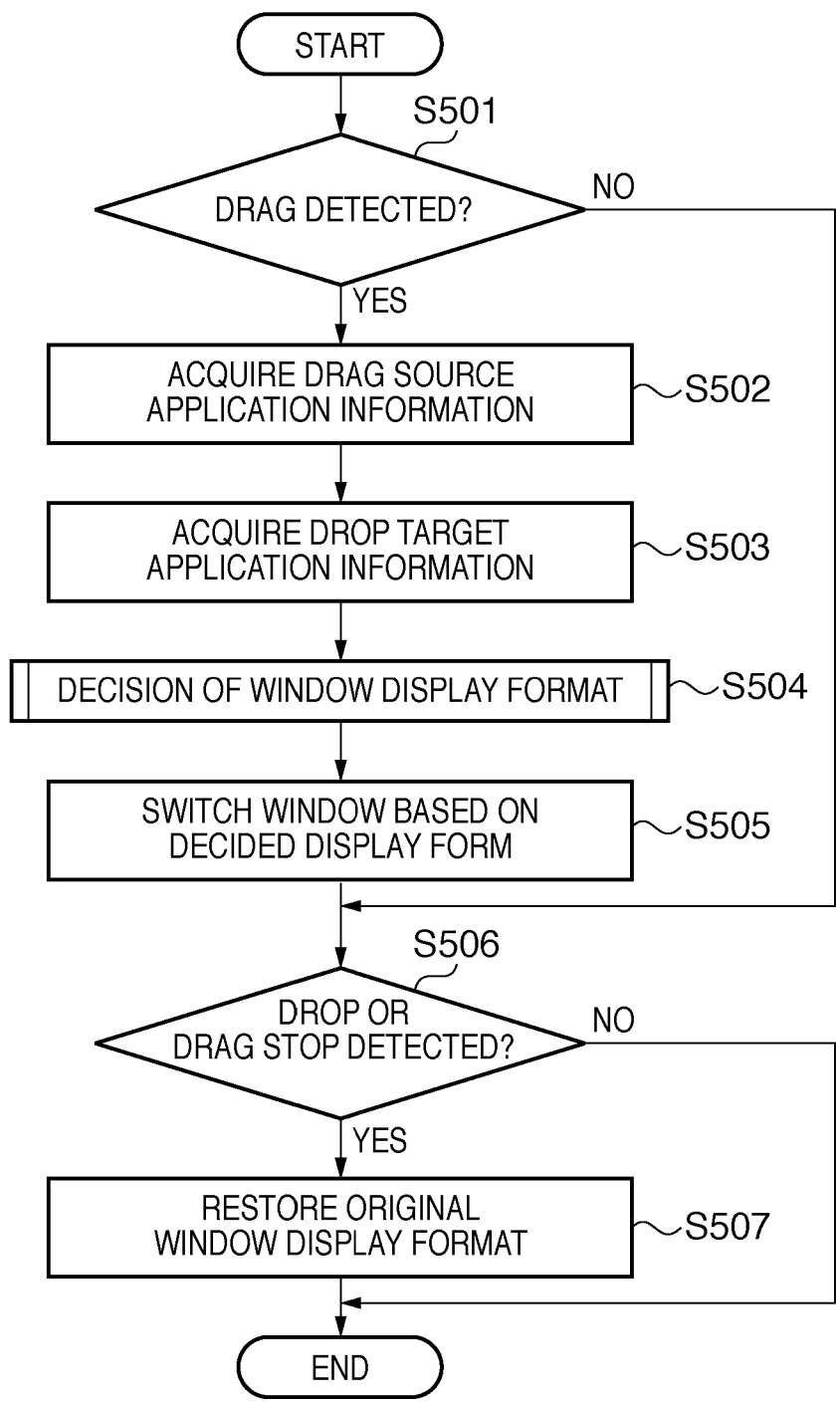
FIG. 5 is a flowchart illustrating the procedure of processing to be executed by a PC according to the second embodiment.

Processing will be explained which causes a PC 100 that is displaying, on the display screen, a plurality of windows according to a plurality of application programs to switch the display format of the window of an event detection application program behind in response to a drag operation. FIG. 5 is a flowchart illustrating processing of causing a CPU 106 of the PC 100 to operate in accordance with an OS 202, detect a drag event, and switch the display format of a window.

In step S501, the CPU 106 detects an event and then determines whether it is a drag event. If it is a drag event, the process advances to step S502. Otherwise, the processing advances to step S506. In step S502, the CPU 106 acquires the information of the drag source application (drag start application). In step S503, the CPU 106 acquires a list of information of running applications and extracts the information of the object drop target application. In step S504, the CPU 106 decides the display format of each window based on the information of the drag source application acquired in step S502 and the list of the information of the object drop target application extracted in step S503. The CPU 106 also records, in a memory (e.g., RAM 108), information about the current display of each window as display history information. In step S505, the CPU 106 switches the display format of each window based on the display format decided in step S504. When the CPU 106 detects a drop or drag stop event in step S506, the process advances to step S507. Otherwise, the processing ends. In step S507, based on the display history information recorded in step S504, the CPU 106 displays each window in its original state before execution of window display switching in step S505 and ends the processing.

Figure 6A:
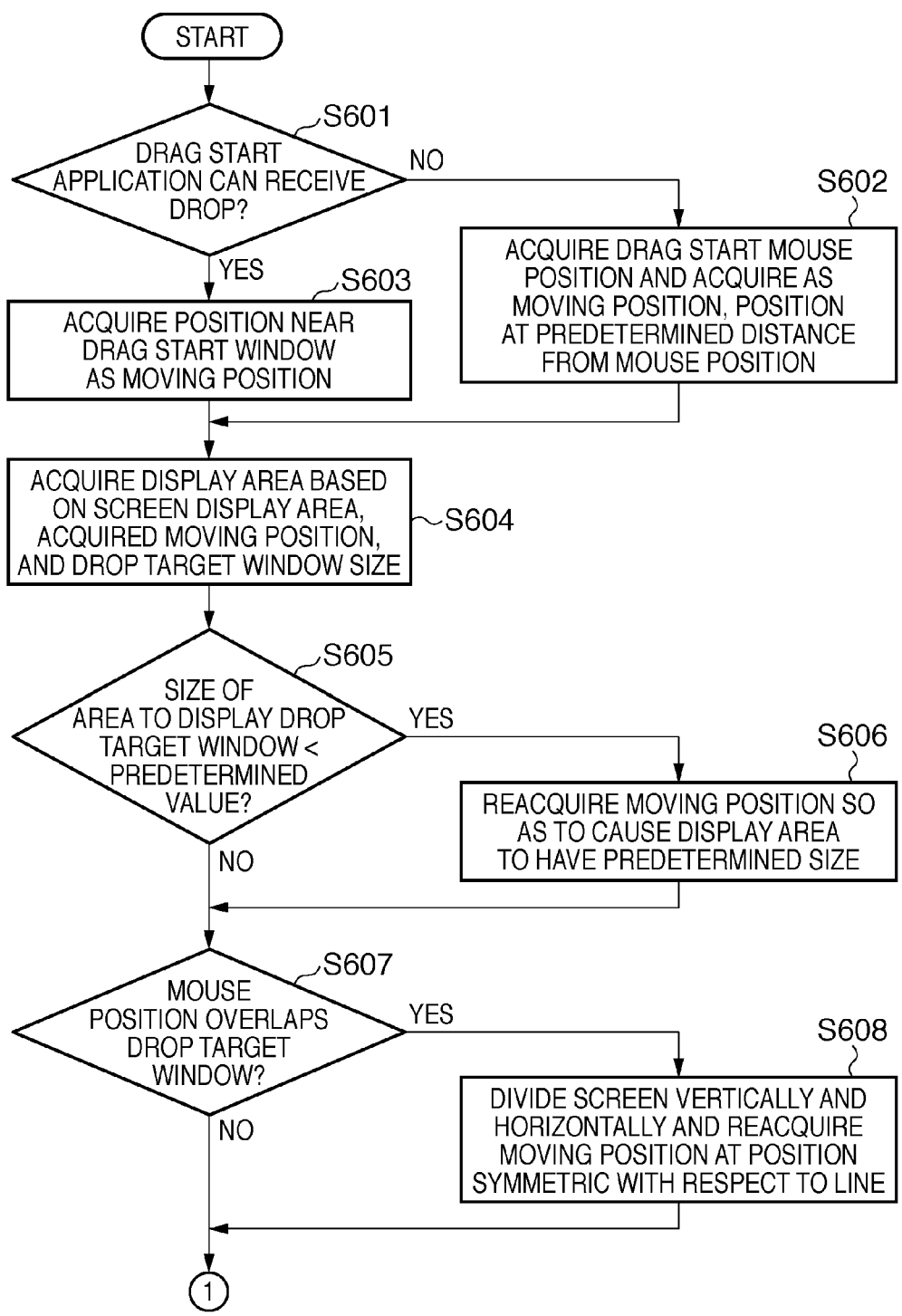
FIGS. 6A and 6B are flowcharts illustrating the procedure of processing to be executed by the PC according to the second embodiment.
Figure 6B:
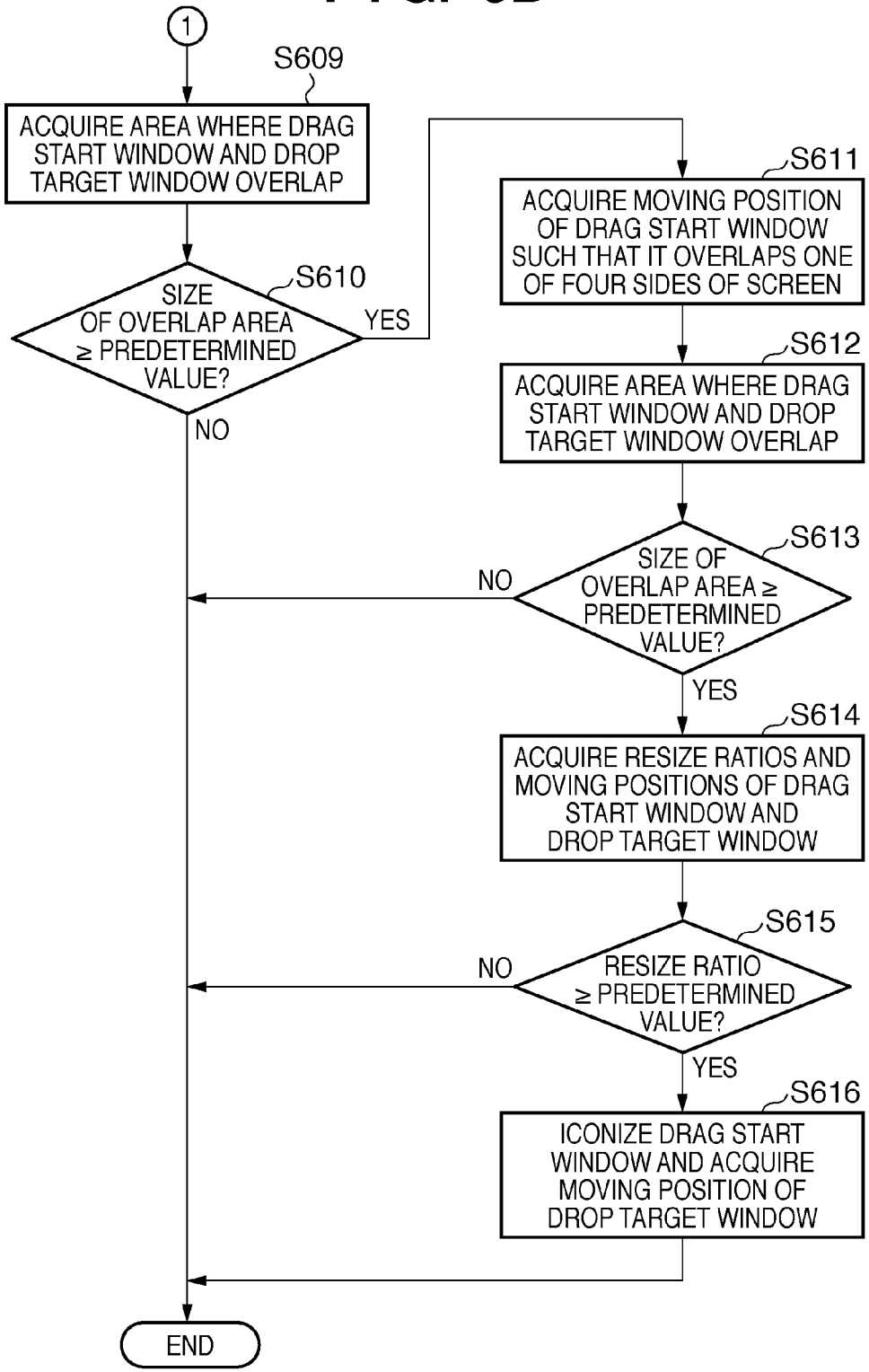

FIGS. 6A and 6B are flowcharts illustrating details of the process in step S504 of FIG. 5. In step S601, the CPU 106 analyzes the information of the drag source application acquired in step S502, and determines whether the drag source application itself can receive drop of an object. If it is impossible to receive drop of an object, the process advances to step S602. If possible, the process advances to step S603. In step S602, the CPU 106 acquires the mouse position at the start of object drag and obtains the moving position of the window of the drop target application so as to locate the window at a predetermined distance from the mouse position.

Figure 7A:
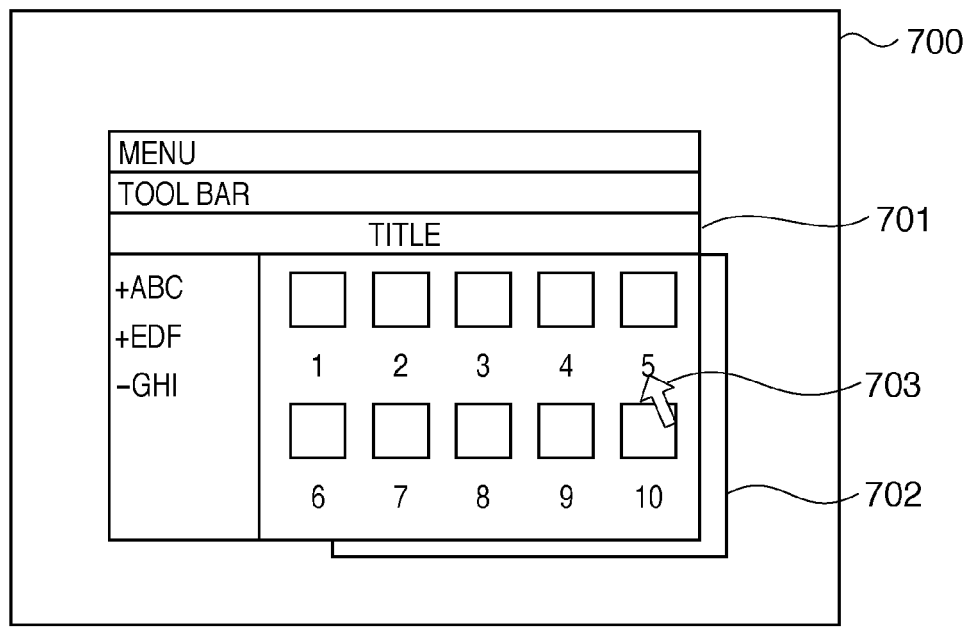
FIGS. 7A to 7F are views showing examples of window display format switching states according to the second embodiment.
Figure 7B:
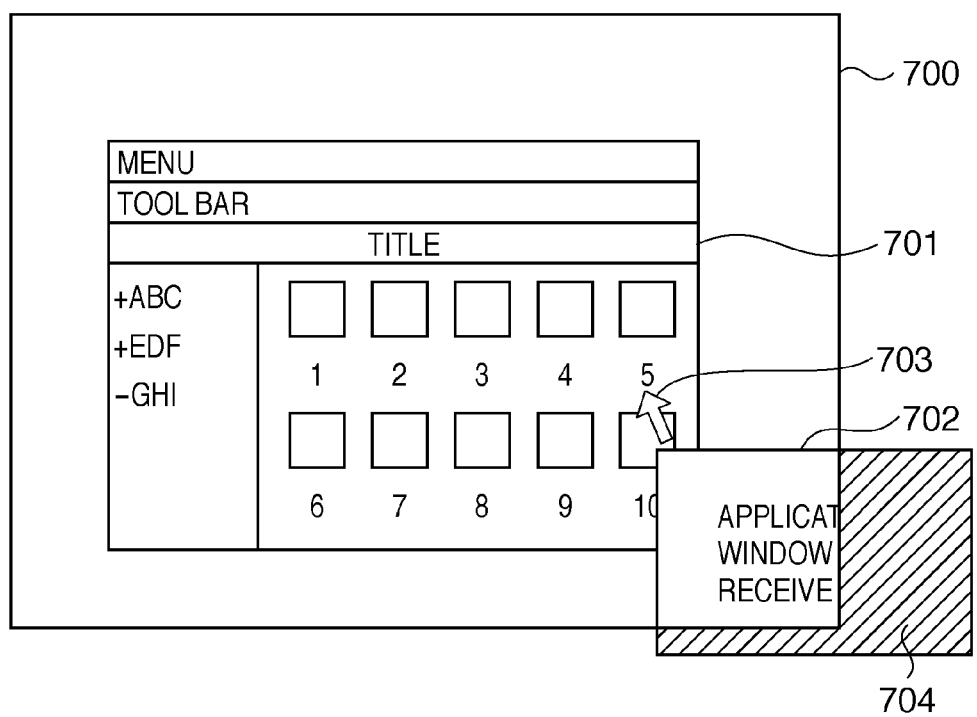

Even during the position obtaining processing, drag continues, and the object is moving. Hence, the position of the window of the drop target application may be obtained in consideration of the moving direction, moving speed, and cursor size of the mouse. Assume that on a display screen 700 shown in FIG. 7A, the user starts dragging object "10" at the position of a mouse cursor 703 in a window 701 of a drag source application. In this case, the moving position of a window 702 of a drop target application hidden behind the window 701 of the drag source application is placed near the mouse cursor 703, as shown in FIG. 7B.

Figure 7C:
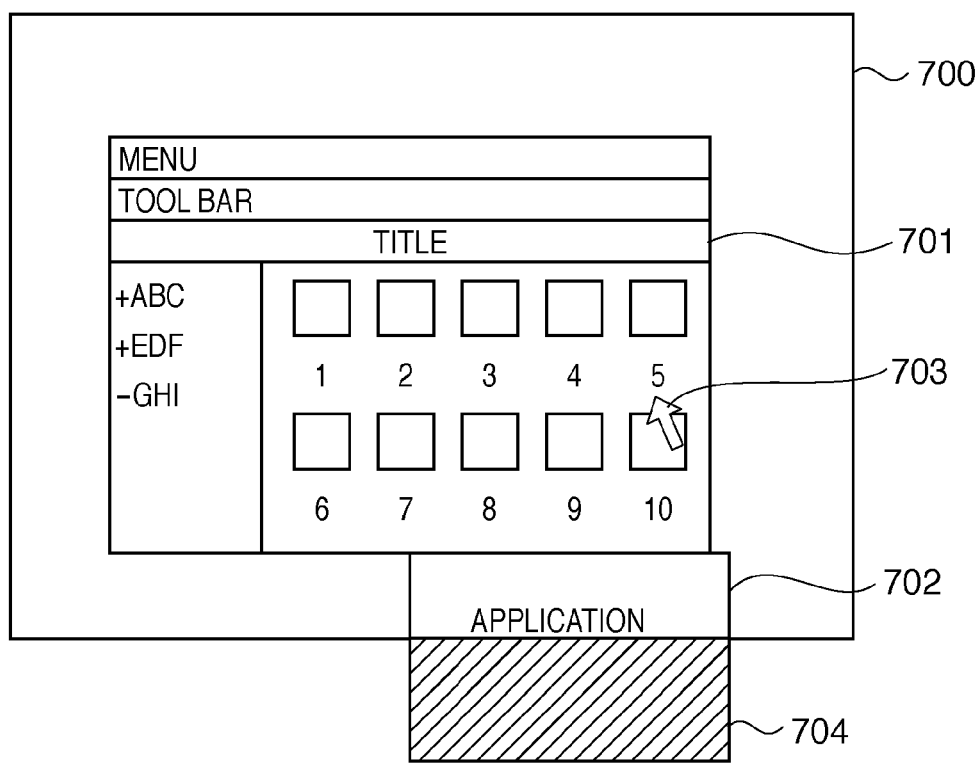

On the other hand, in step S603, the CPU 106 obtains the moving position of the window of the drop target application so as to locate the window near the window of the drag source application. The position near the window of the drag source application is, for example, a position which is translated upward, downward, leftward, or rightward from the position of the window of the drop target application before the movement by a minimum moving distance. This makes the user's sense of incongruity caused by the movement as small as possible. For example, the moving position of the window 702 of the drop target application that is hidden behind the window 701 of the drag source application in the state shown in FIG. 7A is set near the window 701 of the drag source application, as shown in FIG. 7C.

Figure 7D:
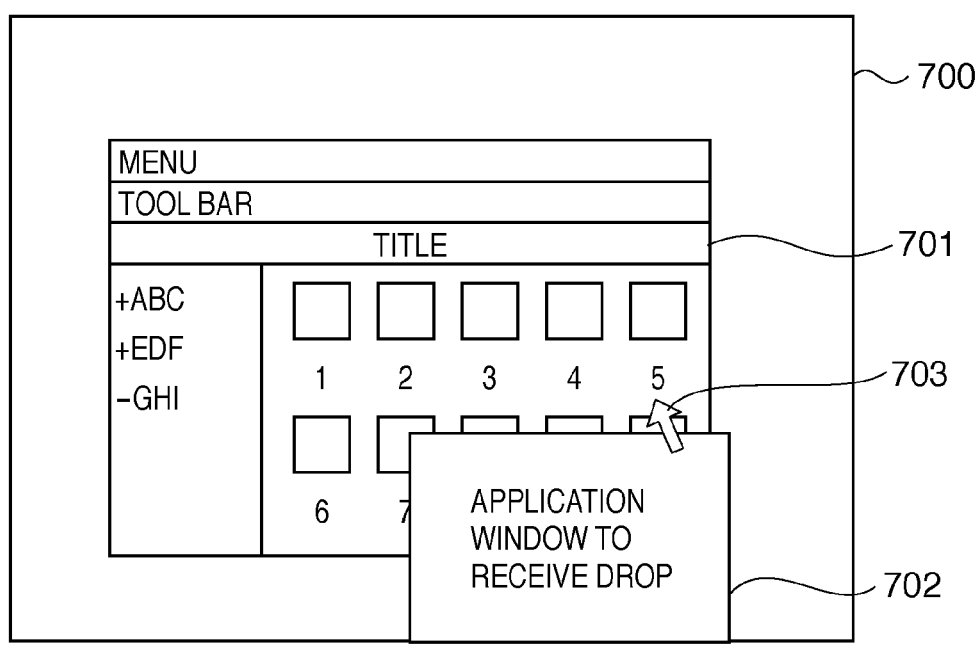

In step S604, based on the screen display area, the moving position of the window of the drop target application, and the display size of the window, the CPU 106 acquires an area where the window of the drop target application is displayed on the display screen. This display area indicates the area except a hatched portion 704 of the window 702 in FIG. 7B or 7C. The hatched portion 704 is located outside the display range of the display screen 700 and therefore not displayed. In step S605, the CPU 106 determines whether the size of the area which is acquired in step S604 to display the window of the drop target application on the screen is smaller than a predetermined size. If the display area size is smaller than the predetermined size, the process advances to step S606. Otherwise, the process advances to step S607. In step S606, the CPU 106 updates the moving position of the window of the drop target application so as to cause the display area to have the predetermined size. Note that the CPU 106 may use in step S604 not the display area size but the ratio of the display area size to the size of the whole display screen. In addition, obtaining, as the moving position, a position which is translated upward, downward, leftward, or rightward from the position of the window of the drop target application before the movement by a minimum moving distance allows to reduce the user's sense of incongruity caused by the movement as much as possible. For example, the moving position of the window 702 of the drop target application is set within the display screen, as shown in FIG. 7D. Note that FIG. 7D illustrates such a moving position that the window 702 is completely displayed. However, the moving position may be set not to display part of the window 702. For example, as long as the area concerning the drop operation exists within the display screen, the irrelevant area may be located outside the display screen.

Figure 7E:
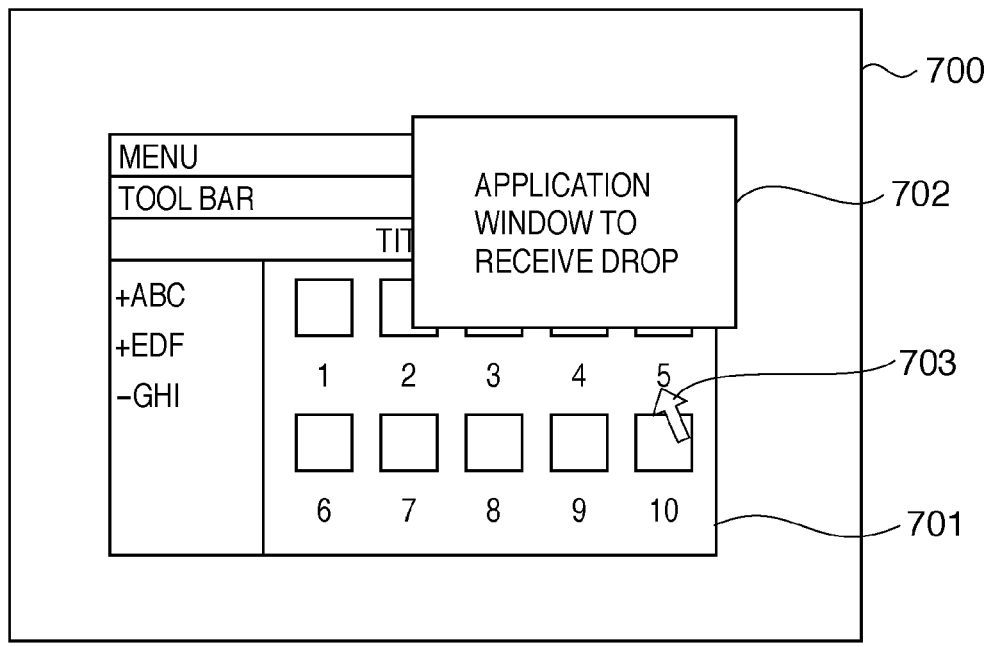

Next, in step S607, based on the mouse position and the moving position and display size of the window of the drop target application, the CPU 106 determines whether the mouse position overlaps the moved window of the drop target application. If they overlap, the process advances to step S608. Otherwise, the process advances to step S609. Note that even during the determination processing, drag is being performed. Hence, the position of the window of the drop target application may be obtained in consideration of the moving direction, moving speed, and icon size of the mouse in addition to the mouse position used in step S607. Alternatively, a moving start mouse position may be used. In step S608, the CPU 106 divides the display screen into four parts by dividing it into two equal parts vertically and horizontally. The CPU 106 then obtains the position so as to move the window of the drop target application to a divided screen which is symmetric to the divided screen including the mouse position with respect to a line or a point. The divided screens will be defined as an upper right quadrant, lower right quadrant, lower left quadrant, and upper left quadrant sequentially counterclockwise from the upper right divided screen. If the mouse position is assumed to be in the upper left quadrant, the moving position of the window of the drop target application is obtained in the upper right or lower left quadrant which is symmetric to the upper left quadrant with respect to a line. At this time, it is possible to minimize the user's sense of incongruity caused by the movement by obtaining a position with a minimum moving distance. Note that the moving position of the window of the drop target application may be obtained in the lower right quadrant which is symmetric to the upper left quadrant with respect to a point. If the mouse position is near the center of the display screen and overlaps the window of the drop target application in any quadrant, a position near the mouse position may be obtained as the position of the window of the drop target application in consideration of the cursor size of the mouse. This makes it possible to avoid the state shown in FIG. 7D in which the window 702 of the drop target application overlaps the mouse cursor 703. The moving position of the window 702 of the drop target application is set not to overlap the mouse cursor 703, as shown in FIG. 7E.

Figure 7F:
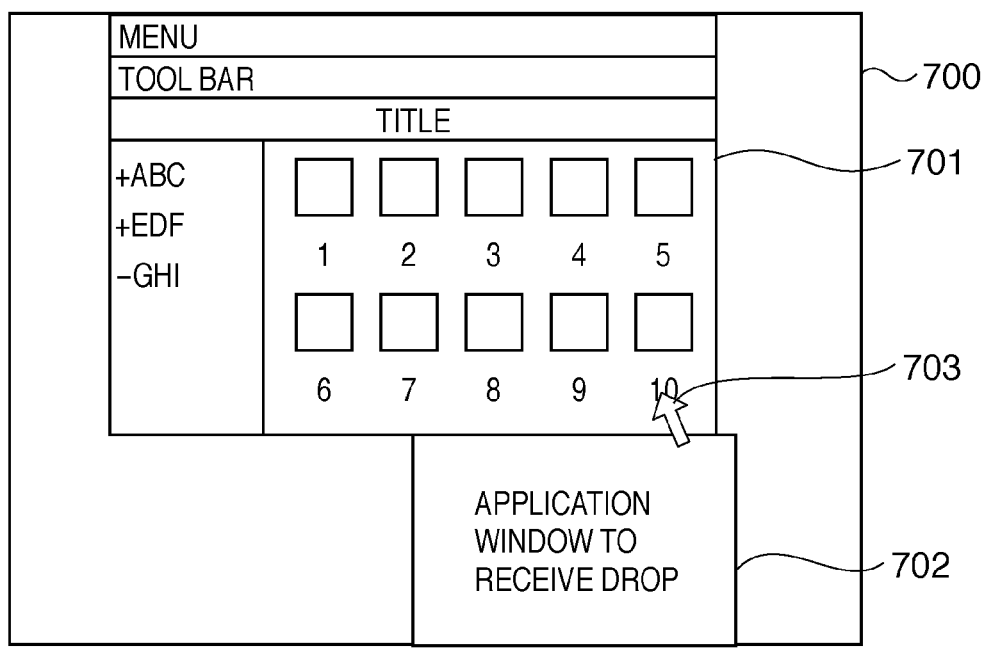

In step S609, based on the position and display size of the window of the drag source application and the moving position and display size of the window of the drop target application, the CPU 106 acquires an area where the two windows overlap. In step S610, the CPU 106 determines whether the size of the overlap area acquired in step S609 is equal to or larger than a predetermined size. The predetermined size is the area of the overlap area between the window of the drag source application and that of the drop target application at the start of the drag operation. If the size of the overlap area is equal to or larger than the predetermined size, the process advances to step S611. Otherwise, the processing ends. In step S611, the CPU 106 obtains the moving position of the window of the drag source application as well such that it overlaps one of the four sides of the screen or a plurality of portions thereof. At this time, obtaining a position with a minimum moving distance as the moving position of the window of the drag source application makes it possible to minimize the user's sense of incongruity caused by the movement. The moving position of the window 701 of the drag source application is set not to overlap the window 702 of the drop target application, as shown in FIG. 7F. Note that the CPU 106 may use in step S610 not the size of the overlap area but the ratio of the overlap area to the size of the window of the drag source application. Additionally, since the window 701 of the drag source application and the window 702 of the drop target application do not overlap at the moving position, overlap of the mouse cursor need not be taken into consideration.

Figure 10A:
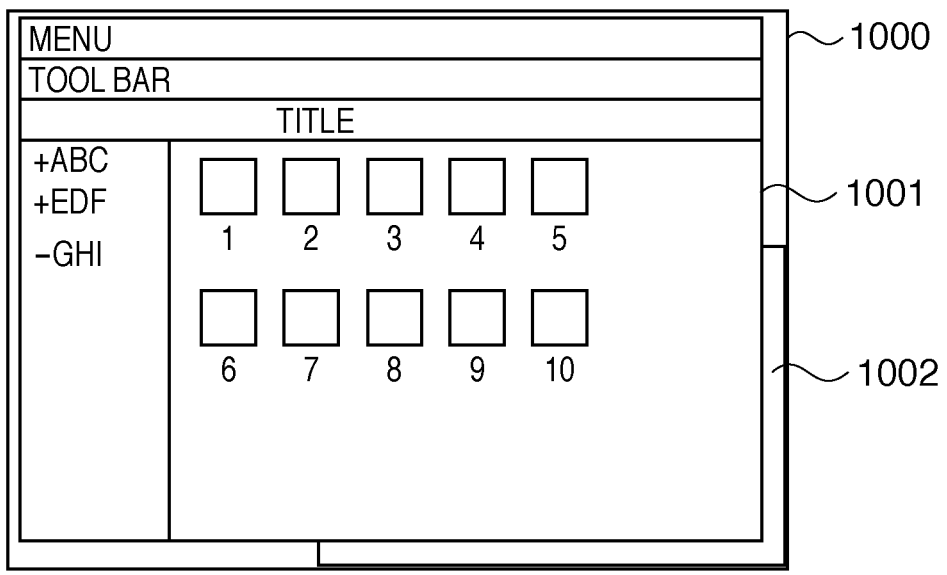
FIGS. 10A and 10B are views showing examples of window display format switching states according to the second embodiment.
Figure 10B:
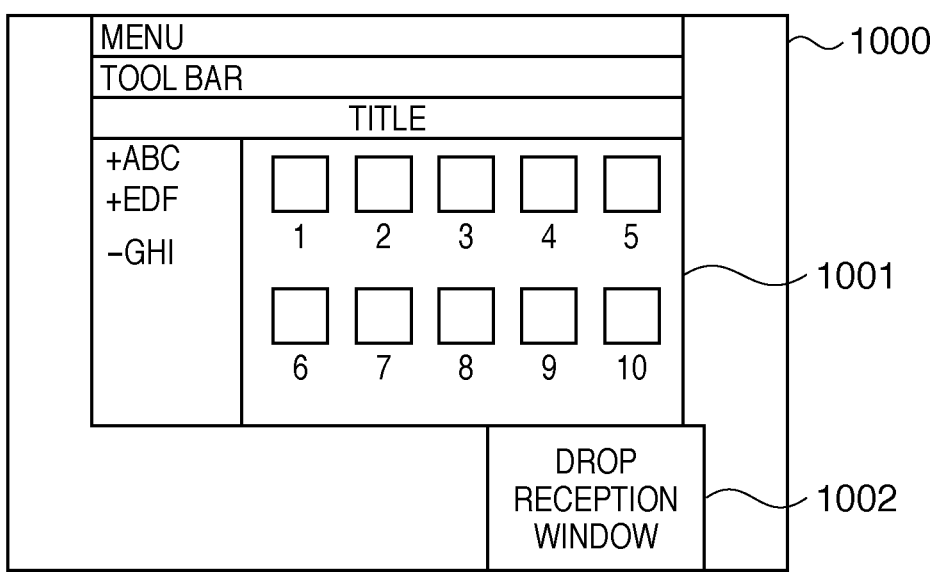

In step S612, based on the moving position and size of the window of the drag source application and those of the window of the drop target application, the CPU 106 acquires an area where the two windows overlap. In step S613, the CPU 106 determines whether the size of the overlap area acquired in step S612 is equal to or larger than a predetermined size. The predetermined size is the area of the overlap area between the window of the drag source application and that of the drop target application at the start of the drag operation. If the size of the overlap area is equal to or larger than the predetermined size, the process advances to step S614. Otherwise, the processing ends. In step S614, the CPU 106 obtains the resize ratio and moving position of the window of the drag source application and those of the window of the drop target application. At this time, when a position with a minimum moving distance at the same resize ratio is obtained for each of the window of the drag source application and that of the drop target application, the user's sense of incongruity caused by the resize and movement can be made as small as possible. Assume that drag starts when a window 1001 of the drag source application is displayed in almost the same size as a display screen 1000, and a window 1002 of the drop target application is hidden behind it, as shown in FIG. 10A. In this case, the window 1001 of the drag source application and the window 1002 of the drop target application are resized and moved, as shown in FIG. 10B. Note that the CPU 106 may use in step S613 not the size of the overlap area but the ratio of the overlap area to the size of the window of the drag source application. In step S615, the CPU 106 determines whether the resize ratio obtained in step S614 has a predetermined value or more. If it has the predetermined value or more, the process advances to step S616. Otherwise, the processing ends. In step S616, the CPU 106 iconizes the window of the drag source application and acquires the moving position of the window of the drop target application. If resize of the window of the drag source application needs to be done excessively, iconizing it facilitates the drop operation on the window of the drop target application.

Note that upon detecting drag in step S501, the CPU 106 detects the state of the window of the drag source application. If the window is displayed in a maximum size, the window size is returned from the maximum size to the original size. After detecting the drag in step S501, the CPU 106 may always detect the states of the windows of the drag source application and the drop destination application, and if the window is displayed in the maximum size, return the window size from the maximum size to the original size.

Upon determining in step S503 that a plurality of applications are running, the CPU 106 excludes, from the drop targets, the drag source application, applications having windows minimized, and applications the user has set in advance as non-drop targets. Alternatively, the CPU 106 gives priority orders to the running applications based on the window overlap order and the startup time and idle time of each application, and extracts the application having the highest priority order as the drop target application. Otherwise, the CPU 106 may detect the moving direction of the drag and extract a window with the longest distance overlapping the moving direction as the drop target.

Figure 11A:
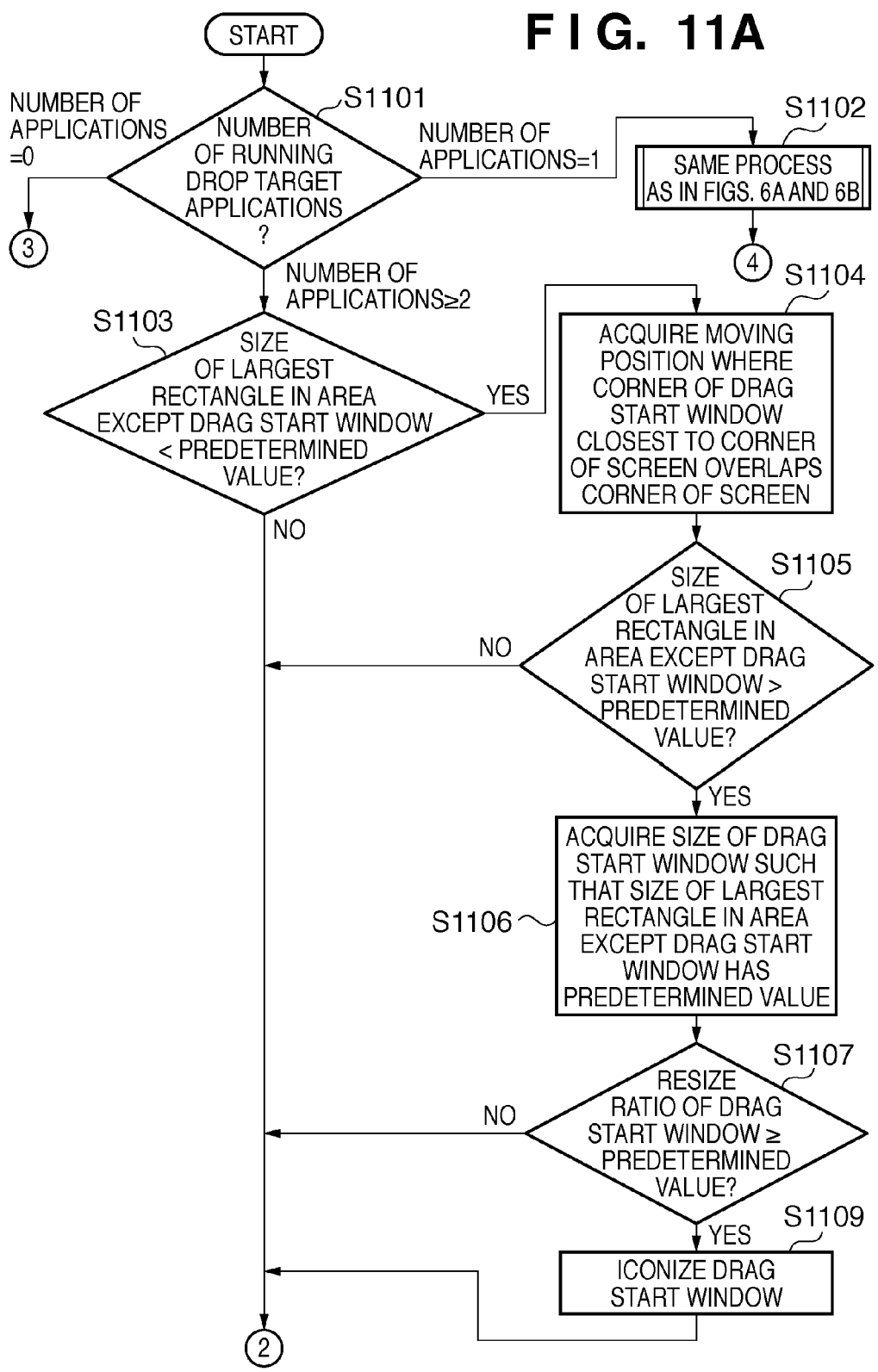
FIGS. 11A and 11B are a flowcharts illustrating the procedure of processing to be executed by the PC according to the second embodiment.
Figure 11B:
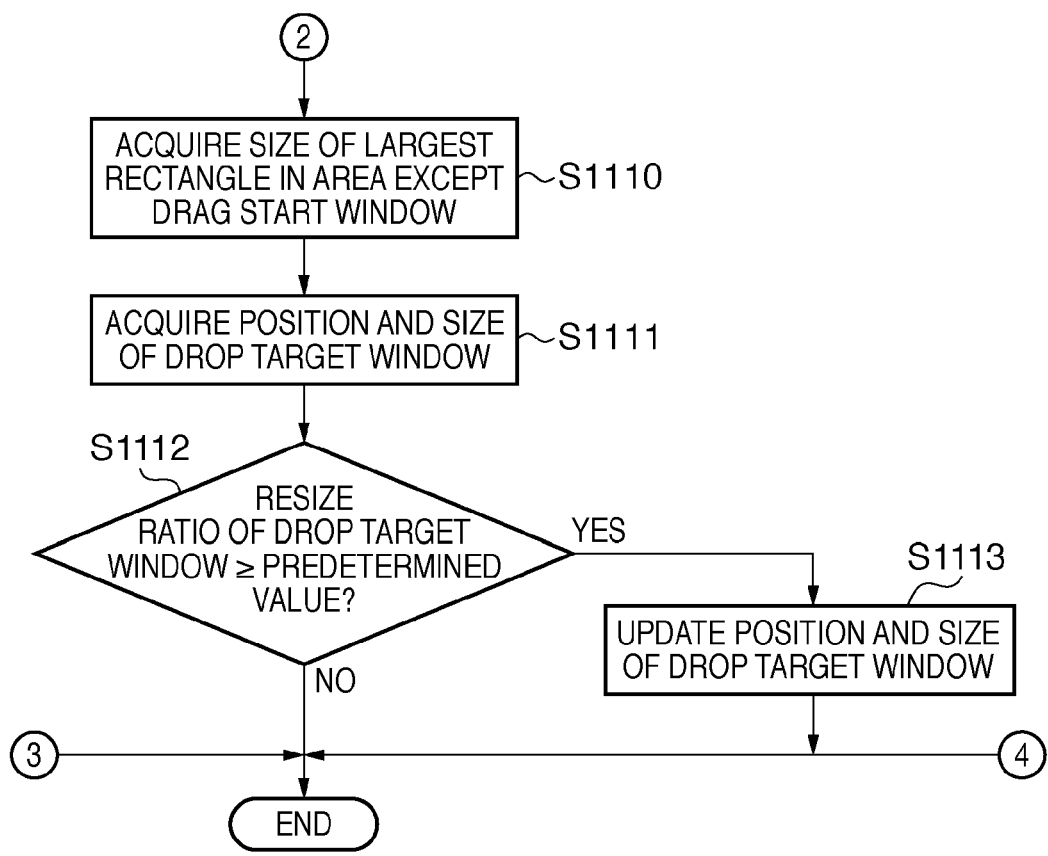

A case in which a plurality of applications exist as the drop targets will be explained next. FIGS. 11A and 11B are flowcharts illustrating processing of causing the CPU 106 of the PC 100 to operate in accordance with the OS 202, detect a drag event, and switch the display formats of a plurality of windows.

In step S1101, the CPU 106 acquires the number of running applications. If the number is one, the process advances to step S1102. If the number is two or more, the process advances to step S1103. If no application exists, the processing ends. In step S1102, the CPU 106 executes the processing described with reference to FIGS. 6A and 6B. In step S1103, the CPU 106 acquires an area of the display screen except the window of the drag source application and determines whether the size of the largest rectangle included in that area has a value smaller than a predetermined value. If the size of the largest rectangle has a value smaller than the predetermined value, the process advances to step S1104. Otherwise, the process advances to step S1110. In step S1104, the CPU 106 acquires, as the moving position of the window of the drag source application, a position where a corner of the window of the drag source application which is closest to a corner of the display screen overlaps the corner of the display screen. In step S1105, the CPU 106 acquires an area other than the window of the drag source application which is assumed to move to the moving position acquired in step S1104, and determines whether the size of the largest rectangle included in that area has a value smaller than a predetermined value. If the size of the largest rectangle has a value smaller than the predetermined value, the process advances to step S1106. Otherwise, the process advances to step S1110. In step S1106, the CPU 106 acquires the size of the window of the drag source application so that the size of the largest rectangle included in the area other than the window of the drag source application has a minimum value that is equal to or larger than the predetermined value. In step S1107, the CPU 106 acquires the resize ratio of the window of the drag source application based on the sizes acquired in step S1106 and determines whether the resize ratio has a predetermined value or more. If the resize ratio has the predetermined value or more, the process advances to step S1109. Otherwise, the process advances to step S1110. In step S1109, the CPU 106 iconizes the window of the drag source application. In step S1110, the CPU 106 acquires the size of the largest rectangle included in an area other than the window of the drag source application displayed at the moving position acquired in step S1104 in the size acquired in step S1106. In step S1111, the CPU 106 acquires the moving position and size of the window of each drop target application in accordance with the size of the largest rectangle acquired in step S1110. For example, the largest rectangle is divided based on the number of drop target applications acquired in step S1101, and a window is assigned to each divided area, thereby deciding the moving position and size of each drop target application. Alternatively, the CPU 106 may give priority orders to the drop target applications based on the window overlap order and the startup time and idle time of each application, and arrange the windows of the applications in accordance with the order. In step S1112, the CPU 106 acquires the resize ratio of the window of each drop target application and determines whether it has a predetermined value or more. If the resize ratio has the predetermined value or more, the process advances to step S1113. Otherwise, the processing ends. In step S1113, the CPU 106 removes drop target applications having lower priority orders from the switching processing targets such that the resize ratio of each window has the predetermined value, and acquires the position and size of the window of each of the remaining drop target applications. This makes it possible to arrange, on a display screen 1200, a window 1201 of the drag source application and a plurality of windows 1202 of the drop target applications, as shown in FIG. 12A. Reference numeral 1203 denotes a window of a drop target application removed from the switching processing targets in step S1113. Note that the position and size to be assigned to the window of each drop target application may be changed in accordance with the priority order, as shown in FIG. 12B. The window 1202 of each drop target application having a higher priority order is displayed in a size larger than that of the window 1203 of each drop target application having a lower priority order. To do this, the CPU 106 assigns the resize ratio stepwise in accordance with the priority order of each application in steps S1112 and S1113. Alternatively, the CPU 106 may assign, to each window, a position and size according to the priority order of the application in step S1111.

According to this embodiment, when moving an object arranged in the topmost window to a back window, not only the back window but also the topmost window moves or reduces the size. Hence, these windows do not interfere with each other. This increases the visibility of each window and improves the user operability.

[Third Embodiment]

The third embodiment will be described below. Note that in this embodiment, a description of the same components as in the above-described first embodiment will not be repeated. Components unique to the third embodiment will be explained in detail.

Figure 13A:
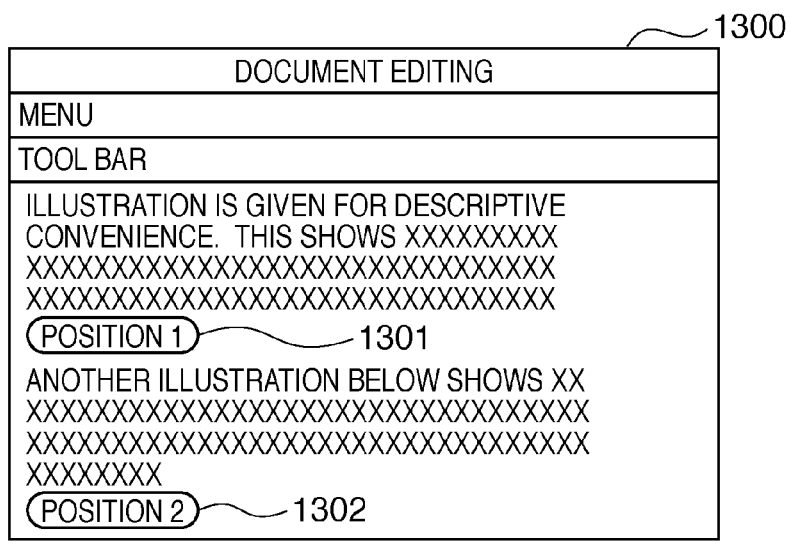
FIGS. 13A to 13D are views showing examples of windows according to the third and fourth embodiments.
Figure 13B:
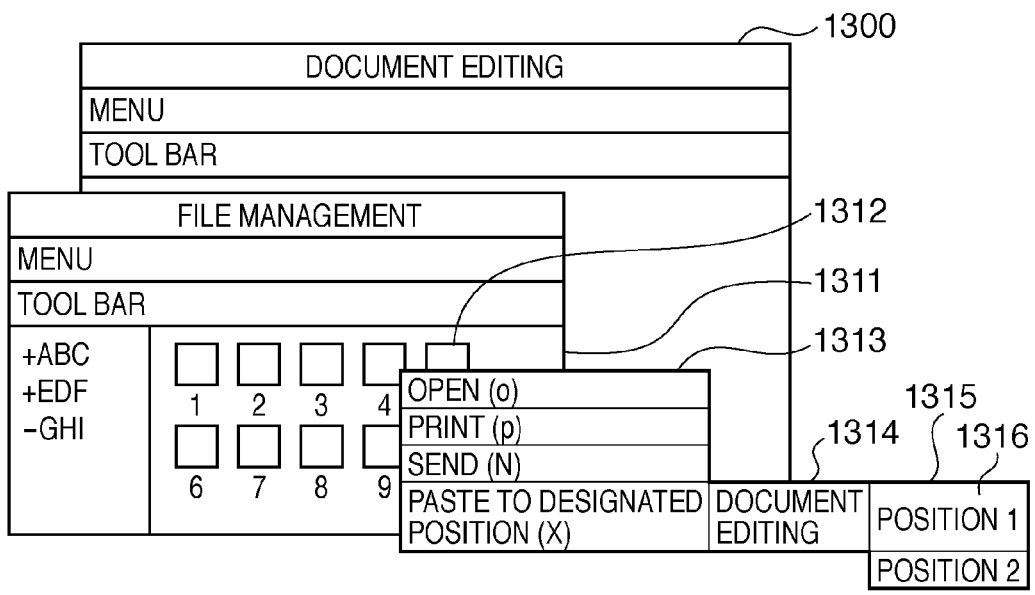
Figure 13C:
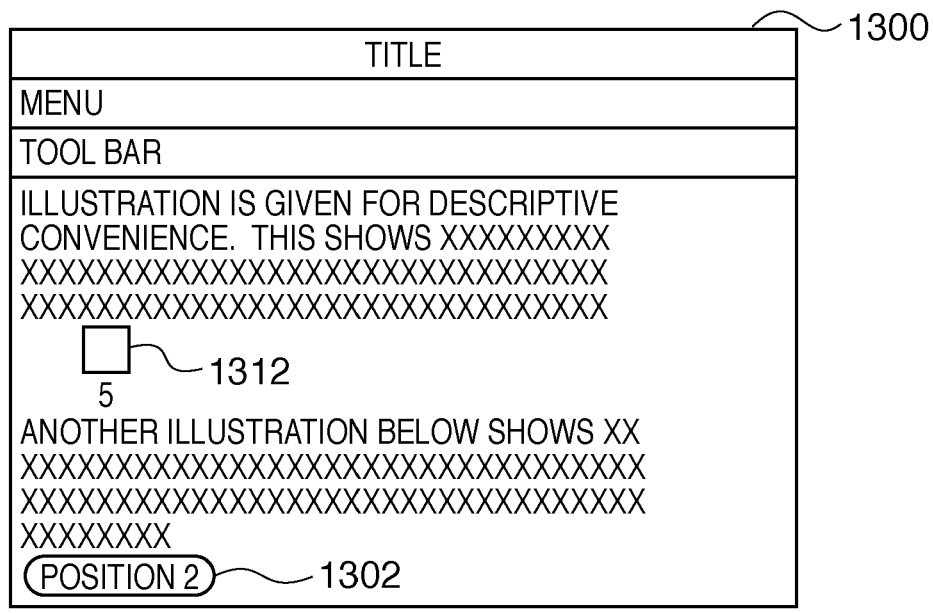

FIGS. 13A to 13C illustrate examples of windows which are displayed on the display screen of a PC 100 according to this embodiment until a paste position is designated, and data corresponding to an object is pasted at the object drop destination.

Assume that a CPU 106 of the PC 100 has started up a document editing application in response to a user operation and is editing a document file. In response to a user operation, the CPU 106 designates a position where data corresponding to an object should be pasted on the document file created by the document editing application. The designation can be done either during or after editing of the document file. FIG. 13A shows a state in which after the paste position designation, the document file is displayed in a window 1300 of the document editing application. Marks or icons are displayed at designated paste positions 1301 and 1302 in the window 1300 of the document editing application. This allows the user to easily confirm the paste positions.

After that, in response to a user operation, the CPU 106 starts up a file management application and displays, on the display screen, a window in which icons corresponding to data stored in an HDD 109 are displayed. In FIG. 13B, a window 1311 of the file management application is displayed in front of the window 1300 of the document editing application. When a data icon 1312 in the window 1311 of the file management application is selected, a menu 1313 is displayed. FIG. 13B also illustrates a state in which menus 1314 and 1315 sequentially pop up from the menu 1313 in response to a user operation, and an item 1316 is selected. Note that it is also possible to display the menu 1313 in response to right-click on the data icon 1312 or an instruction by a shortcut code. In this description, a menu that allows to select a designated paste position is displayed. However, the present invention is not limited to this. For example, the numbers of rows and columns, coordinates, or icon representing a position may be displayed. Alternatively, if a position represents a range, one of objects, object names, and representative characters within the range or a combination thereof may be displayed.

In response to selection of the item 1316, data corresponding to the data icon 1312 is pasted at a place corresponding to "position 1". FIG. 13C shows a state in which the data corresponding to the data icon 1312 is pasted when "position 1" is the paste position 1301 of the document file (FIG. 13A).

On the window 1311 of the file management application in which the list of data icons is displayed, the user can thus paste data corresponding to a data icon to a designated position of the document file created by the document editing application. This obviates the object drag operation and reduces the time and labor of user operations. A problem that the user loses the target paste position can also be solved.

Figure 14:
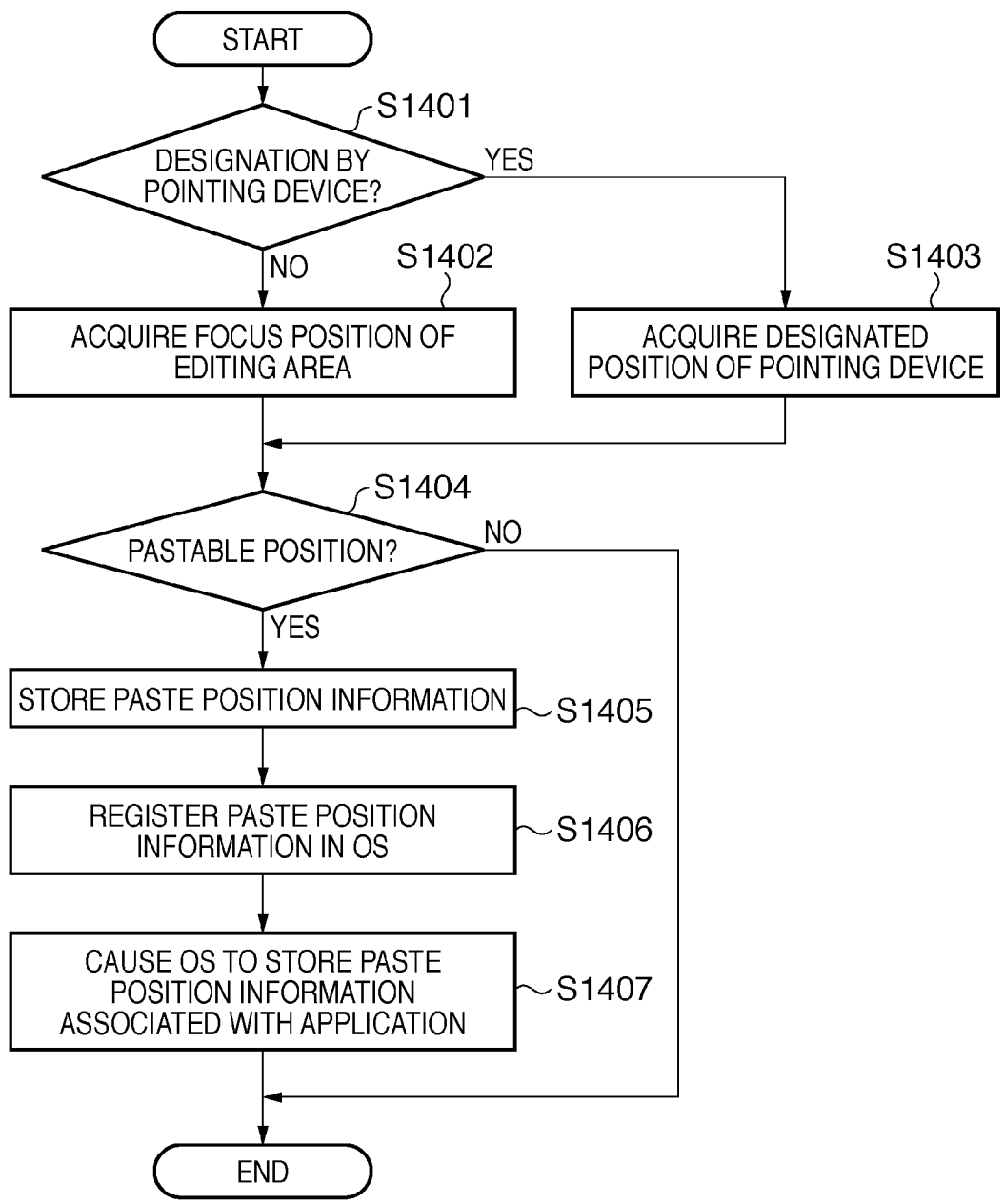
FIG. 14 is a flowchart illustrating an example of processing to be executed by a PC according to the third embodiment.

FIG. 14 illustrates a procedure of causing the PC 100 of this embodiment to set a paste position on a document file in response to a user instruction by using the document editing application.

In step S1401, in accordance with an instruction of the document editing application, the CPU 106 determines whether the user's paste position designation has been done by a PD 105 or a method other than the PD 105. If the user's paste position designation has been done by the PD 105, the CPU 106 performs the process in step S1403. If the user's paste position designation has been done by a method other than the PD 105, the CPU 106 performs the process in step S1402. In step S1402, in accordance with an instruction of the document editing application, the CPU 106 acquires a focus position in the editing area such as a cursor position or the area of a designated range. Note that without using the PD 105, for example, a mode that allows the user to operate the virtually displayed PD 105 using arrow keys and the like may be set so that the user can designate a position or a range only by operating the keys and acquire the designated position or area. In step S1403, in accordance with an instruction of the document editing application, the CPU 106 acquires the position of the PD 105 such as a position where the user has clicked a button of the PD 105 or the area of a range designated by the user using the PD 105. Note that in, for example the document editing application, the CPU 106 moves, in accordance with an instruction of the document editing application, the cursor to an appropriate position near the position where the user has clicked a button of the PD 105. The position acquired here may be converted into an appropriate position near the position designated by the user using the PD 105. In step S1404, in accordance with an instruction of the document editing application, the CPU 106 determines whether the paste position acquired in step S1402 or S1403 is a pastable position. If the position is inappropriate as a pastable position, the CPU 106 ends the processing. If it is a pastable position, the CPU 106 performs the process in step S1405.

In step S1405, in accordance with an instruction of the document editing application, the CPU 106 stores the paste position designated by the user in the memory of the document editing application. At this time, if an already held paste position overlaps the designated paste position, the CPU 106 may replace the already held paste position and the designated paste position with each other in accordance with an instruction of the document editing application. If objects pastable at the paste position are limited, the CPU 106 may store the paste types together in accordance with an instruction of the document editing application. In step S1406, in accordance with an instruction of the document editing application, the CPU 106 registers, in an OS 202, the paste position stored in step S1405. In step S1407, in accordance with an instruction of the OS 202, the CPU 106 stores, in the memory of the OS 202, the paste position registered in step S1406 in association with the document editing application which has registered the paste position, and ends the processing. Note that in accordance with an instruction of the document editing application, the CPU 106 may perform processing of displaying a mark corresponding to the position where the user has designated the paste position in the editing area, as a matter of course.

FIG. 15A shows an example of the management form of paste positions that the CPU 106 of the PC 100 according to this embodiment has stored in the memories in steps S1405 and S1407 in accordance with the document editing application and the OS 202. Reference numeral 1500 denotes an image of a memory that the CPU 106 has allocated to the document editing application in the process of step S1405; 1501, an image of a memory that the CPU 106 has allocated to the OS 202 in the process of step S1407; and 1502, an image of the memory of editing target character data and control data managed by the CPU 106 in accordance with an instruction of the document editing application. A document or the like is often formed by thus combining managed data with frame data to be used and sequentially filling the frames with data. Reference numeral 1503 denotes a paste position array managed by the CPU 106 in accordance with an instruction of the document editing application; 1504, a paste state representing, for example, whether an object has been pasted; and 1505, a type of a pastable object. For example, in step S1405 of FIG. 14, the CPU 106 acquires the types of objects pastable at the paste position designated by the user and sets to permit paste of only objects of those types in accordance with an instruction of the document editing application. Alternatively, a setup window using a dialogue may be prepared to enable the user to set or cancel object types any time other than the time of paste position designation. Reference numeral 1506 denotes an associated paste position management number which is used to process a plurality of paste positions at once. For example, a paste position management number A 1511 is set as an associated paste position management number, that is, an associated position management number for a paste position management number B 1509 managed by the paste position array 1503. As is apparent from this, the paste position management number B 1509 is associated with a paste position management number A 1510. Note that the user can set or cancel the association of paste positions in a setup window. Reference numeral 1507 represents a state in which a paste position that designates no range is held as control data together with character data, which is associated with the paste position management number A managed by 1510 in the paste position array 1503. Reference numeral 1508 represents a state in which a paste position that designates a range is held as control data together with character data, which is associated with the paste position management number B managed by 1509 in the paste position array 1503. For example, the range of characters "ABC-DEFG" is designated by 1508, as is apparent. Note that in the present invention, paste positions need only be managed in a form convenient for an application. In the present invention, the paste position management form is not particularly limited.

Reference numeral 1512 denotes a paste position array managed by the CPU 106 in accordance with an instruction of the OS 202; 1513, a notification function to be used by the CPU 106 to send a query and paste instruction to a registered application in accordance with an instruction of the OS 202; and 1514, a management number which the CPU 106 transfers as a data identifier when sending a query and paste instruction for the notification function 1513 in accordance with an instruction of the OS 202. For example, when performing the process in step S1407 in accordance with an instruction of the OS 202, the CPU 106 acquires the identifier of the document editing application that has requested registration and sets an identifier as indicated by 1515. At this time, the CPU 106 sets a data identifier and a notification function to be used to send a query and paste instruction to the document editing application that has requested registration as indicated by 1516 and 1517 in accordance with an instruction of the OS 202.

Figure 16:
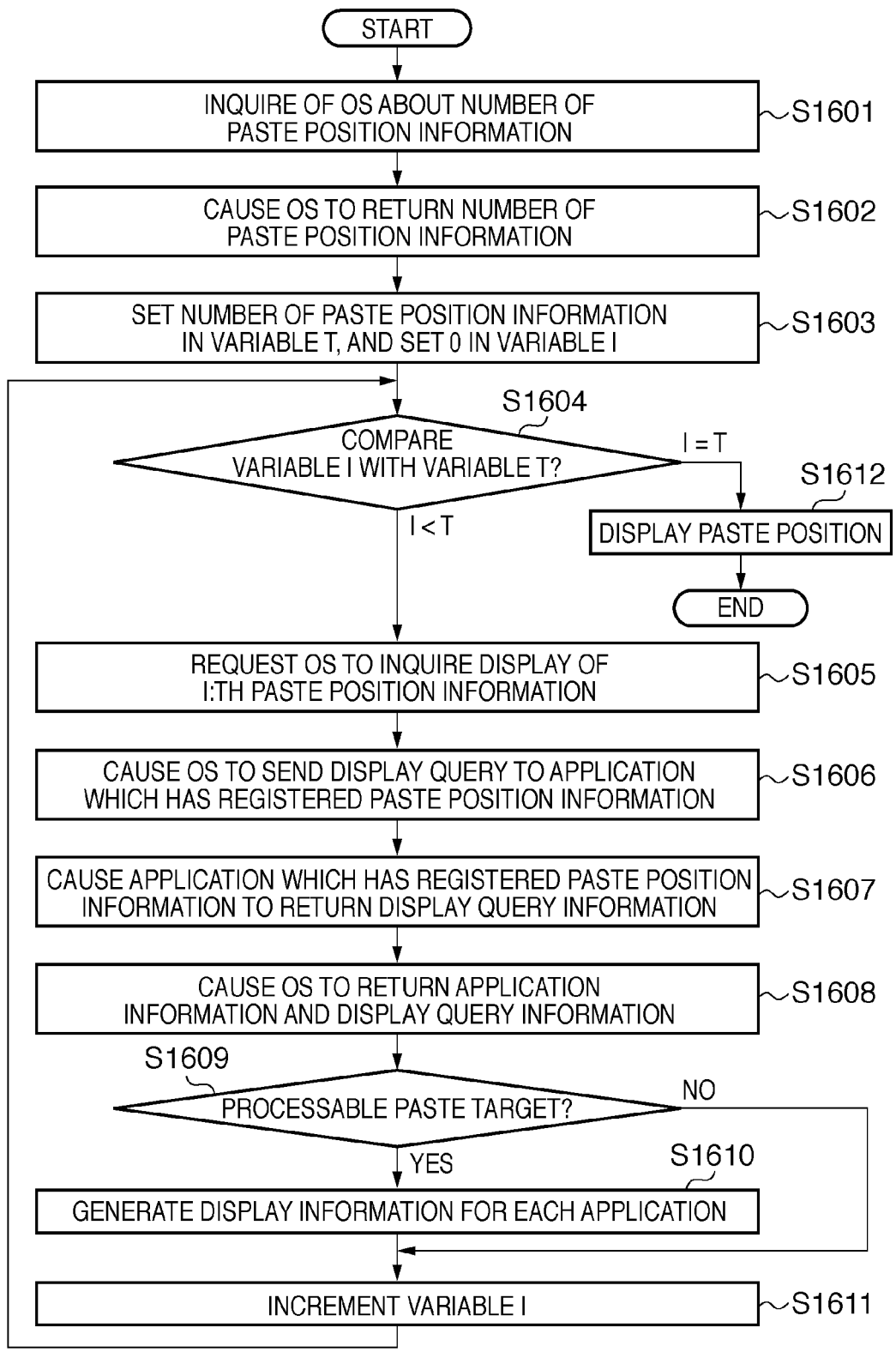
FIG. 16 is a flowchart illustrating an example of processing to be executed by the PC according to the third embodiment.

FIG. 16 illustrates a procedure of causing the PC 100 of this embodiment to display a menu which causes the user to select the paste position of an object via, for example, the file management application.

In step S1601, the CPU 106 inquires of the OS 202 about the number of registered paste position information in accordance with an instruction of the file management application. In step S1602, the CPU 106 returns the number of managed paste position information in accordance with an instruction of the OS 202. For example, the CPU 106 acquires the number of paste positions in the array 1512 shown in FIG. 15A and returns it to the file management application. In step S1603, the CPU 106 sets the acquired number of paste position information in a variable T and initializes a variable I to 0 in accordance with an instruction of the file management application. In step S1604, the CPU 106 compares the variable T with the variable I in accordance with an instruction of the file management application. If the variable I is smaller than the variable T, the CPU 106 performs the process in step S1605. If the variable I equals the variable T, the CPU 106 performs the process in step S1612. In step S1605, the CPU 106 acquires the display information of the I:th paste position information registered in the OS 202 in accordance with an instruction of the file management application. In step S1606, in accordance with an instruction of the OS 202, the CPU 106 sends a display information acquisition request to the document editing application which has registered the paste position information. For example, the CPU 106 refers to the inquired I:th paste position information in the paste position array 1512 shown in FIG. 15A. The CPU 106 then sends, using the notification function 1513, the display information acquisition request including the position management number 1514 to the document editing application which has registered the paste position information. In step S1607, the CPU 106 specifies the paste position information and returns its display information to the OS 202 in accordance with an instruction of the document editing application. For example, the CPU 106 specifies the paste position information based on the position management number 1514 notified by the notification function 1513 from the paste position array 1503 managed by the document editing application in FIG. 15A and returns its display information to the OS 202. Needless to say, if the associated paste position management number 1506 is set in FIG. 15A, adjustment may be done in step S1607 to put the associated paste positions into one piece of display information. In step S1608, the CPU 106 adds application information to the display information returned from the document editing application in step S1605 and returns the information to the file management application in accordance with an instruction of the OS 202. For example, the CPU 106 adds the application information in the paste position array 1512 shown in FIG. 15A and returns the information to the file management application. In step S1609, in accordance with an instruction of the file management application, the CPU 106 determines based on the display information returned from the OS 202 whether a paste target object is pastable. For example, the determination is done using the pastable object type 1505 shown in FIG. 15A which is returned from the document editing application as the display information in step S1607. If the paste target object is pastable, the CPU 106 performs the process in step S1610. If the paste target object is not pastable, the CPU 106 performs the process in step S1611. This makes it possible to display paste candidates based on the type of the paste target object. In step S1610, in accordance with an instruction of the file management application, the CPU 106 generates display information to designate the paste position from the display information returned from the OS 202. For example, the CPU 106 generates display information for each application using the application information indicated by 1512 in FIG. 15A and added in step S1608. This enables to, when the paste position information is associated with a plurality of applications, display the paste positions for each application, like the menu 1314 shown in FIG. 13B. In step S1611, the CPU 106 increments the variable I in accordance with an instruction of the file management application and returns the process to step S1604. In step S1612, the CPU 106 displays the generated display information to designate the paste positions in accordance with an instruction of the file management application. In this embodiment, only display information to designate paste positions has been described as the display information. Needless to say, information to designate another operation such as new creation or storage can also be added without any problem. In this embodiment, the CPU determines in step S1609 whether the paste target object is pastable. Instead, the type of the paste target object may be added to the display information acquisition request in step S1605 so that the determination can be done in step S1607, as a matter of course. This allows to display the menu 1313 for designated positions and then display the menus 1314 and 1315 shown in FIG. 13B. Inquiring about the number of paste position information in step S1601 enables to display the paste positions in lines, like the menu 1315 shown in FIG. 13B.

Figure 17A:
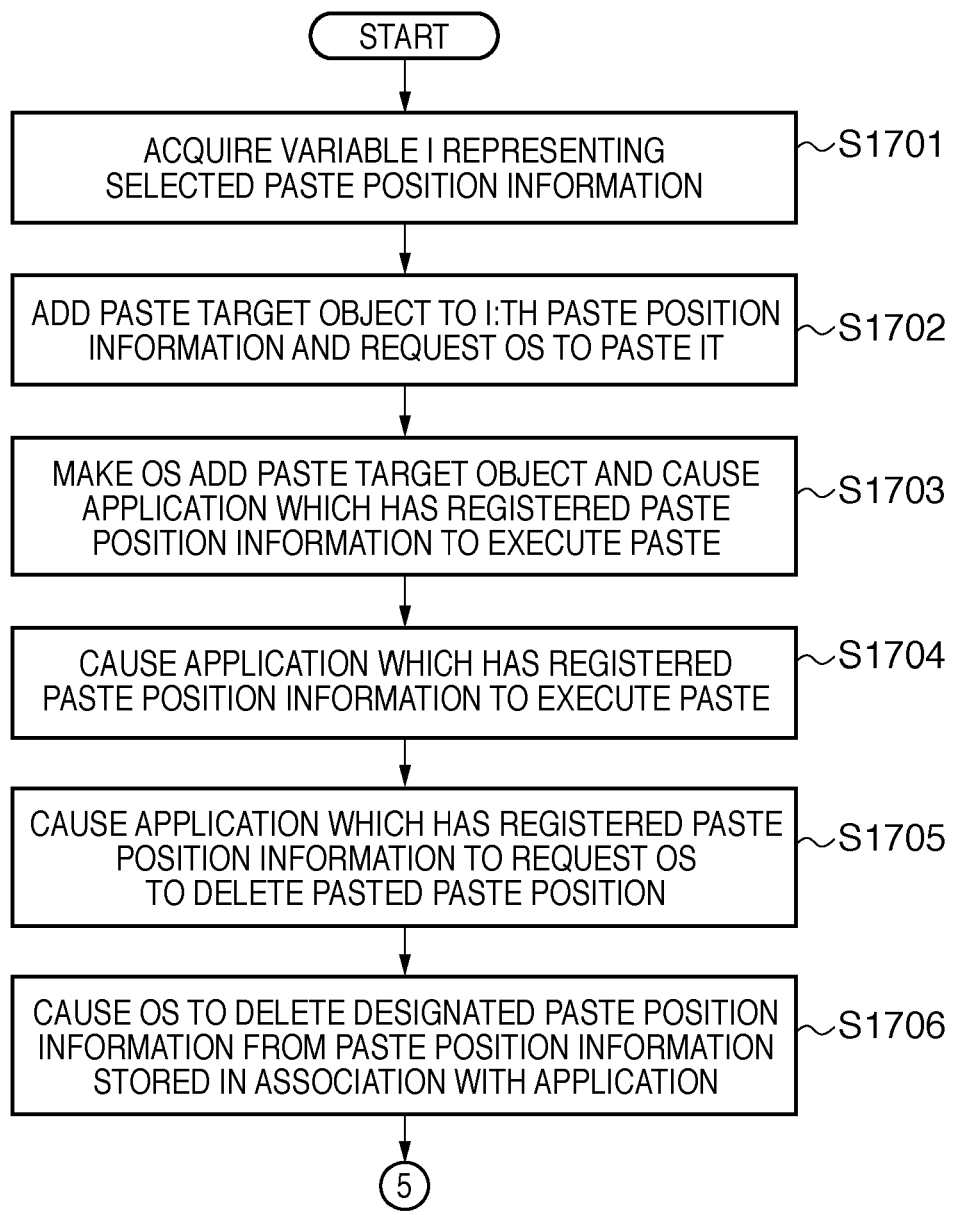
FIGS. 17A and 17B are flowcharts illustrating an example of processing to be executed by the PC according to the third embodiment.
Figure 17B:
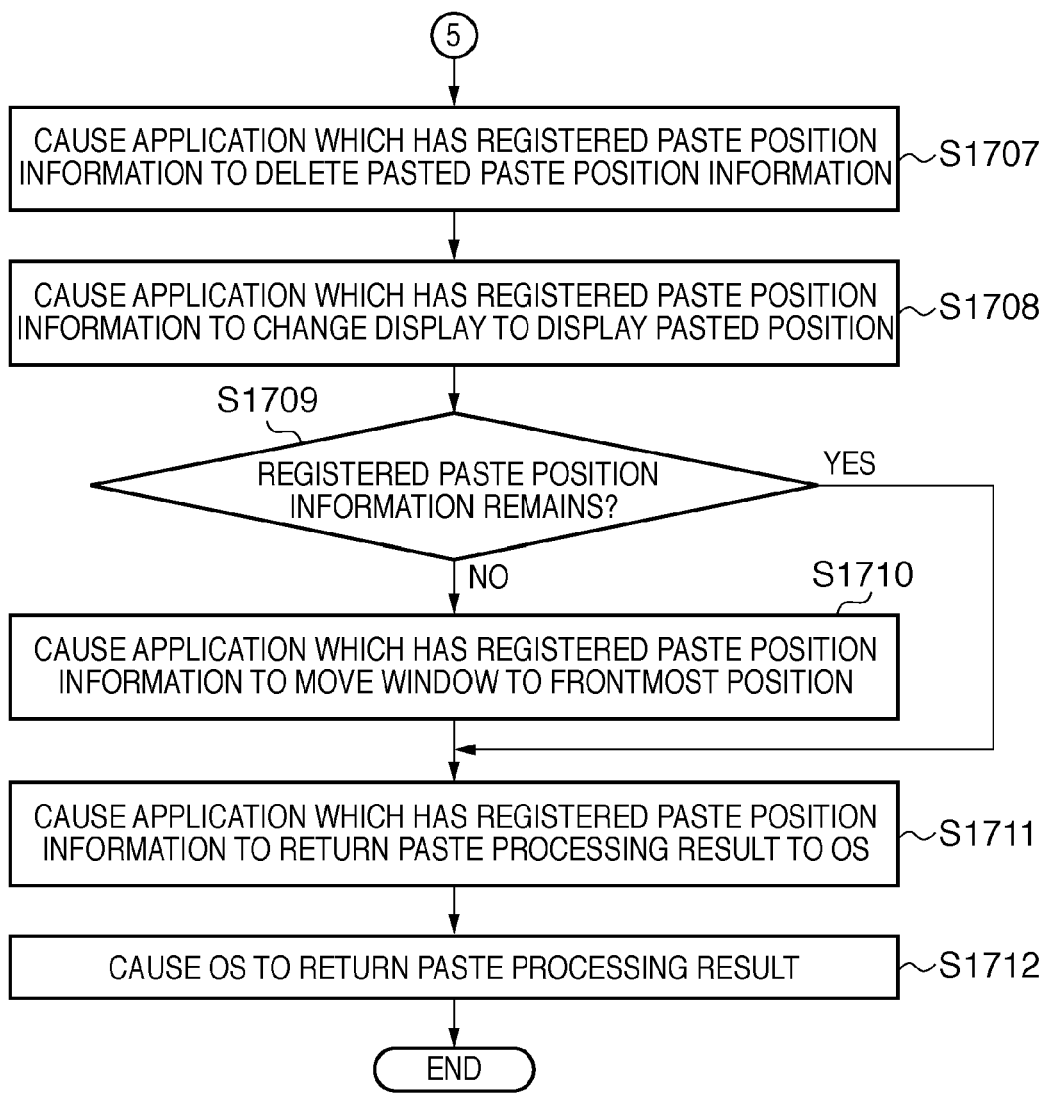

FIGS. 17A and 17B illustrate a procedure of causing the PC 100 of this embodiment to receive paste position selection via, for example, the file management application in response to a user operation.

In step S1701, the CPU 106 sets the variable I representing selected paste position information in accordance with an instruction of the file management application. The variable I can be acquired from the display information generated in step S1610 of FIG. 16 and information designated by the user. In step S1702, in accordance with an instruction of the file management application, the CPU 106 adds paste target object information to the I:th paste position information registered in the OS 202 and requests it to execute paste processing. In step S1703, in accordance with an instruction of the OS 202, the CPU 106 sends a paste request including the paste target object information to the document editing application which has registered the paste position information. For example, the CPU 106 refers to the inquired I:th paste position information in the paste position array 1512 shown in FIG. 15A. The CPU 106 then sends, using the notification function 1513, the paste request including the position management number 1514 and the added paste target object information to the document editing application which has registered the paste position information. In step S1704, the CPU 106 performs paste processing using the paste target object information in accordance with an instruction of the document editing application. For example, the CPU 106 performs paste processing using the position management number 1514 and the paste target object information notified by the notification function 1513 from the paste position array 1503 managed by the document editing application in FIG. 15A. Needless to say, if the associated paste position management number 1506 is set in the paste position array 1503 managed by the document editing application in FIG. 15A, the paste processing may naturally be done at all associated paste positions. In step S1705, the CPU 106 requests the OS 202 to delete the processed paste position information in accordance with an instruction of the document editing application. For example, using the processed position management number 1514, the CPU 106 requests the OS 202 to delete the processed paste position information from the paste position array 1512 managed by the OS 202 in FIG. 15A. In step S1706, the CPU 106 deletes the designated paste position information in accordance with an instruction of the OS 202.

For example, using the designated position management number 1514 and the identifier of the document editing application which has sent the deletion request, the CPU 106 deletes the paste position information from the paste position array 1512 managed by the OS 202 in FIG. 15A.

In step S1707, the CPU 106 deletes the paste position information in accordance with an instruction of the document editing application. For example, the CPU 106 deletes the paste position information from the paste position array 1503 managed by the application and the memory 1502 of editing target character data and control data shown in FIG. 15A. Deleting the pasted paste position information in the above-described way in steps S1705 to S1707 enables to prevent any unnecessary paste position information from remaining. Note that if the user instructs to prohibit deletion of pasted paste position information in the paste operation and explicitly leave the paste position information, paste can be performed again at the pasted position, as a matter of course. In step S1708, the CPU 106 changes the display position and the like so as to display the processed paste position in step S1704 in accordance with an instruction of the document editing application. This allows the user to confirm the portion that has changed upon paste when he/she has selected the document editing application and moves the window of the application to the topmost position. In step S1709, in accordance with an instruction of the document editing application, the CPU 106 confirms whether paste position information managed by the application remains. For example, the CPU 106 confirms whether the paste position array 1503 managed by the application in FIG. 15A remains.

If the paste position information remains, the CPU 106 performs the process in step S1711. If no paste position information remains, the CPU 106 performs the process in step S1710.

In step S1710, in accordance with an instruction of the document editing application, the CPU 106 moves its window to the topmost position. This allows the user to confirm the pasted contents without selecting the document editing application because the window moves to the topmost position after paste has been executed at all paste positions designated by the user via the document editing application. In step S1711, the CPU 106 returns the paste processing result to the OS 202 in accordance with an instruction of the document editing application.

In step S1712, the CPU 106 returns the paste processing result to the file management application in accordance with an instruction of the OS 202. With this processing, when the user selects the item 1316 shown in FIG. 13B, data corresponding to the data icon 1312 is pasted, as shown in FIG. 13C, at the paste position 1301 in FIG. 13A.

Figure 18:
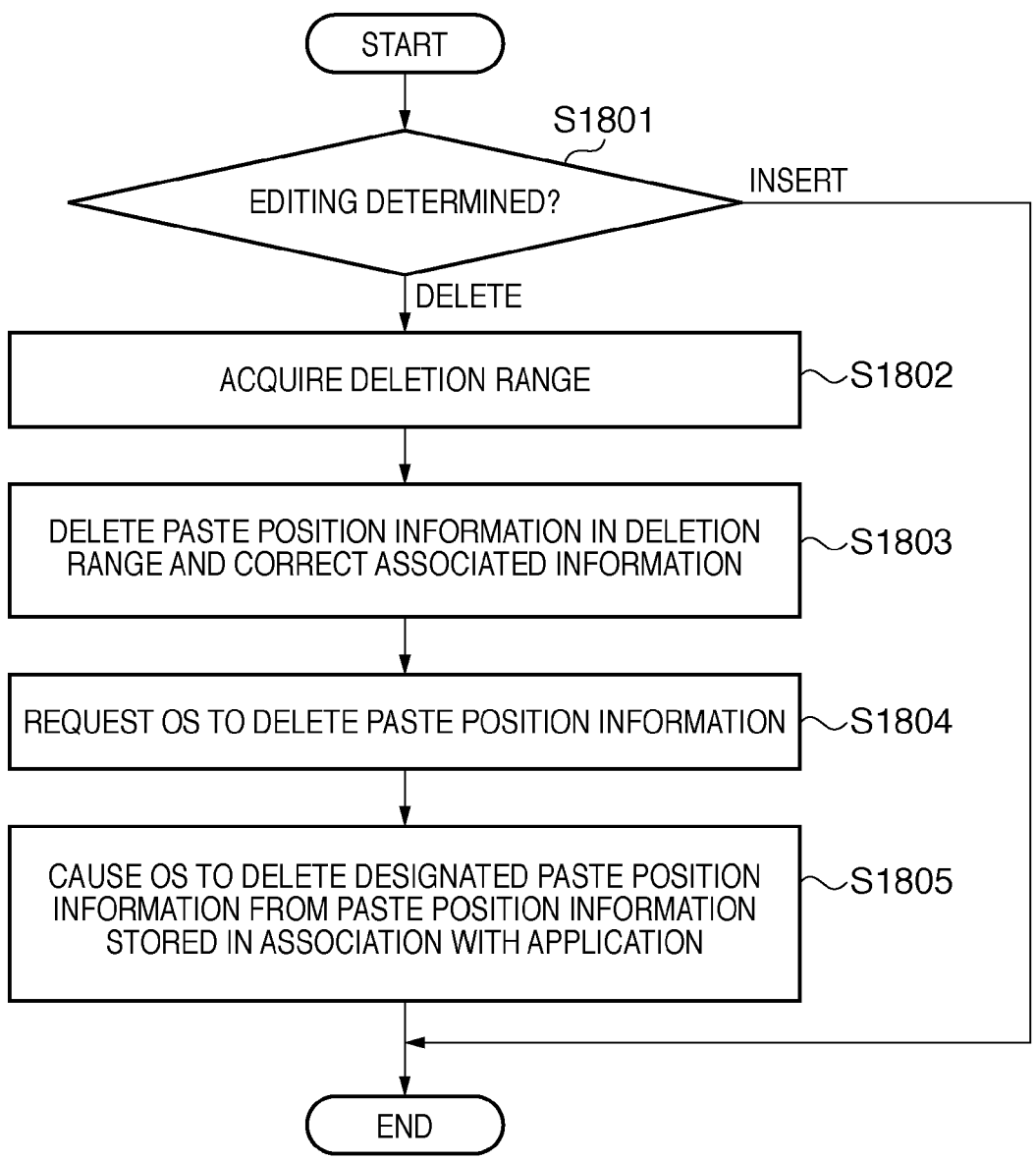
FIG. 18 is a flowchart illustrating an example of processing to be executed by the PC according to the third embodiment.

FIG. 18 illustrates a procedure of causing the PC 100 of this embodiment to correct a selected paste position when performing editing via an application.

In step S1801, the CPU 106 determines the editing operation in accordance with an instruction of the document editing application.

If the editing operation is insertion, the CPU 106 ends the processing and performs normal insertion processing. If the editing operation is deletion, the CPU 106 performs the process in step S1802. Note that replacement is regarded as processing including deletion and insertion so that insertion processing is performed after deletion processing. An example of insertion without requiring correction will be described. For insertion to the memory 1502 of editing target character data and control data managed by the CPU 106 in accordance with an instruction of the document editing application in FIG. 15A, the control data 1507 and 1508 move in the memory in accordance with the insertion. Hence, no correction is necessary.

In step S1802, the CPU 106 acquires the deletion target range in accordance with an instruction of the document editing application. In step S1803, the CPU 106 deletes paste position information corresponding to a paste position control completely included in the deletion target range in accordance with an instruction of the document editing application. If there is paste position information associated with the deleted paste position information, the CPU 106 corrects it. For example, in, for example the memory 1502 of editing target character data and control data managed by the CPU 106 in accordance with an instruction of the document editing application in FIG. 15A, the CPU confirms whether control data exists in the deletion range. If control data exists, the CPU 106 specifies paste position information to be deleted from the paste position array 1503 paired with the control data. Adjustment is done so as not to leave the specified deletion target paste position information associated with the paste position management number 1506 of the other paste position information. The CPU 106 deletes the specified paste position information and then data in the deletion range on the memory 1502. When determining control data in the deletion range, not only control data perfectly included in the deletion target range but also control data whose range indicated by its start and end partially overlaps the deletion range may be determined as the deletion target. In step S1804, in accordance with an instruction of the document editing application, the CPU 106 requests the OS 202 to delete the deletion target paste position information.

For example, using the position management number 1514, the CPU 106 requests the OS 202 to delete the deletion target paste position information from the paste position array 1512 managed by the OS 202 in FIG. 15A. In step S1805, the CPU 106 deletes the designated paste position information in accordance with an instruction of the OS 202. For example, using the designated position management number 1514 and the identifier of the document editing application which has sent the deletion request, the CPU 106 deletes the paste position information from the paste position array 1512 managed by the OS 202 in FIG. 15A. This makes it possible to correct the paste position upon editing via the document editing application on which the user has designated the paste position.

Figure 19A:
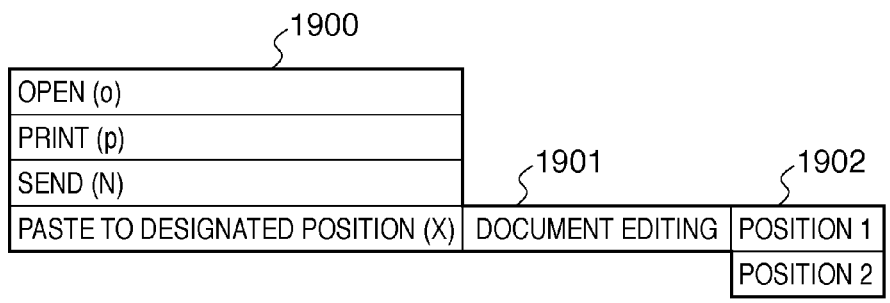
FIGS. 19A to 19C are views showing examples of menus according to the third embodiment.
Figure 19B:
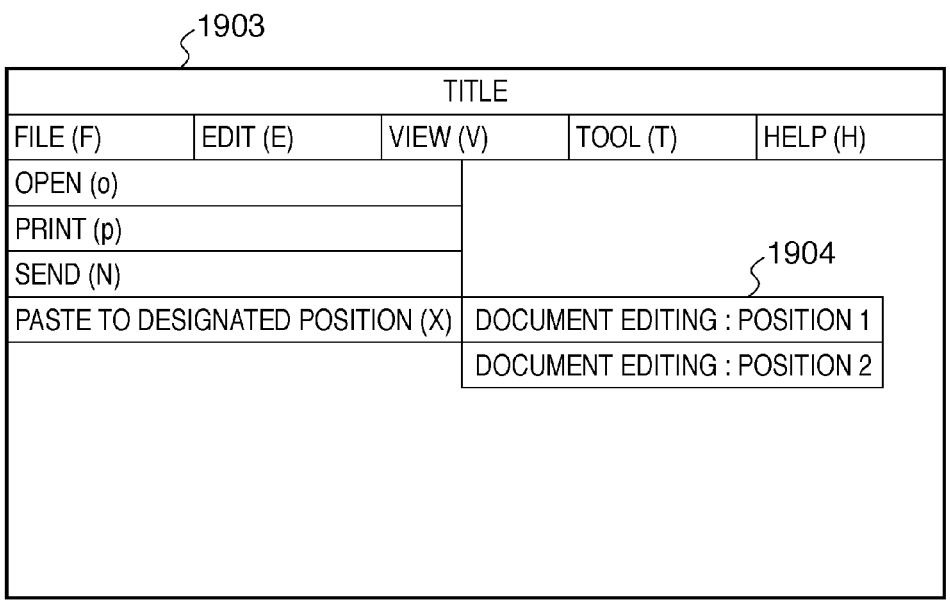
Figure 19C:
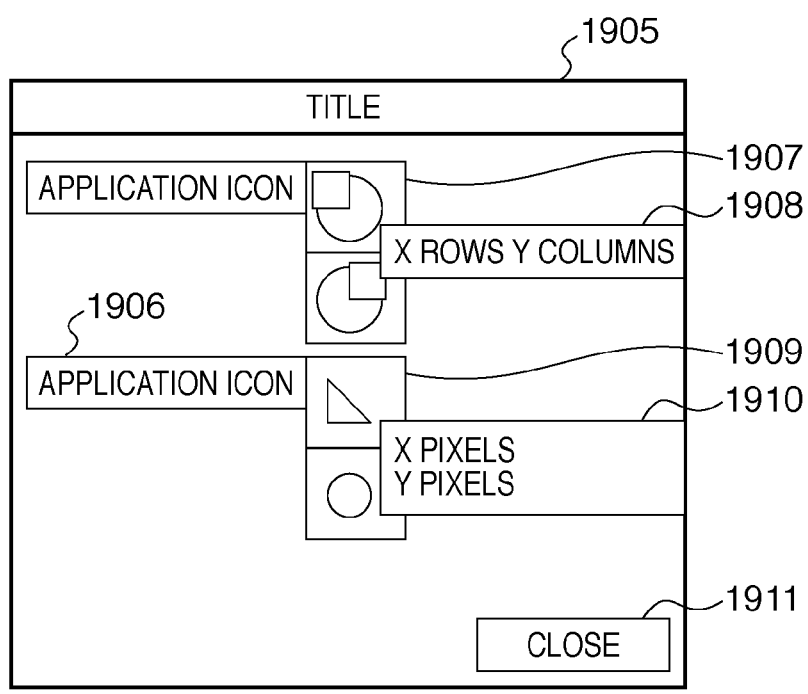

FIGS. 19A to 19C show examples of menus to display paste positions in the window of the file management application on the PC 100 according to this embodiment. In FIG. 19A, 1900 indicates an example of a floating menu for paste positions which the user has displayed on the file management application by shortcut, right-click, or the like; 1901, a paste target application name; and 1902, a paste position. In this example, the paste target application name and paste positions are displayed as layers. However, the paste target application name and paste positions may be put together, as indicated by 1904 in FIG. 19B. Note that 1903 in FIG. 19B indicates an example in which the menus of the file management application include the menu to designate a paste position.

Note that the CPU 106 of the PC 100 according to this embodiment deletes paste position information concerning the application upon detecting its termination in accordance with the OS 202.

For example, the CPU 106 deletes, from the paste position array 1512 managed by the OS 202 in FIG. 15A, paste position information associated with an application whose termination has been specified. In this case, even when forced termination of an application has occurred, paste position information can be deleted from the paste position array 1512 managed by the OS 202 in FIG. 15A. This prevents display of unnecessary paste positions at the time of user's paste position selection.

Figure 15B:
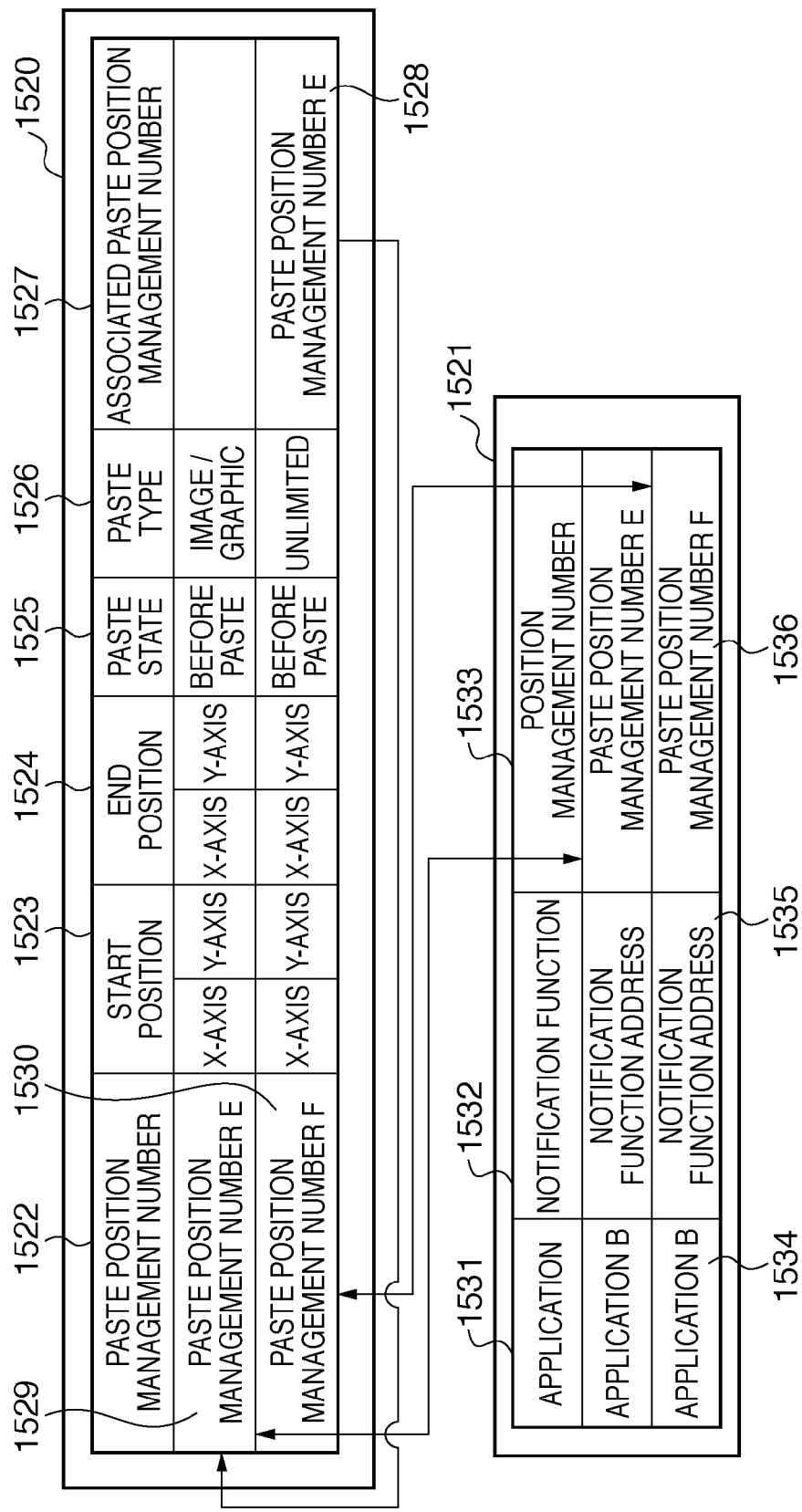

Note that the document editing application has been described above as an example. The present invention can be implemented in an image editing application as well. The user can designate a paste position on an image file, like designating a paste position on a document file. FIG. 15B shows an example of the management form of paste positions stored in the memories of the OS 202 and an image editing application which is used in place of the document editing application. Reference numeral 1520 denotes an image of a memory that the CPU 106 has allocated to the image editing application in the process of step S1405 in FIG. 14; and 1521, an image of a memory that the CPU 106 has allocated to the OS 202 in the process of step S1407. Reference numerals 1531 to 1536 encompassed by the reference numeral 1521 indicate the same elements as those in the image of the memory shown in FIG. 15A that the CPU 106 has allocated to the OS 202 in the process of step S1407, and a description thereof will not be repeated. Reference numeral 1522 denotes a paste position array managed by the CPU 106 in accordance with an instruction of the image editing application; 1523, a paste start position which is a pixel position represented by X- and Y-coordinates measured from the upper left corner of the editing area; 1524, a paste end position which is a pixel position represented by X- and Y-coordinates measured from the upper left corner of the editing area; 1525, a paste state representing, for example, whether an object has been pasted; and 1526, a type of a pastable object. For example, in step S1405 of FIG. 14, the CPU 106 acquires the types of objects pastable at the paste position designated by the user and sets to permit paste of only objects of those types in accordance with an instruction of the image editing application. Alternatively, a setup window using a dialogue may be prepared to enable the user to set or cancel object types any time other than the time of paste position designation. Reference numeral 1527 denotes an associated paste position management number which is used to process a plurality of paste positions at once. For example, a paste position management number E 1528 is set as an associated paste position management number, that is, an associated position management number for a paste position management number F 1530 managed by the paste position array 1522. As is apparent from this, the paste position management number F 1530 is associated with a paste position management number E 1529. Note that the user can set or cancel the association of paste positions in a setup window.

Additionally, 1905 in FIG. 19C indicates an example in which a paste position selection window is displayed in the window of the file management application when a paste position is set on an image file generated by the image editing application. Reference numeral 1906 indicates a display example of an icon representing an application; and 1907, a display example of a mark representing a paste position. The mark to be displayed can be the same as that displayed at the paste position on the image editing application on which the user has designated the paste position. Reference numeral 1908 indicates a display example of a tip help of the mark representing the paste position.

Reference numeral 1909 indicates a display example of an object at the paste position. The object is a graphic pattern located at the paste position on the image editing application on which the user has designated the paste position. Reference numeral 1910 indicates a display example of a tip help of the object representing the paste position. Note that the form of the tip help can change in accordance with the image editing application on which the paste position has been designated, as indicated by 1908 and 1910 in the example, as a matter of course. Reference numeral 1911 denotes a button to close the selection window. In the example, the icons, marks, and objects are displayed in the selection window. Needless to say, they may be displayed in a menu.

Figure 15C:
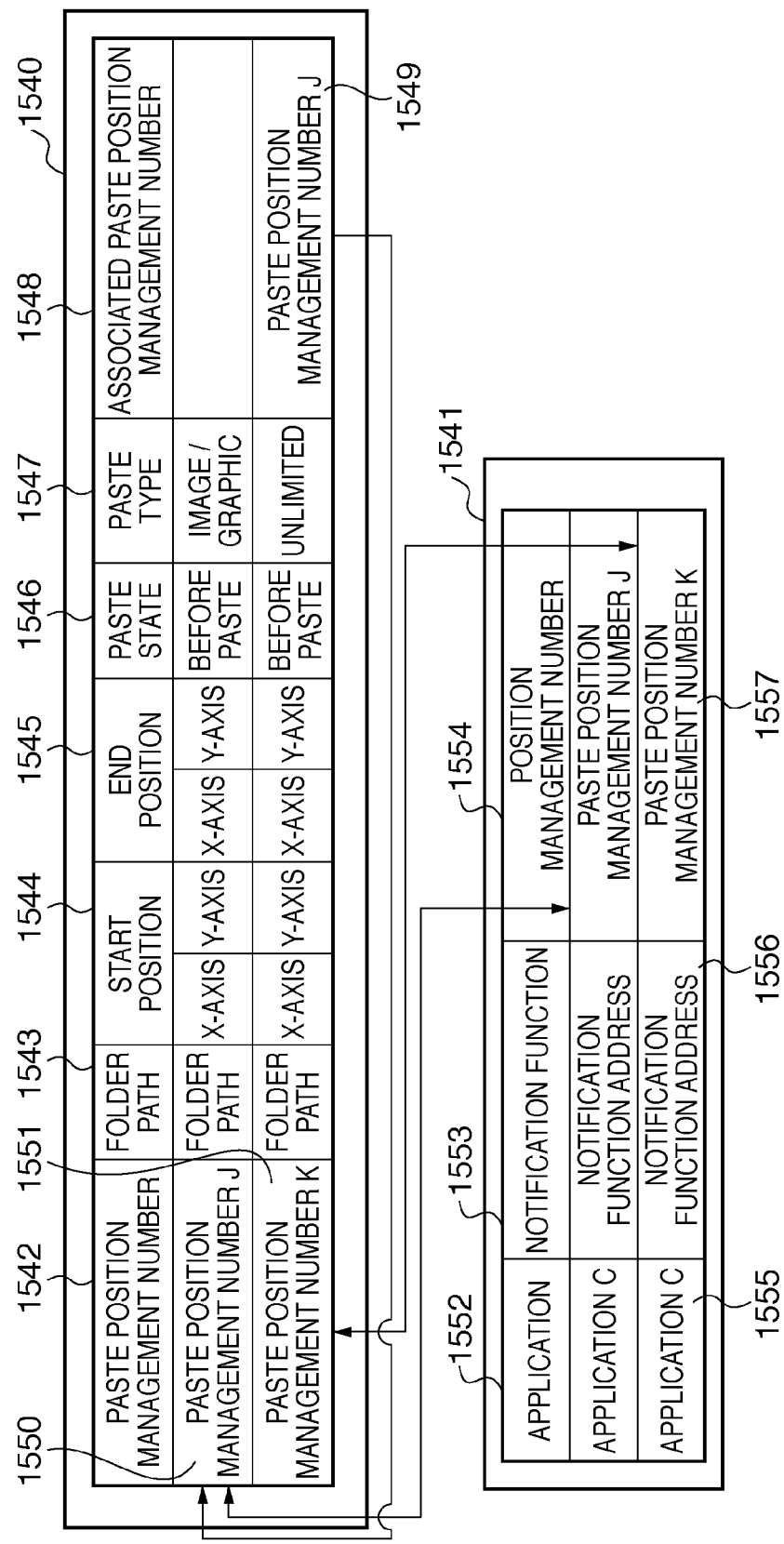

Note that the document editing application and the image editing application have been described above as examples. The present invention can be implemented in a file management application as well. The user can designate a paste position on the file management application, like designating a paste position on a document file. FIG. 15C shows an example of the management form of paste positions stored in the memories of the OS 202 and a file management application which is used in place of the document editing application.

Reference numeral 1540 denotes an image of a memory that the CPU 106 has allocated to the file management application in the process of step S1405 in FIG. 14; and 1541, an image of a memory that the CPU 106 has allocated to the OS 202 in the process of step S1407. Reference numerals 1552 to 1557 encompassed by the reference numeral 1541 indicate the same elements as those in the image of the memory shown in FIG. 15A that the CPU 106 has allocated to the OS 202 in the process of step S1407, and a description thereof will not be repeated. Reference numeral 1542 denotes a paste position array managed by the CPU 106 in accordance with an instruction of the file management application; 1543, a folder as a paste target; 1544, a paste start position which is a pixel position represented by X- and Y-coordinates measured from the upper left corner of the folder display area; 1545, a paste end position which is a pixel position represented by X- and Y-coordinates measured from the upper left corner of the folder display area; 1546, a paste state representing, for example, whether the information has been used for paste; and 1547, a type of a pastable object. For example, in step S1405 of FIG. 14, the CPU 106 acquires the types of objects pastable at the paste position designated by the user and sets to permit paste of only objects of those types in accordance with an instruction of the file management application. Alternatively, a setup window using a dialogue may be prepared to enable the user to set or cancel object types any time other than the time of paste position designation. Reference numeral 1548 denotes an associated paste position management number which is used to process a plurality of paste positions at once. For example, a paste position management number J 1549 is set as an associated paste position management number, that is, an associated position management number for a paste position management number K 1551 managed by the paste position array 1542. As is apparent from this, the paste position management number K 1551 is associated with a paste position management number J 1550. Note that the user can set or cancel the association of paste positions in a setup window.

As described in this embodiment, the control can be done not only in the document editing application or image editing application but also in all applications capable of handling paste processing, like the file management application, as a matter of course.

According to this embodiment, to move an object arranged in a window to a desired position of another window, the user need not continue the object drag operation up to the desired position. Hence, the time and labor for the operation can be decreased. It is also possible to prevent the user from losing the desired position during drag of an object and redoing the operation. That is, the user can move an object arranged in a window to a desired position of another window by a simple operation.

[Fourth Embodiment]

Instead of the floating menu of the third embodiment, a floating window to receive an object drop operation may be displayed. A floating window is made to correspond to a paste position. Floating windows exist as much as paste positions and are displayed near a mouse cursor. Data corresponding to an object is pasted at a paste position corresponding to a floating window in which the user has dropped the object.

Note that in this embodiment, a description of the same components as in the above-described first embodiment will not be repeated. Components unique to the fourth embodiment will be explained in detail.

Figure 13D:
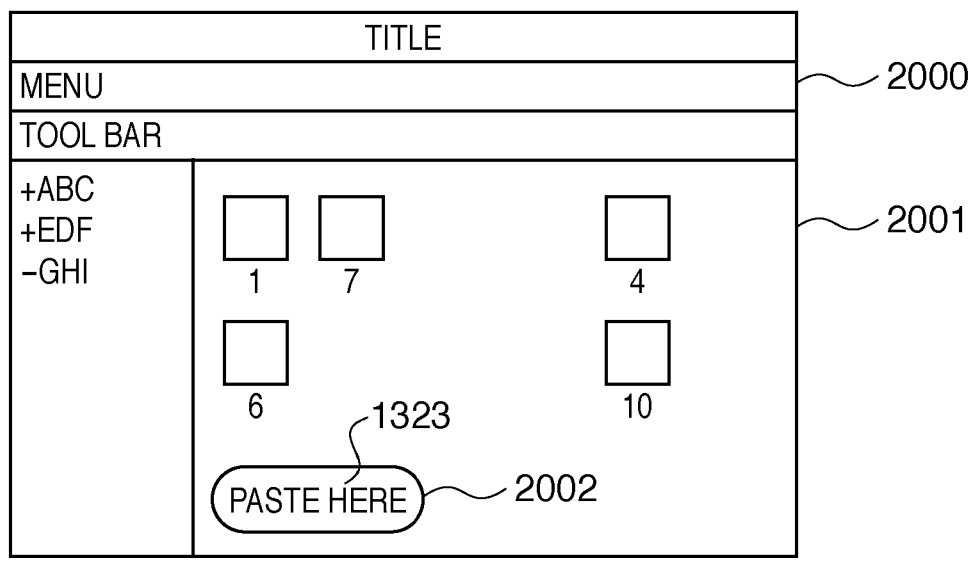

FIG. 13D illustrates an example in which the drop destination of a dragged object is designated on a PC 100 according to this embodiment. After the paste position has been designated, a floating window 1323 associated with it is displayed on the window of a file management application.

FIG. 8 is a flowchart illustrating processing to be executed when a drop target position is designated in an information providing system according to the fourth embodiment. In step S801, the CPU determines whether the drop target position designation has been done by a pointing device or a method other than the pointing device. If the drop target position designation has been done by the pointing device, the process advances to step S803. If the drop target position designation has been done by a method other than the pointing device, the process advances to step S802. In step S802, the CPU acquires a focus position in the editing area such as a cursor position or the area of a designated range. Note that without using the pointing device, for example, a mode that allows the user to operate a virtually displayed pointing device using arrow keys and the like may be set so that the user can designate a position or a range only by operating the keys and acquire the designated position or area, although not illustrated. In step S803, the CPU acquires the position of the pointing device such as a position where the user has clicked a button of the pointing device or the area of a range designated by the user using the pointing device. Note that in an application such as a document editing application, the cursor moves to an appropriate position near the position where the user has clicked a button of the pointing device. The position acquired here may be converted into an appropriate position near the position where a button of the pointing device has been clicked. In step S804, the CPU determines whether the drop target position acquired in step S802 or 5803 is a droppable position. If the position is inappropriate as a droppable position, the processing ends. If it is a droppable position, the process advances to step S805. In step S805, the CPU stores the designated drop target position. At this time, if an already held drop target position overlaps the designated drop target position, the CPU may replace the already held drop target position and the designated drop target position with each other. If objects droppable at the drop target position are limited, the drop types may be stored together. In step S806, the drop position is displayed based on the stored drop target position information, and the processing ends. Although not illustrated, the CPU may perform processing of displaying a mark corresponding to the position where the drop position has been displayed in the editing area, as a matter of course.

FIG. 9 shows an example of the management form of drop target positions in the information providing system according to the fourth embodiment. Reference numeral 900 denotes an image of a memory which manages character data and control data. A document or the like is often formed by thus combining managed data with frame data to be used and sequentially filling the frames with data. Reference numeral 901 denotes a managed drop target position array; 902, a state in which a drop position that designates no range is held as control data together with character data, which is associated with a drop position management number A managed by 908 in the array 901; and 903, a state in which a drop position that designates a range is held as control data together with character data, which is associated with a drop position management number B managed by 909 in the array 901. For example, the range of characters "ABCDEFG" is designated by 903, as is apparent. Reference numeral 904 denotes a drop state representing, for example, whether the information has been used for drop; and 905, a type of a droppable object. For example, the object type is set to permit only image and graphic objects as objects droppable at the drop target position designated in step S805 of FIG. 8. Although not illustrated, a setup window using a dialogue may be prepared to enable set or cancel of object types any time other than the time of drop position designation. Reference numeral 906 denotes an associated drop position management number which is used to process a plurality of drop positions at once. For example, a drop position management number A 907 associates the drop position management number B managed by 909 in the array 901 with the drop position management number A managed by 908, as is apparent. Note that in the present invention, the drop positions need only be managed in a form convenient for an application. In the present invention, the drop position management form is not particularly limited.

Figure 20:
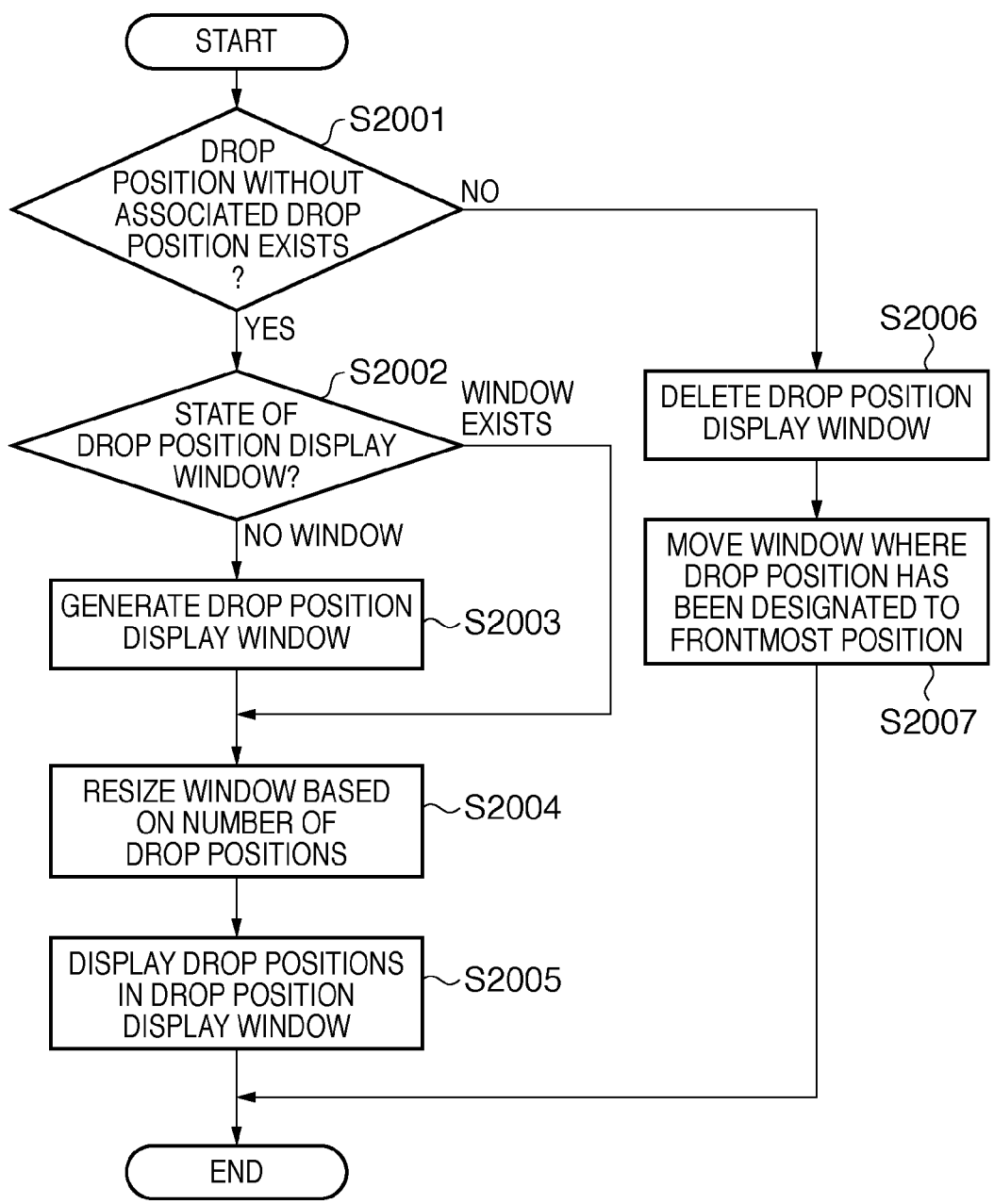
FIG. 20 is a flowchart illustrating drop position display processing of the information providing system according to the fourth embodiment.

FIG. 20 is a flowchart illustrating drop position display processing of the information providing system according to the fourth embodiment. In step S2001, based on the managed drop positions, the CPU determines the number of drop positions for which no associated drop positions are set. In the example of FIG. 9, the drop position management number B managed by 909 is associated with the drop position management number A managed by 908. Hence, only a drop position without any associated drop position is represented by the drop position management number A managed by 908. Without a drop position for which no associated drop position is set, the process advances to step S2006. If there is a drop position without any associated drop position, the process advances to step S2002. In step S2002, the CPU confirms the state of a drop position display window. If a drop position display window exists, the process advances to step S2004. Without a drop position display window, the process advances to step S2003. In step S2003, a drop position display window is generated. The generated drop position display window may stationarily be displayed as the topmost window. This prevents the drop position display window from being hidden even when it is displayed as the topmost window and facilitates drag-and-drop. In step S2004, the CPU obtains an area size necessary for drop position display based on the number of drop positions without any associated drop positions and resizes the drop position display window. If the number of drop positions or the area size necessary for drop position display exceeds a predetermined value, the necessary area size may be obtained assuming that the drop positions in the drop position display window should be scrolled for display. Alternatively, if the number of drop positions or the area size necessary for drop position display exceeds a predetermined value, drop position display in step S2005 may be controlled to switch the drop position display method to a smaller size. Note that even when the drop positions are scrolled in the drop position display window, the user can find them more easily than when searching for the drop positions in a window including other data because only the drop positions exist in the drop position display window. Additionally, even when the drop positions are scrolled in the drop position display window, the operation is easier than dragging to a drop position through a window having a large area because the drop position display window is small.

In step S2005, the CPU displays the drop positions without any associated drop positions in the drop position display window, and ends the processing. When displaying a drop position associated with another drop position, an icon or mark representing grouping may be added for distinction from a drop position that is not associated with another drop position. In the example of FIG. 9, the drop position management number A managed by 908 is associated with the drop position management number B managed by another drop position 909 and therefore added with an icon or mark representing grouping. When displaying a drop position where drop processing has already been performed, an icon or mark representing completion of drop processing may be added for distinction. In step S2006, the CPU deletes the drop position display window. Deleting the drop position display window in step S2006 allows to prohibit display of it when there is no remaining managed drop position. In steps S2003 and S2006, the window may be generated upon executing the application, and the window state may be changed between an on state for generation and an off state for deletion. When the drop position display window is generated upon executing the application, the generated window may stationarily be displayed as the topmost window.

This prevents the displayed drop position display window from being hidden even when it is displayed as the topmost window and facilitates drag-and-drop. In step S2007, if the window where the user has designated the drop target positions is located behind another window, the window is moved to the topmost position. In this case, the drop position display window is not displayed when drop has been performed at all drop positions without displaying the drop target positions. In addition, since the window where the user has designated the drop target positions moves to the topmost position, he/she can readily view the drop result.

When step S2007 is omitted, the window where the user has designated the drop target positions does not move to the topmost position. However, the processing may be controlled by setting because the user can easily continue operations on another window.

Display of the drop position display window is thus changed in accordance with the drop positions to be displayed in steps S2004, S2005, and S2006. This enables display based on addition, deletion, or grouping of designated drop positions. Display of associated drop positions has been described above as an example. The same processing is applicable to manage drop positions without association, as a matter of course. The drop position display window has been explained as an independent window. In place of the drop position display window, a drop position display area may be provided in the window in use by using another command display such as a tool bar. In the above description, all drop positions are displayed in one drop position display window. However, one drop position display window may be used for each drop position.

Figure 21:
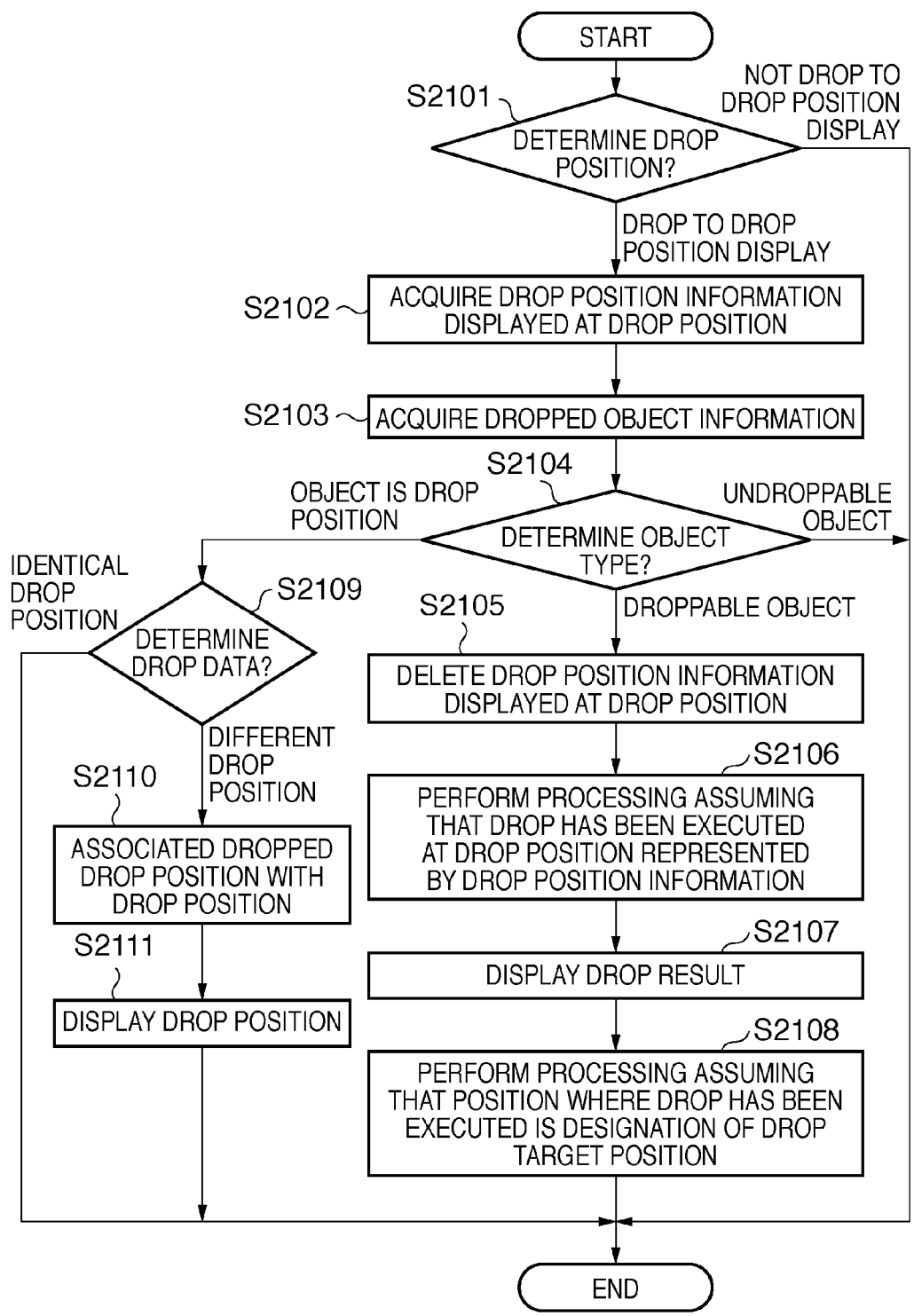
FIG. 21 is a flowchart illustrating processing to be executed when drop is performed in a drop position display window in the information providing system according to the fourth embodiment.

FIG. 21 is a flowchart illustrating processing to be executed when drop is performed in a drop position display window in the information providing system according to the fourth embodiment.

In step S2101, the CPU confirms a drop position. If the drop position is not a position in the drop position display, the processing ends. If the drop position is a position in the drop position display, the process advances to step S2102.

In step S2102, the CPU acquires drop position information displayed at the drop position. If the drop position information displayed at the drop position is associated with another drop position, all pieces of associated drop position information are also acquired. In the example of FIG. 9, if the drop position management number A managed by 908 is drop position information displayed at the drop position, the drop position information is associated with the drop position management number B managed by the drop position 909. Hence, the drop position management number A managed by 908 and the drop position management number B managed by the drop position 909 are acquired.

In step S2103, the CPU acquires dropped object information. In step S2104, the CPU determines the type represented by the dropped object information acquired in step S2103 and the types represented by all pieces of drop position information acquired in step S2102. If the dropped object represents drop position information, the process advances to step S2109. If the dropped object is processable, the process advances to step S2105. If the dropped object cannot be processed at any drop position acquired in step S2102, the processing ends. At this time, a window to notify the user that the object is not processable may be displayed before ending the processing. In step S2105, the CPU deletes, out of the pieces of drop position information acquired in step S2102, drop position information that allows processing of the dropped object, considering that it is deleted by editing. Details of the drop position information deletion processing will be described later. In step S2106, the CPU performs processing, assuming that the object has been dropped at, out of the pieces of drop position information acquired in step S2102, a drop position that allows processing of the dropped object. In this way, when an object is dragged to a drop position associated with another drop position, drop can be done for all associated drop positions at once. In step S2107, if the position where the drop processing has been executed is outside the editing window, it is scrolled to display the dropped object. Scrolling to display the dropped object allows the user to easily view the drop result. The scroll may be done using drop position information having the largest drop position management number out of the associated drop position information or the drop position of drop position information having the largest drop position. If the scroll processing takes time, it can be stopped by omitting step S2107. In this case, the scroll may be done to display a position where drop has been executed last when moving the window where the user has designated the drop target positions to the topmost position, although not illustrated. In step S2108, the CPU designates a drop position assuming that the object dropped by drop processing executed in step S2106 is designated as a drop target position, and ends the processing. At this time, the CPU reconstructs associated drop position information for all pieces of drop position information acquired in step S2102.

Thus designating the object of the drop processing performed in step S2106 again at the drop position facilitates repeatedly executing drop at the same position. It is also possible to delete all positions used for drop from the drop position display and readily discriminate drop positions where drop has not been executed yet by omitting step S2108.

Omitting step S2108 makes it impossible to repeatedly perform drop at the same position. However, the processing may be controlled by setting or a key press state upon drop because the user can easily discriminate drop positions where drop has not been executed yet. In step S2109, the CPU determines drop data. If the drop data is different from the drop position information, the process advances to step S2110. If the drop data is identical to the drop position information, the processing ends. In step S2110, the CPU associates the dropped drop position information with the drop position information of the drop position.

In step S2111, the CPU processes the drop position display in consideration of the associated drop positions as described with reference to FIG. 20, and ends the processing. As described above, when a drop position is dropped, the drop position can be associated. An example has been described above, in which drop is performed in the drop position display window when associated drop positions are managed. The same processing is applicable to manage drop positions without association, as a matter of course.

Although not illustrated, a setup window using a dialogue may be prepared to enable the user to set or cancel drop position association, instead of using the above-described drag.

Figure 22A:
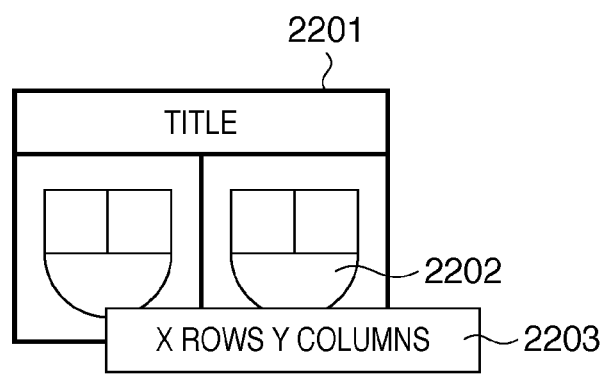
FIGS. 22A to 22C are views showing an example of the drop position display window in the information providing system according to the fourth embodiment.
Figure 22B:
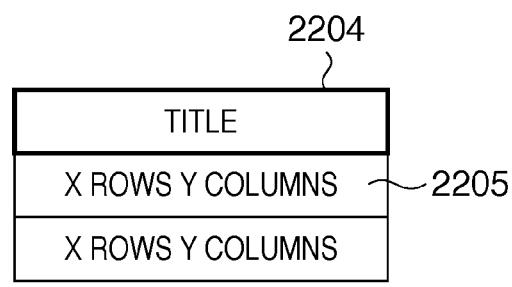
Figure 22C:
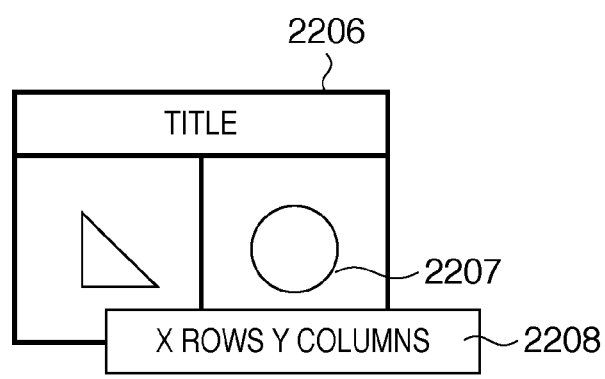

FIGS. 22A to 22C are views showing an example of the drop position display window in the information providing system according to the fourth embodiment. A window 2201 displays a drop position as an icon 2202. When the pointing device is moved onto an icon, position information represented by the number of rows and the number of columns is displayed as a tip help corresponding to the icon, as indicated by 2203. When a range is designated, the information of the character string, object name, drop position designation time, and designation order and the information of the drop state may be displayed in combination as the tip help in addition to the position information represented by the number of rows and the number of columns. A window 2204 displays a drop position as position information represented by the number of rows and the number of columns, as indicated by 2205. When a range is designated, the information of the character string, object name, drop position designation time, and designation order and the information of the drop state may be displayed in combination as the position information in addition to the position information represented by the number of rows and the number of columns. A window 2206 displays a drop position as a rendered object in a designated range or a reduced object, as indicated by 2207. When the pointing device is moved onto an object, position information represented by the number of rows and the number of columns is displayed as a corresponding tip help, as indicated by 2208. When a range is designated, the information of the character string, object name, drop position designation time, and designation order and the information of the drop state may be displayed in combination as the tip help in addition to the position information represented by the number of rows and the number of columns. This facilitates discrimination even when a plurality of drop positions are designated.

FIG. 23 is a flowchart illustrating processing of controlling the drop position display window and displaying drop positions in accordance with the type of a dragged object at the start of drag in the information providing system according to the fourth embodiment. In step S2301, the CPU acquires an event and determines it. If the event is drag start, the process advances to step S2302. If the event is drop or drag stop, the process advances to step S2310. In step S2302, the CPU determines the number of managed drop positions.

If there is no managed drop position, the processing ends. If managed drop positions exist, the process advances to step S2303. In step S2303, the CPU acquires the type of the object that is being dragged, and filters the managed drop positions by the drop type. In the example of FIG. 9, filtering is performed, using the droppable object type 905, to extract a drop position representing the same type as that of the object that is being dragged. In step S2304, the CPU determines the filtering result. If the filtering result indicates the absence of target drop positions, the process advances to step S2309. If target drop position information exists, the process advances to step S2305. In step S2305, the CPU confirms the state of a drop position display window. If a drop position display window exists, the process advances to step S2307. Without a drop position display window, the process advances to step S2306. In step S2306, a drop position display window is generated. The generated drop position display window may stationarily be displayed as the topmost window. This prevents the drop position display window from being hidden even when it is displayed as the topmost window and facilitates drag-and-drop. In step S2307, the CPU obtains an area size necessary for drop position display based on the number of filtered drop positions and resizes the drop position display window. If the number of drop positions or the area size necessary for drop position display exceeds a predetermined value, the necessary area size may be obtained assuming that the drop positions in the drop position display window should be scrolled for display. Alternatively, if the number of drop positions or the area size necessary for drop position display exceeds a predetermined value, drop position display in step S2308 may be controlled to switch the drop position display method to a smaller size. In step S2308, the CPU displays the filtered drop positions in the drop position display window, and ends the processing. In step S2309, the CPU deletes the drop position display window. Deleting the drop position display window in step S2309 allows to prohibit display of it when there is no drop position remaining as the result of filtering. In steps S2306 and S2309, the window may be generated upon executing the application, and the window state may be changed between an on state for generation and an off state for deletion. When the drop position display window is generated upon executing the application, the generated window may stationarily be displayed as the topmost window. This prevents the displayed drop position display window from being hidden even when it is displayed as the topmost window and facilitates drag-and-drop. In step S2310, the CPU processes the drop position display in accordance with the procedure as shown in FIG. 20. This makes it possible to display only drop positions corresponding to the object that is being dragged.

The user can thus designate an object paste position using a floating window in place of a menu, resulting in higher convenience for the user.

[Fifth Embodiment]

An operating system (OS) used in the following embodiments is Windows®. However, even when another OS is used, the basic concept is the same except only the program function and the like to be used. Hence, not only Windows® but any other OS is usable in this embodiment if it can run on a computer and implement a multiwindow system having a display screen capable of displaying a plurality of windows.

The fifth embodiment will be described below. Note that in this embodiment, a description of the same components as in the above-described first embodiment will not be repeated. Components unique to the fifth embodiment will be explained in detail.

Figure 24:
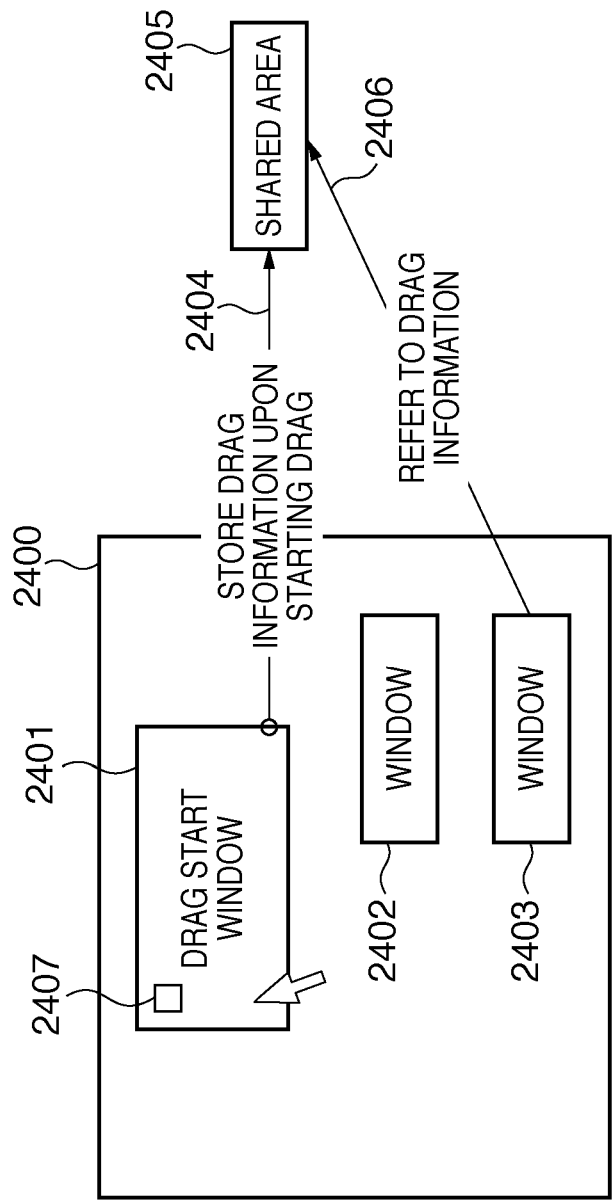
FIG. 24 is a view showing an outline of the operations of an OS and applications according to the fifth embodiment.

FIG. 24 is a view showing an outline of the operations of the OS and applications according to the fifth embodiment. Referring to FIG. 24, a screen 2400 is a display screen displayed on a CRT 101 by the OS. A window 2401 is the window of an application including a drag target object 2407 (e.g., file icon). Windows 2402 and 2403 are the windows of other applications. A shared area 2405 is allocated by the OS to a memory such as a RAM 108 and is accessible from each application that runs under the control of the OS.

When the object 2407 is dragged in the window 2401, the application (first program) of the window 2401 stores, in the shared area 2405, information (drag information) about the object 2407, as indicated by an arrow 2404.

Another application, for example, the application (second program) of the window 2403 can acquire the drag information by referring to the shared area 2405, as indicated by an arrow 2406.

Note that the drag information contains, for example, at least one of data associated with the drag target object and the type of the data (e.g., file type such as JPEG or TEXT).

Figure 25:
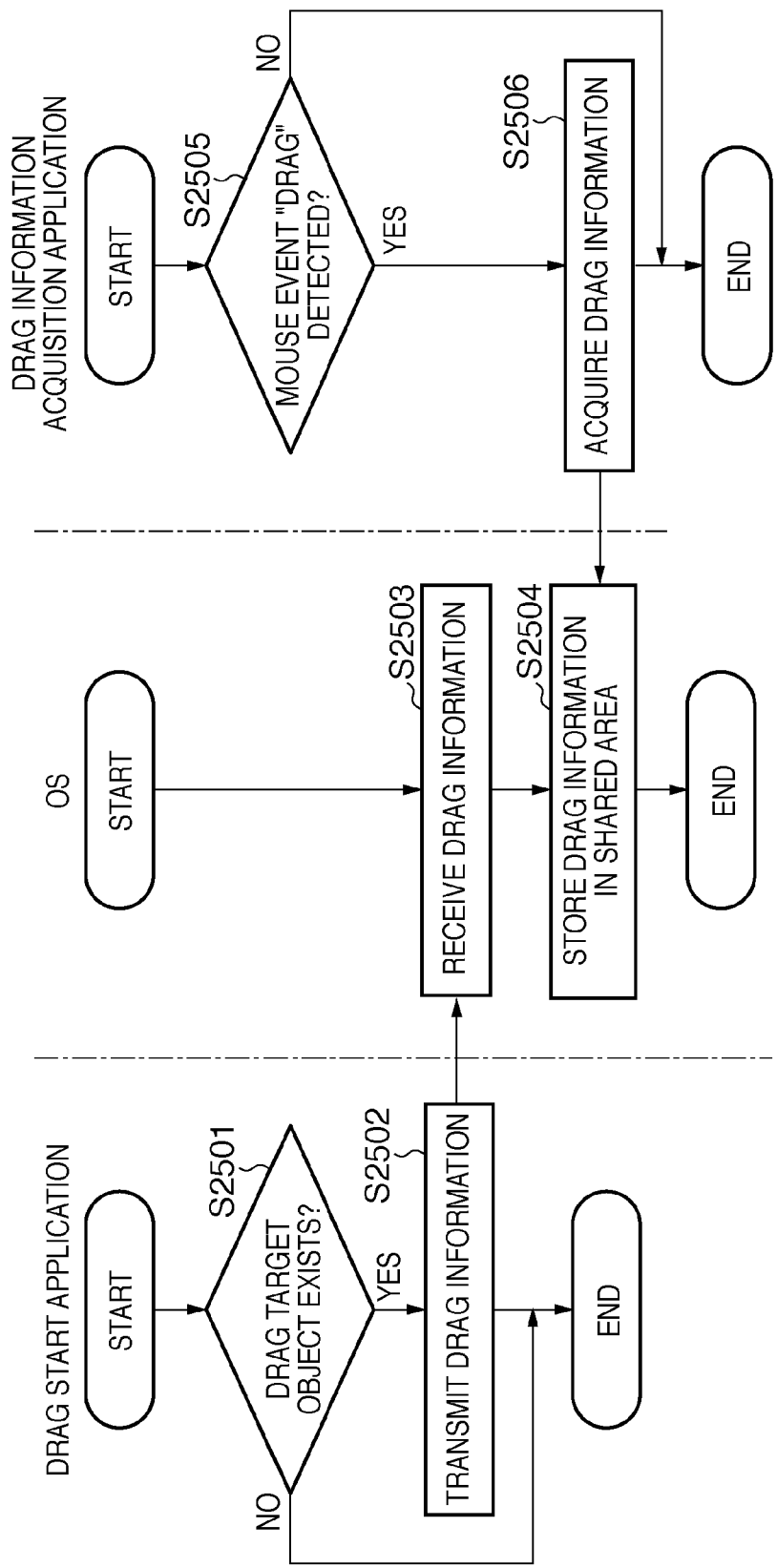
FIG. 25 is a flowchart illustrating the procedure of processing of causing the OS to receive drag information and store it in a shared area according to the fifth embodiment.

FIG. 25 is a flowchart illustrating the procedure of processing of causing the OS to receive the drag information and store it in the shared area according to the fifth embodiment. The processes of the steps of the flowchart are implemented by causing a CPU 106 of a PC 100 to execute the OS and applications (e.g., the applications of the window 2401 to 2403), unless it is specifically stated otherwise. This also applies to each flowchart to be described below.

In step S2501, when drag starts in the window 2401, the application (drag start application) of the window 2401 determines whether a drag target object exists. If drag is performed to, for example, designate a range, no drag target object exists, and the processing ends. Otherwise, the process advances to step S2502. In step S2502, the drag start application transmits drag information to the OS.

In step S2503, the OS receives the drag information from the drag start application and allocates the shared area 2405 to the RAM 108. The shared area 2405 has a security attribute that allows reference from another window. Allocation of the shared area 2405 may be done in advance. In step S2504, the OS stores the drag information in the shared area 2405.

When the process in step S2504 is executed, in step S2505, the application (drag information acquisition application) of the window 2403 detects the mouse event of the OS and determines whether drag has been performed. If drag has been performed, the application of the window 2403 acquires the drag information from the shared area 2405 in step S2506.

In FIG. 25, the application of the window 2403 has been explained as the drag information acquisition application. In place of or in addition to this, the application of the window 2402 may run as the drag information acquisition application.

Since only an application which requires drag information acquires it, the drag information is more efficiently transmitted, resulting in a lighter process load of the PC 100. Additionally, even when the mouse cursor is not present in the window of the application which requires drag information, the drag information can be acquired.

[Sixth Embodiment]

In the sixth embodiment as well, a PC 100 (FIG. 1) of the first embodiment is used.

Figure 26:
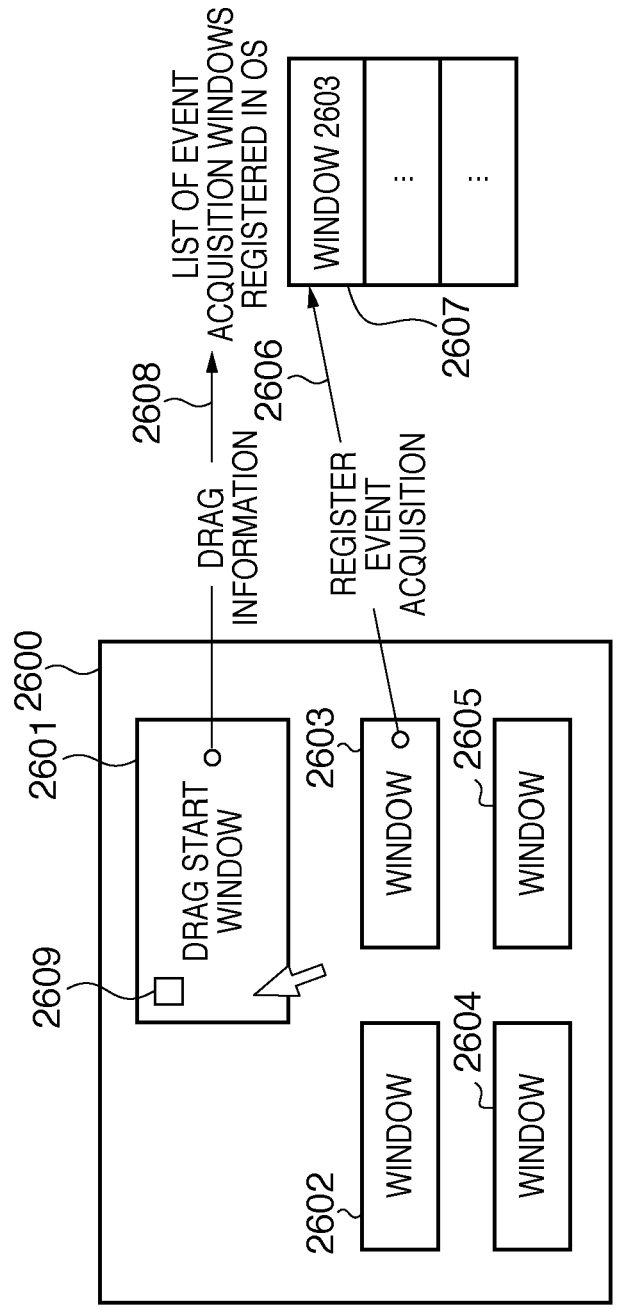
FIG. 26 is a view showing an outline of the operations of an OS and applications according to the sixth embodiment.

FIG. 26 is a view showing an outline of the operations of an OS and applications according to the sixth embodiment. Referring to FIG. 26, a screen 2600 is a display screen displayed on a CRT 101 by the OS. A window 2601 is the window of an application including a drag target object 2609 (e.g., file icon). Windows 2602 to 2605 are the windows of other applications.

An application (e.g., the application of the window 2603) which wants to acquire drag information in another application performs event acquisition registration (notification request) in the OS, as indicated by an arrow 2606. With this process, the window 2603 is registered in an event acquisition list 2607.

When the object 2609 is dragged in the window 2601, the application of the window 2601 transmits drag information to the OS, as indicated by an arrow 2608. Upon receiving the drag information, the OS sequentially transmits it to the applications in accordance with the event acquisition list 2607. Hence, the application of the window 2603 can acquire the drag information.

Figure 27:
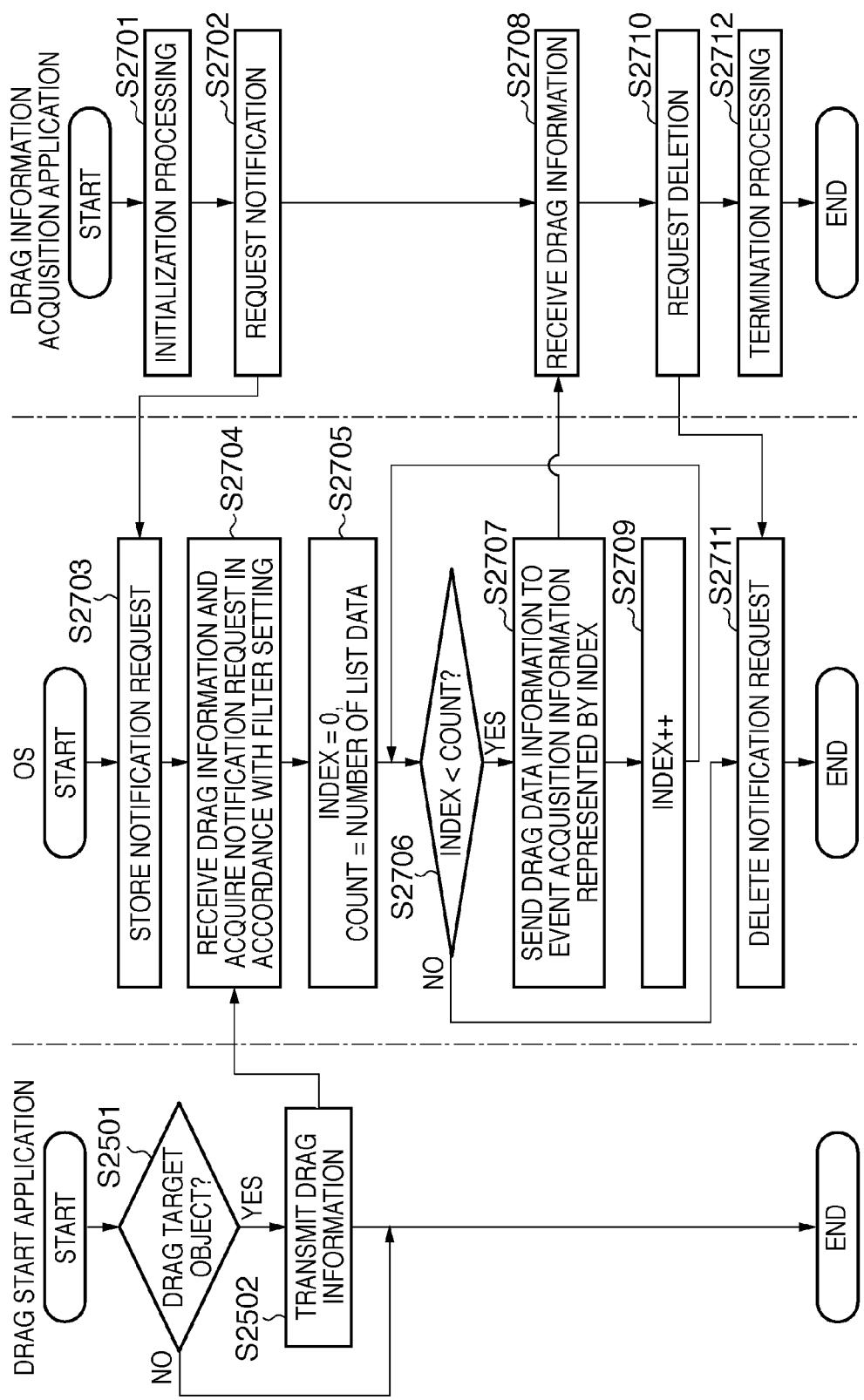
FIG. 27 is a flowchart illustrating the procedure of processing of causing the OS to store a drag information notification request and notify an application of the drag information in accordance with the notification request according to the sixth embodiment.

FIG. 27 is a flowchart illustrating the procedure of processing of causing the OS to store a drag information notification request and notify an application of the drag information in accordance with the notification request according to the sixth embodiment.

In step S2701, the drag information acquisition application (e.g., the application of the window 2603) performs initialization processing necessary for execution. In step S2702, the drag information acquisition application transmits a drag information notification request to the OS (i.e., performs event acquisition registration). In step S2703, the OS receives the notification request (notification request reception means) and stores it in a RAM 108.

Note that the events include not only the drag event but also an input event of a keyboard or mouse and an event of window generation or display, although not illustrated. Hence, filtering can be set not to acquire unnecessary events, as a matter of course. A plurality of applications may run as the drag information acquisition application.

Next, the drag start application performs the processes in steps S2501 and S2502. These processes are the same as in the fifth embodiment (FIG. 25).

After that, in step S2704, the OS receives the drag information (drag information reception means). Based on the filter setting condition, the OS also acquires, from the RAM 108, the notification request which is set to acquire the drag information.

In step S2705, the OS sets a variable INDEX to refer to the notification request to 0 and sets the number of notification requests acquired in step S2704 in a variable COUNT. In step S2706, the OS determines whether variable INDEX<variable COUNT. If YES, the process advances to step S2707. If NO, the process advances to step S2711.

In step S2707, the OS sends the drag information to the drag information acquisition application corresponding to the notification request represented by the variable INDEX. In step S2708, the drag information acquisition application receives the drag information. In step S2709, the OS increments the variable INDEX by one, and the process returns to step S2706.

The drag information acquisition application can delete the notification request when, for example, at the time of its termination.

In step S2710, the drag information acquisition application transmits, to the OS, a request (deletion request) to delete the notification request. Upon receiving the deletion request (deletion request reception means), in step S2711, the OS deletes, from the RAM 108, the notification request corresponding to the drag information acquisition application which has transmitted the deletion request. Finally in step S2712, drag information acquisition application performs termination processing necessary for the end.

Note that the OS manages the notification request and can therefore know the termination of the drag information acquisition application. Hence, the OS may automatically delete the notification request at the time of termination of the drag information acquisition application. The drag information acquisition application can transmit the deletion request at any arbitrary timing other than that shown in FIG. 27.

With the above-described processing, only an application such as the application of the window 2603 which requires drag information can acquire it.

For this reason, the drag information is more efficiently transmitted, resulting in a lighter process load of the PC 100. Additionally, even when the mouse cursor is not present in the window of the application which requires drag information, the drag information can be acquired.

Note that in this embodiment, loop processing is performed in steps S2706 to S2709. However, the drag information may be sent by chaining event acquisition information (notification request) or forming a thread for each notification request.

[Seventh Embodiment]

In the seventh embodiment as well, a PC 100 (FIG. 1) of the first embodiment is used.

Figure 28:
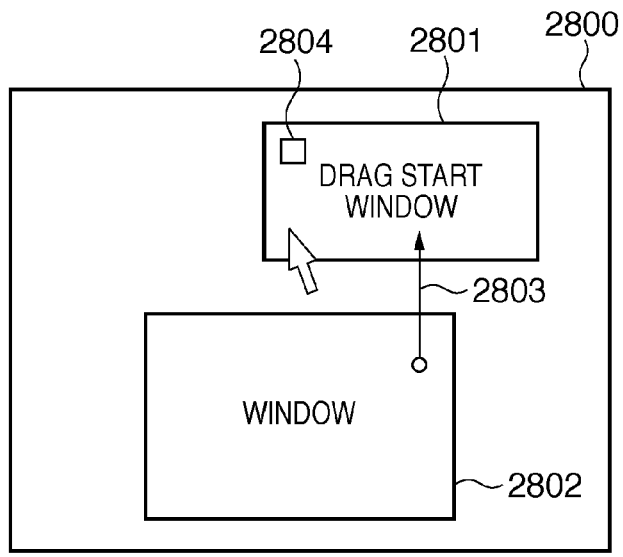
FIG. 28 is a view showing an outline of the operations of applications according to the seventh embodiment.

FIG. 28 is a view showing an outline of the operations of applications according to the seventh embodiment. Referring to FIG. 28, a screen 2800 is a display screen displayed on a CRT 101 by the OS. A window 2801 is the window of an application including a drag target object 2804 (e.g., file icon). A window 2802 is the window of another application.

On the screen 2800, the application of the window 2802 inquires of the window 2801 in which drag has started about drag information, thereby acquiring the drag information, as indicated by an arrow 2803.

Figure 29:
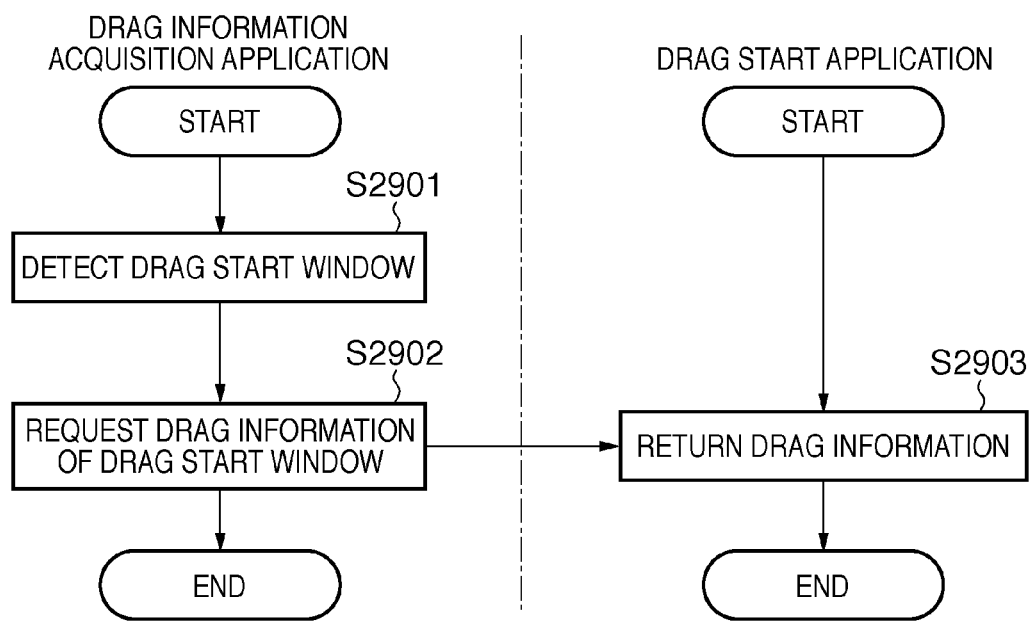
FIG. 29 is a flowchart illustrating the procedure of the operations of the applications according to the seventh embodiment.

FIG. 29 is a flowchart illustrating the procedure of the operations of the applications according to the seventh embodiment.

In step S2901, the drag information acquisition application (the application of the window 2802) detects that the object 2804 has been dragged in the drag start application (the application of the window 2801) that is another program.

In step S2902 the drag information acquisition application requests drag information of the application detected in step S2901. In step S2903, the drag start application returns the drag information in response to the request.

In this embodiment, the drag information acquisition application and the drag start application can communicate using a window message defined by the OS. Alternatively, communication may be implemented using an interprocess communication technique that is built based on a mechanism such as a semaphore.

With the above-described processing, only an application such as the application of the window 2802 which requires drag information can acquire it.

For this reason, the drag information is more efficiently transmitted, resulting in a lighter process load of the PC 100. Additionally, even when the mouse cursor is not present in the window of the application which requires drag information, the drag information can be acquired.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-297097, filed on Nov. 20, 2008 and No. 2009-101376, filed on Apr. 17, 2009 and No. 2009-206458, filed on Sep. 7, 2009, which are hereby incorporated by reference herein in their entirety.

What is claimed is:

1. An information processing apparatus for displaying a plurality of windows on a display screen, comprising:
   a drag detection unit that detects a drag operation of an object arranged in a first window;
   a direction obtaining unit that obtains moving direction of the drag operation based on positions at start of the drag operation and during the drag operation;
   a display control unit that controls to display a second window, which exists within a predetermined range from the obtained moving direction of the drag operation, in a topmost layer of the display screen; and
   a determination unit that determines whether or not the first window can receive a drop operation of a target object of the drag operation,
   wherein the display control unit controls to display the second window at a predetermined distance from a starting position of the drag operation of the target object if it is determined that the first window cannot receive the drop operation of the target object of the drag operation, and controls to display the second window at a predetermined distance from the first window if it is determined that the first window can receive the drop operation of the target object of the drag operation, and
   wherein a processor functions as one or more of the drag detection unit, direction obtaining unit, display control unit, and determination unit.

2. The apparatus according to claim 1, further comprising:
   a size change unit that changes a display size of the second window,
   wherein said size change unit changes the display size of the second window to a smaller size and said display control unit controls to display the second window with the display size changed to the smaller size by said size change unit.

3. The apparatus according to claim 1, further comprising:
   a position change unit that changes display positions of the first window and the second window on the display screen, such that an overlap area between the first window and the second window becomes smaller than before said drag detection unit detects the drag operation,
   wherein said display control unit controls to display the first window and the second window at the changed display positions.

4. The apparatus according to claim 1, wherein
   the first window and the second window are displayed in accordance with operations of a first application program and a second application program which are different from each other and executed by the information processing apparatus,
   said drag detection unit executes the detection in accordance with an operation of an operating system executed by the information processing apparatus, and
   the information processing apparatus uses a result of the detection in accordance with the second application program.

5. The apparatus according to claim 1,
   wherein the second window is displayed behind at least one of the plurality of windows displayed on the display screen, when said drag detection unit has detected the drag operation.

6. The apparatus according to claim 1, further comprising:
   an enlargement unit that enlarges a size of a drop area of the second window,
   wherein said display control unit controls to display the second window including the enlarged drop area.

7. The apparatus according to claim 1, further comprising:
   a selection unit that selects a second application based on a first application corresponding to the first window,
   wherein said display control unit controls to display the second window in the topmost layer of the display screen, if the second window corresponds to the selected second application.

8. The apparatus according to claim 1,
   wherein the display control unit controls to display the second window at a position which is translated from an original position of the second window by a minimum moving distance and which is at a predetermined distance from the first window if it is determined that the first window can receive the drop operation of the target object of the drag operation.

9. A method of controlling an information processing apparatus for displaying a plurality of windows on a display screen, comprising:
   a drag detection step of causing a drag detection unit to detect a drag operation of an object arranged in a first window;
   a direction obtaining step of causing a direction obtaining unit to obtain moving direction of the drag operation based on positions at start of the drag operation and during the drag operation,
   a display control step of causing a display control unit to control to display a second window, which exists within a predetermined range from the obtained moving direction of the drag operation, in a topmost layer of the display screen; and
   a determination step of causing a determination unit to determine whether or not the first window can receive a drop operation of a target object of the drag operation,
   wherein said display control step causes the display control unit to control to display the second window at a predetermined distance from a starting position of the drag operation of the target object if it is determined that the first window cannot receive the drop operation of the target object of the drag operation, and to control to display the second window at a predetermined distance from the first window if it is determined that the first window can receive the drop operation of the target object of the drag operation.

10. A non-transitory computer-readable storage medium which stores a program for causing a computer to execute the method according to claim 9.

* * * * *